(12) United States Patent
Lam et al.

(10) Patent No.: US 11,885,967 B2
(45) Date of Patent: Jan. 30, 2024

(54) PHASE STRUCTURE ON VOLUME BRAGG GRATING-BASED WAVEGUIDE DISPLAY

(71) Applicant: Meta Platforms Technologies, LLC, Menlo Park, CA (US)

(72) Inventors: Wai Sze Tiffany Lam, Bothell, WA (US); Yang Yang, Redmond, WA (US); Wanli Chi, Sammamish, WA (US); Dominic Meiser, Bothell, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 102 days.

(21) Appl. No.: 17/478,679

(22) Filed: Sep. 17, 2021

(65) Prior Publication Data

US 2022/0137411 A1    May 5, 2022

Related U.S. Application Data

(60) Provisional application No. 63/110,241, filed on Nov. 5, 2020.

(51) Int. Cl.
*G02B 27/01* (2006.01)
*G02B 27/28* (2006.01)
(Continued)

(52) U.S. Cl.
CPC ....... *G02B 27/0172* (2013.01); *G02B 5/1833* (2013.01); *G02B 5/1842* (2013.01);
(Continued)

(58) Field of Classification Search
None
See application file for complete search history.

(56) References Cited

U.S. PATENT DOCUMENTS 6,821,457 B1 * 11/2004 Natarajan ........... G02F 1/13342
                                                  252/582
7,322,704 B2 * 1/2008 Shchegrov ............. H04N 9/315
                                                  372/99

(Continued)

FOREIGN PATENT DOCUMENTS

EP            3374819         6/2020

OTHER PUBLICATIONS

Nicolas Passilly et al: "Achromatic phase retardation by subwavelength gratings in total internal reflection", Journal of Optics. A, Pure and Applied Optics, Institute of Physics Publishing, Bristol, GB, vol. 10, No. 1, Jan. 1, 2008 (Jan. 1, 2008), p. 15001 (Year: 2008).*

(Continued)

*Primary Examiner* — Andrew Jordan
(74) *Attorney, Agent, or Firm* — Weaver Austin Villeneuve & Sampson LLP

(57) ABSTRACT

A waveguide display includes a substrate transparent to visible light, a first grating on the substrate and configured to couple display light into or out of the substrate, and a phase structure on the substrate and configured to change a polarization state of the display light after or before the display light reaches the first grating. The first grating is characterized by a polarization-dependent diffraction efficiency. The first grating includes, for example, a surface-relief grating or a volume Bragg grating.

20 Claims, 27 Drawing Sheets
(4 of 27 Drawing Sheet(s) Filed in Color)

(51) Int. Cl.
   *G02B 5/30*    (2006.01)
   *F21V 8/00*    (2006.01)
   *G02B 5/18*    (2006.01)
   *G02B 6/34*    (2006.01)
   *G02B 27/00*   (2006.01)
   *G02B 27/09*   (2006.01)

(52) U.S. Cl.
   CPC ........... *G02B 5/3083* (2013.01); *G02B 6/005* (2013.01); *G02B 6/0026* (2013.01); *G02B 6/34* (2013.01); *G02B 27/0081* (2013.01); *G02B 27/0093* (2013.01); *G02B 27/0944* (2013.01); *G02B 27/286* (2013.01); *G02B 2027/0118* (2013.01); *G02B 2027/0123* (2013.01); *G02B 2027/0174* (2013.01); *G02B 2027/0178* (2013.01)

(56) References Cited

U.S. PATENT DOCUMENTS

| | | | | |
|---|---|---|---|---|
| 7,526,005 B2* | 4/2009 | Kim | ........ | H01S 5/183 353/94 |
| 8,531,761 B2* | 9/2013 | Chann | ........ | G03F 7/7085 359/333 |
| 8,995,488 B2* | 3/2015 | Courjaud | ........ | H01S 3/08 372/41 |
| 9,136,667 B2* | 9/2015 | Chann | ........ | G03F 7/7085 |
| 9,791,696 B2* | 10/2017 | Woltman | ........ | G02B 27/0081 |
| 10,126,558 B2* | 11/2018 | Liu | ........ | H01S 5/0078 |
| 10,185,154 B2* | 1/2019 | Popovich | ........ | G03B 21/208 |
| 10,804,677 B2* | 10/2020 | Bartko | ........ | H01S 5/02326 |
| 10,868,402 B2* | 12/2020 | Kopf | ........ | H01S 3/113 |
| 11,016,304 B2* | 5/2021 | Geng | ........ | G02B 27/0176 |
| 11,092,808 B1* | 8/2021 | Lam | ........ | G02B 27/0018 |
| 11,360,308 B2* | 6/2022 | Maimone | ........ | G02B 17/004 |
| 11,381,059 B2* | 7/2022 | Bartko | ........ | H01S 5/1021 |
| 11,422,373 B2* | 8/2022 | Maimone | ........ | G02B 27/0172 |
| 11,448,885 B2* | 9/2022 | Geng | ........ | G02B 5/3025 |
| 11,474,395 B2* | 10/2022 | Malhotra | ........ | G02B 5/18 |
| 11,650,429 B2* | 5/2023 | Wang | ........ | G02B 27/0172 349/201 |
| 11,656,494 B2* | 5/2023 | Leister | ........ | G03H 1/2294 349/9 |
| 11,709,358 B2* | 7/2023 | Yang | ........ | G02B 27/0172 359/630 |
| 2006/0029120 A1* | 2/2006 | Mooradian | ........ | H01S 5/141 372/50.1 |
| 2006/0268241 A1* | 11/2006 | Watson | ........ | G03B 21/204 348/E9.027 |
| 2006/0280219 A1* | 12/2006 | Shchegrov | ........ | G03B 21/204 372/99 |
| 2007/0153866 A1* | 7/2007 | Shchegrov | ........ | H04N 9/315 372/99 |
| 2008/0130703 A1* | 6/2008 | Spariosu | ........ | H01S 3/094 372/70 |
| 2010/0328743 A1* | 12/2010 | Wolterink | ........ | G02B 5/1814 359/566 |
| 2011/0292498 A1* | 12/2011 | Chann | ........ | G03F 7/70033 359/341.1 |
| 2013/0142208 A1* | 6/2013 | Courjaud | ........ | H01S 3/08 372/34 |
| 2013/0342895 A1* | 12/2013 | Chann | ........ | H01S 3/1307 359/338 |
| 2014/0022616 A1* | 1/2014 | Popovich | ........ | G02F 1/13342 359/15 |
| 2017/0131546 A1* | 5/2017 | Woltman | ........ | G02B 27/0103 |
| 2017/0199389 A1* | 7/2017 | Liu | ........ | H01S 5/0078 |
| 2018/0052276 A1* | 2/2018 | Klienman | ........ | H05K 7/20963 |
| 2018/0052320 A1* | 2/2018 | Curtis | ........ | G06F 1/163 |
| 2020/0067275 A1* | 2/2020 | Bartko | ........ | H01S 5/02415 |
| 2020/0251875 A1* | 8/2020 | Kopf | ........ | H01S 3/1118 |
| 2020/0412091 A1* | 12/2020 | Elgcrona | ........ | H01S 3/08054 |
| 2021/0021101 A1* | 1/2021 | Bartko | ........ | H01S 5/02 |
| 2021/0080723 A1* | 3/2021 | Geng | ........ | G02B 5/3025 |
| 2021/0109404 A1* | 4/2021 | Leister | ........ | G02F 1/133528 |
| 2021/0191180 A1* | 6/2021 | Malhotra | ........ | C08L 67/00 |
| 2021/0223548 A1* | 7/2021 | Maimone | ........ | G02B 27/1006 |
| 2021/0223549 A1* | 7/2021 | Maimone | ........ | G02B 27/1086 |
| 2021/0247615 A1* | 8/2021 | Geng | ........ | G02B 5/3025 |
| 2021/0341743 A1* | 11/2021 | Lam | ........ | G02B 6/0016 |
| 2022/0137410 A1* | 5/2022 | Lam | ........ | G02B 6/0026 359/630 |
| 2022/0137411 A1* | 5/2022 | Lam | ........ | G02B 6/005 385/37 |
| 2022/0276499 A1* | 9/2022 | Wang | ........ | G02B 5/1814 |
| 2022/0326533 A1* | 10/2022 | Geng | ........ | G02F 1/137 |
| 2023/0045957 A1* | 2/2023 | Peng | ........ | G02B 27/0172 |
| 2023/0048286 A1* | 2/2023 | Vetrovec | ........ | H01S 3/0092 |
| 2023/0098118 A1* | 3/2023 | Maimone | ........ | G02B 5/3016 359/13 |
| 2023/0099173 A1* | 3/2023 | Geng | ........ | G02B 27/106 345/7 |
| 2023/0221555 A1* | 7/2023 | Trochtchanovitch | ........ | G02B 27/0081 359/630 |
| 2023/0221568 A1* | 7/2023 | Schultz | ........ | G02B 27/0093 359/13 |

OTHER PUBLICATIONS

PCT/US2021/057995 Written Opinion dated Feb. 22, 2022, 8 pages (Year: 2022).*
PCT/US2021/057995 International Search Report dated Feb. 22, 2022, 8 pages (Year: 2022).*
Ciapurin I.V., et al., "Modeling of Phase Volume Diffractive Gratings, Part 2: Reflecting Sinusoidal Uniform Gratings, Bragg Minors," Optical Engineering, vol. 51, No. 5, May 2012, 10 pages.
International Preliminary Report on Patentability for International Application No. PCT/US2021/057995, dated May 19, 2023, 10 pages.

* cited by examiner

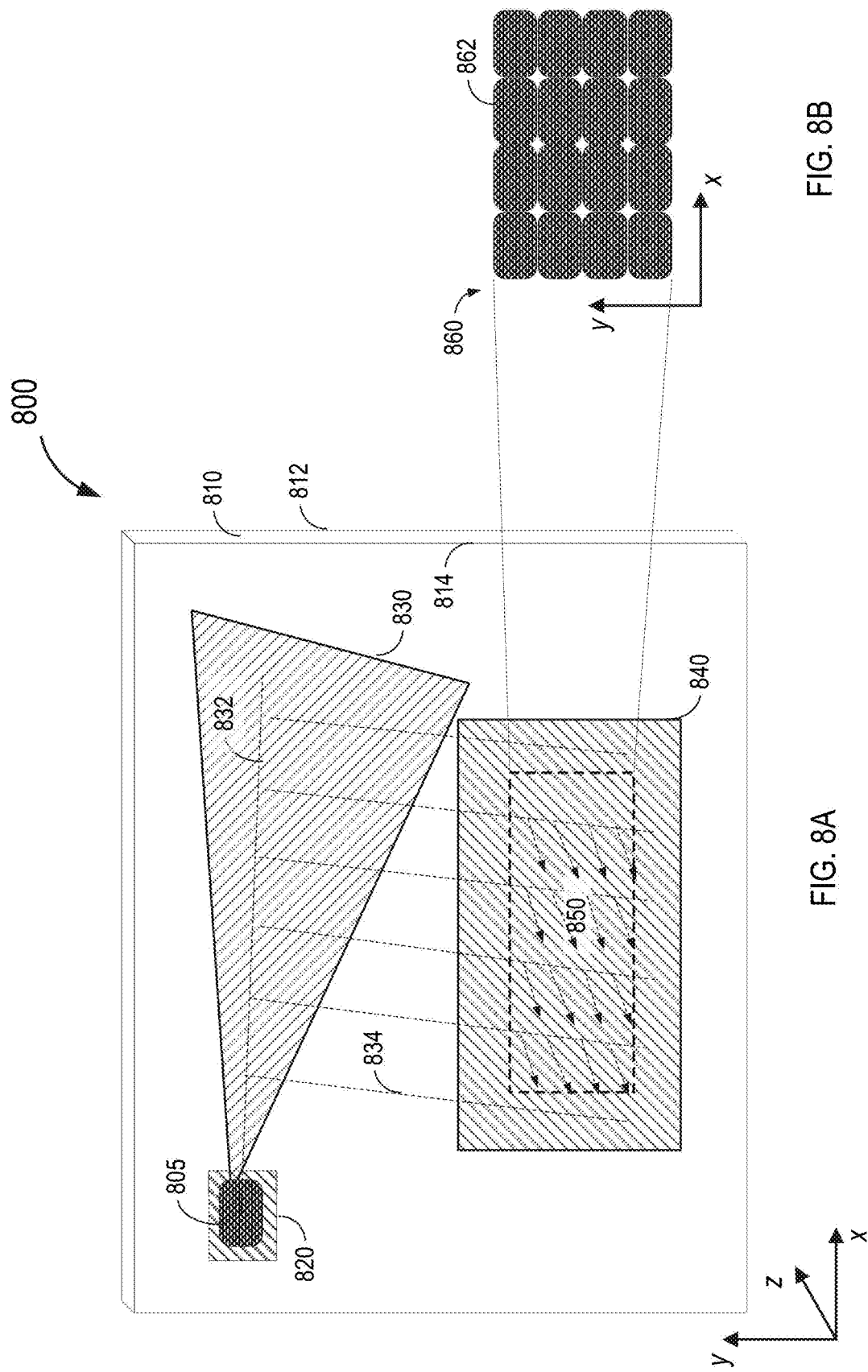

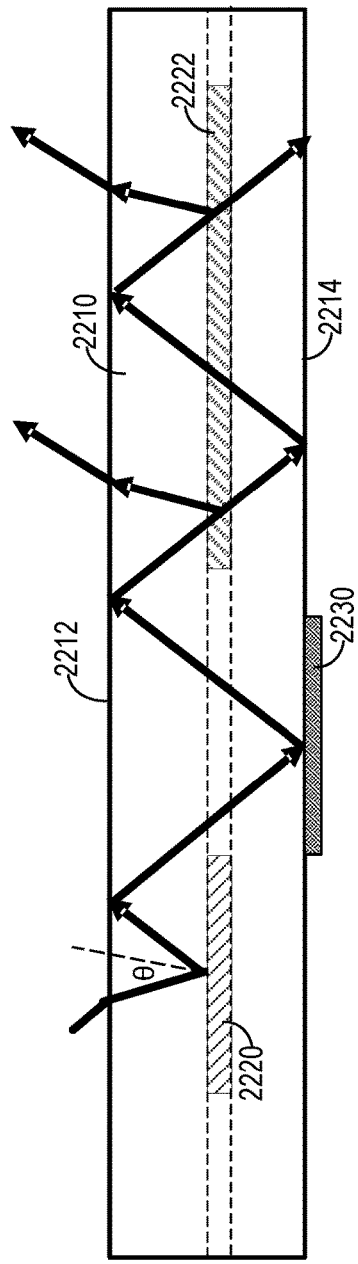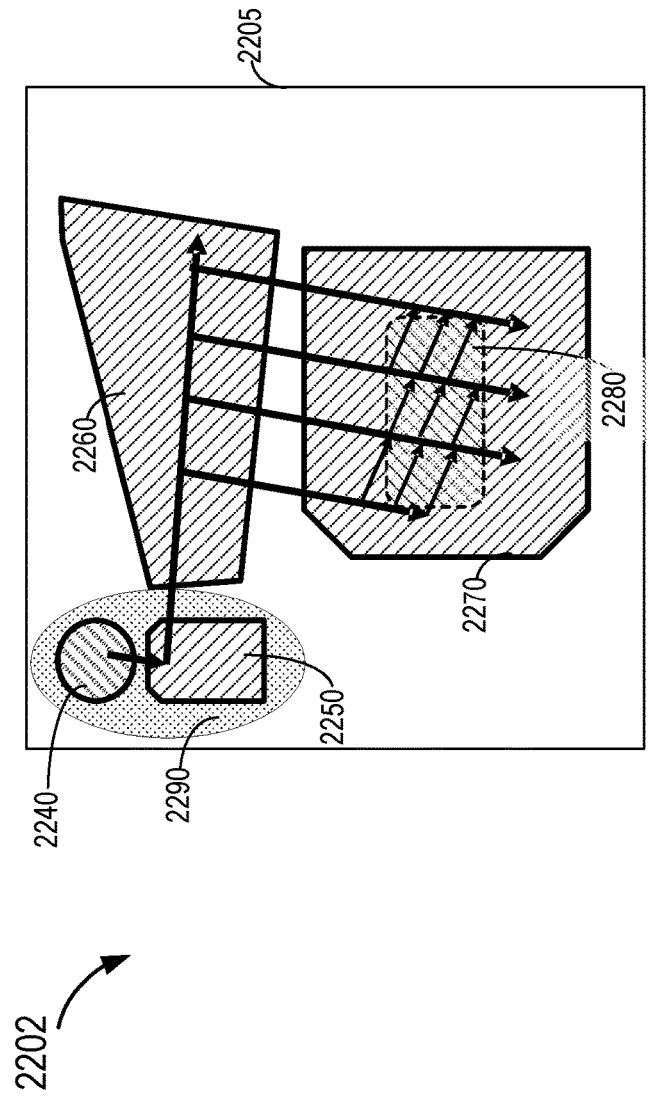

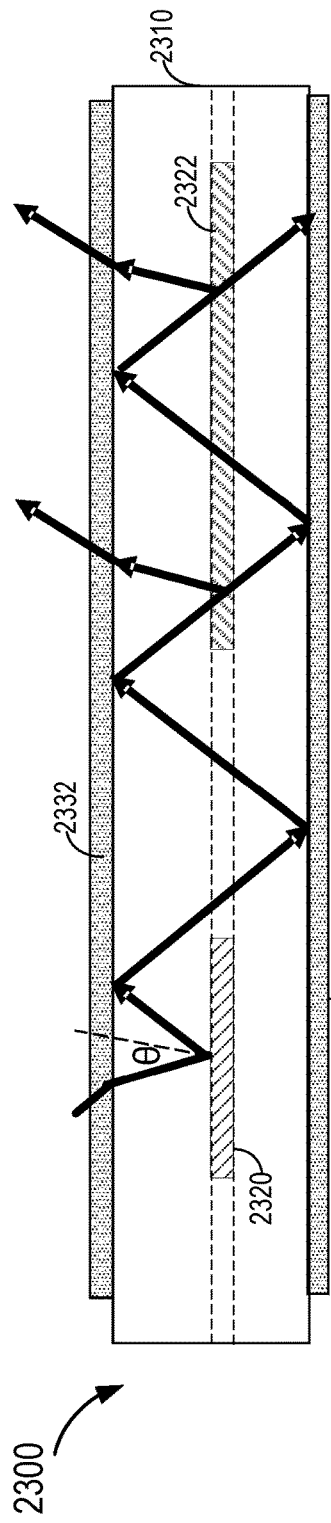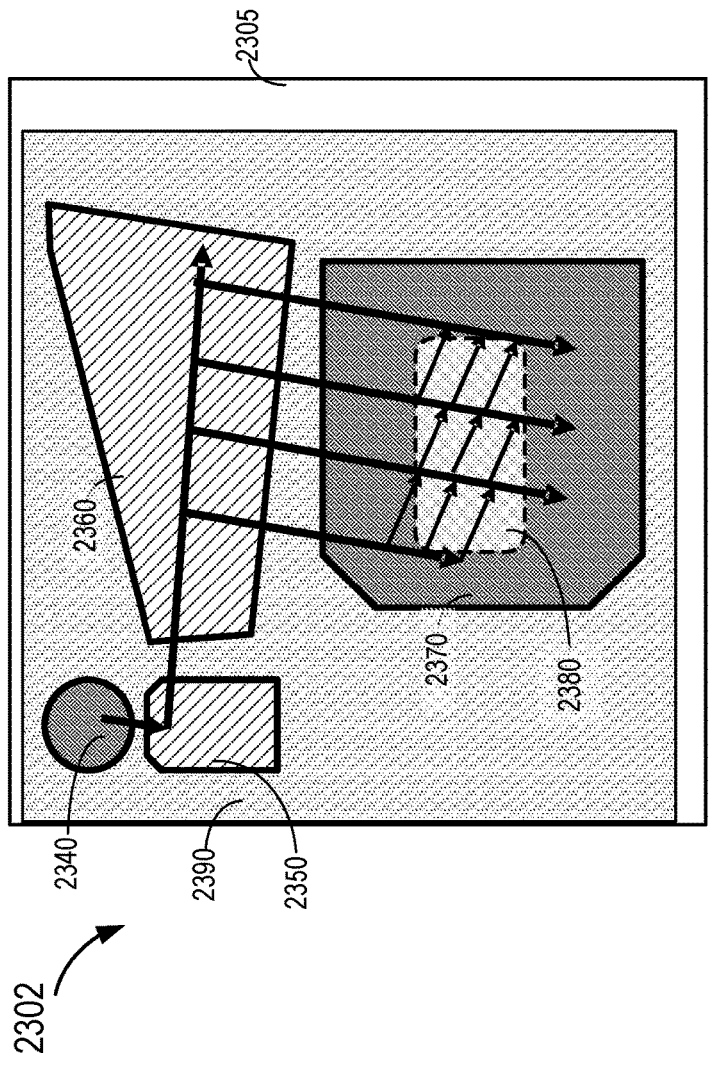

FIG. 26B

PHASE STRUCTURE ON VOLUME BRAGG GRATING-BASED WAVEGUIDE DISPLAY

CROSS-REFERENCE TO RELATED APPLICATIONS

This application claims the benefit of and priority to U.S. Provisional Application No. 63/110,241, filed Nov. 5, 2020, entitled "Phase Structure on Waveguide Display," which is herein incorporated by reference in its entirety for all purposes. The following two U.S. patent applications (including this one) are being filed concurrently, and the entire disclosure of the other application is incorporated by reference into this application for all purposes:

U.S. patent application Ser. No. 17/478,674, filed Sep. 17, 2021, entitled "Phase Structure on Surface-Relief Grating-Based Waveguide Display"; and U.S. patent application Ser. No. 17/478,679, filed Sep. 17, 2021, entitled "Phase Structure on Volume Bragg Grating-Based Waveguide Display."

BACKGROUND

An artificial reality system, such as a head-mounted display (HMD) or heads-up display (HUD) system, generally includes a near-eye display (e.g., in the form of a headset or a pair of glasses) configured to present content to a user via an electronic or optic display within, for example, about 10-20 mm in front of the user's eyes. The near-eye display may display virtual objects or combine images of real objects with virtual objects, as in virtual reality (VR), augmented reality (AR), or mixed reality (MR) applications. For example, in an AR system, a user may view both images of virtual objects (e.g., computer-generated images (CGIs)) and the surrounding environment by, for example, seeing through transparent display glasses or lenses (often referred to as optical see-through).

One example of an optical see-through AR system may use a waveguide-based optical display, where light of projected images may be coupled into a waveguide (e.g., a transparent substrate), propagate within the waveguide, and be coupled out of the waveguide at different locations. In some implementations, the light of the projected images may be coupled into or out of the waveguide using diffractive optical elements, such as volume holographic gratings and/or surface-relief gratings. Light from the surrounding environment may pass through a see-through region of the waveguide and reach the user's eyes as well.

SUMMARY

This disclosure relates generally to grating-based waveguide displays for near-eye display. More specifically, disclosed herein are techniques for improving the coupling efficiencies of grating-based near-eye display systems. Various inventive embodiments are described herein, including devices, systems, methods, and the like.

According to some embodiments, a waveguide display may include a substrate transparent to visible light, a first surface-relief grating on the substrate and configured to couple display light into or out of the substrate, and a phase structure on the substrate and configured to change a polarization state of the display light after or before the display light reaches the first surface-relief grating. The first surface-relief grating is characterized by a polarization-dependent diffraction efficiency.

In some embodiments, the phase structure may include a waveplate, where the waveplate may be characterized by a waveplate thickness between zero and one wavelength. In some embodiments, the phase structure may include a layer of a birefringent material, or a subwavelength structure and an overcoat layer. The subwavelength structure may be etched in the substrate or may be etched in a material layer formed on the substrate. A difference between a refractive index of the substrate and an effective refractive index of the phase structure including the subwavelength structure and the overcoat layer is less than about 0.35.

In some embodiments, the waveguide display may also include a second surface-relief grating on the phase structure, where the phase structure is between the substrate and the second surface-relief grating. A waveplate thickness of the phase structure may be a quarter wavelength. The phase structure may be arranged such that an angle between a fast axis of the phase structure and a grating vector of the first surface-relief grating is 45°.

In some embodiments, the waveguide display may also include a second surface-relief grating between the substrate and the phase structure. In some embodiments, the first surface-relief grating may be on a first surface of the substrate and may be configured to couple the display light into the substrate, and the phase structure may be on a second surface of the substrate opposing the first surface and may be configured to change the polarization state of the display light coupled into the substrate.

In some embodiments, the phase structure may be in selected regions of the substrate. The phase structure may be characterized by a spatially varying phase retardation across different regions of the phase structure. The phase structure may be configured to convert s-polarized light to p-polarized light, convert p-polarized light to s-polarized light, convert linearly polarized light to circularly polarized light, or convert circularly polarized light to linearly polarized light.

According to some embodiments, a waveguide display may include a substrate transparent to visible light, a first surface-relief grating on a first surface of the substrate and configured to couple display light into the substrate such that the display light propagates within the substrate through total internal reflection, where the first surface-relief grating is characterized by a polarization-dependent diffraction efficiency. The waveguide display may also include a phase structure on a second surface of the substrate opposing the first surface, where the phase structure may be configured to change a polarization state of the display light coupled into the substrate.

In some embodiments, the phase structure may include a layer of a birefringent material, or a subwavelength structure formed in an isotropic material or the birefringent material. In some embodiments, the phase structure may include a subwavelength structure and an overcoat layer, and a difference between a refractive index of the substrate and an effective refractive index of the phase structure including the subwavelength structure and the overcoat layer may be less than 0.35, such as less than about 0.2, less than about 0.1, or less than about 0.05. The waveguide display may also include a second surface-relief grating on the phase structure, where the phase structure may be between the substrate and the second surface-relief grating or the second surface-relief grating may be between the substrate and the phase structure.

According to some embodiments, a waveguide display may include a first substrate transparent to visible light, a second substrate transparent to the visible light, a holographic material layer between the first substrate and the second substrate and including a volume Bragg grating characterized by a polarization-dependent diffraction efficiency, and a phase structure on the first substrate or the second substrate and configured to change a polarization state of display light incident on the phase structure after or before the display light is diffracted by the volume Bragg grating.

In some embodiments of the waveguide display, the phase structure may include a waveplate. The waveplate may be characterized by a waveplate thickness between zero and one wavelength. In some embodiments, the phase structure may include a layer of a birefringent material, or a sub-wavelength structure and an overcoat layer. The subwavelength structure may be etched in the substrate or may be etched in a material layer formed on the substrate. A difference between a refractive index of the substrate and an effective refractive index of the phase structure including the subwavelength structure and the overcoat layer may be less than about 0.35.

In some embodiments, the phase structure may be in selected regions of the first substrate or the second substrate. In some embodiments, the phase structure may be characterized by a spatially varying phase retardation across different regions of the phase structure.

In some embodiments, the phase structure may be on the second substrate, and the waveguide display may further include a second phase structure on the first substrate. The phase structure may be in a region of the waveguide display where the input grating coupler is located. The phase structure may be in a region of the waveguide display where the input grating coupler and the output grating coupler are located. The input grating coupler may include one or more volume Bragg gratings, and the output grating coupler may include at least two volume Bragg gratings configured to expand an eyebox of the waveguide display in two directions.

According to some embodiments, a waveguide display may include a first substrate, a second substrate, an input grating coupler between the first substrate and the second substrate and configured to couple display light into the first substrate or the second substrate, an output grating coupler between the first substrate and the second substrate and configured to at least partially couple the display light out of the waveguide display towards an eyebox of the waveguide display, and a phase structure on the first substrate or the second substrate and configured to change a polarization state of the display light coupled into the first substrate or the second substrate before the display light coupled into the first substrate or the second substrate reaches the output grating coupler or reaches the input grating coupler again.

In some embodiments of the waveguide display, the phase structure may include a layer of a birefringent material, or a subwavelength structure formed in an isotropic material or the birefringent material. The phase structure may include a subwavelength structure and an overcoat layer, and a difference between a refractive index of the first or second substrate and an effective refractive index of the phase structure may be less than about 0.35. The phase structure may include a subwavelength structure etched in the first substrate, in the second substrate, or in a material layer formed on the first substrate or the second substrate. The phase structure may be on the second substrate, and the waveguide display may further include a second phase structure on the first substrate.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Illustrative embodiments are described in detail below with reference to the following figures.

FIG. 8A illustrates an example of an optical see-through augmented reality system including a waveguide display and gratings for exit pupil expansion according to certain embodiments.

FIG. 8B illustrates an example of an eyebox including two-dimensional replicated exit pupils according to certain embodiments.

FIG. 22A illustrates a cross-sectional view of an example of a waveguide display including VBG couplers and a phase structure according to certain embodiments.

FIG. 22B illustrates a top view of an example of a waveguide display including VBG couplers and a phase structure according to certain embodiments.

FIG. 23A illustrates a cross-sectional view of an example of a waveguide display including VBGs and phase structures according to certain embodiments.

FIG. 23B illustrates a top view of an example of an example of a waveguide display including VBGs and at least one phase structure according to certain embodiments.

FIGS. 26A-26C illustrate simulated input coupling efficiencies of an example of a waveguide display for light from different regions in a field of view and in different colors.

Figure 1:
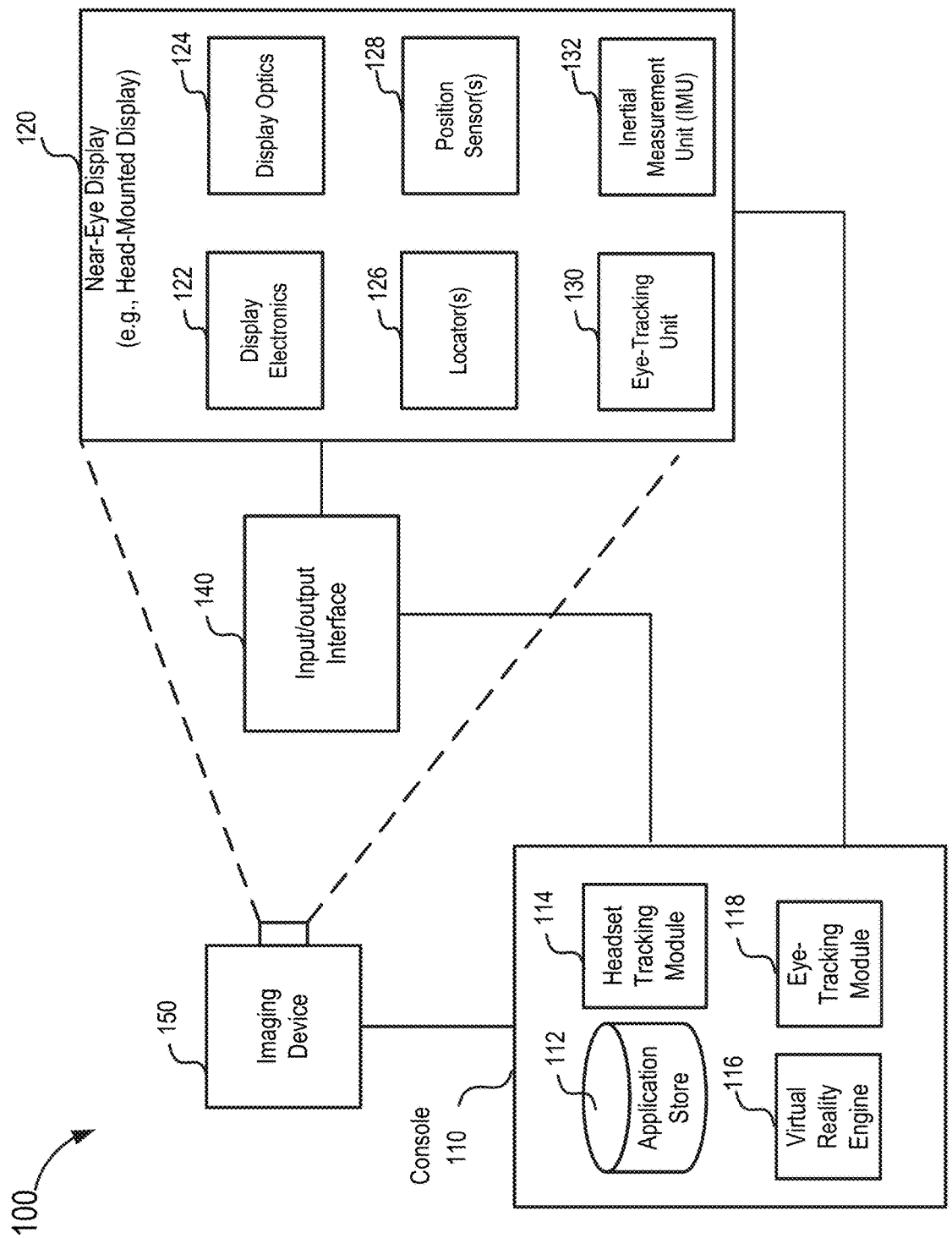
FIG. 1 is a simplified block diagram of an example of an artificial reality system environment including a near-eye display system according to certain embodiments.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

This disclosure relates generally to grating-based waveguide displays for near-eye display. More specifically, disclosed herein are techniques for improving the coupling efficiencies of grating-based optical see-through near-eye display systems. Various inventive embodiments are described herein, including devices, systems, methods, and the like.

In a near-eye display system, it is generally desirable to expand the eyebox, improve image quality (e.g., resolution and contrast), reduce physical size, increase power efficiency, and increase the field of view. In a waveguide-based near-eye display system, light of projected images may be coupled into a waveguide (e.g., a transparent substrate), propagate within the waveguide, and be coupled out of the waveguide at different locations to replicate exit pupils and expand the eyebox. Two or more gratings may be used to expand the eyebox in two dimensions. In a waveguide-based near-eye display system for augmented reality applications, light from the surrounding environment may pass through at least a see-through region of the waveguide display (e.g., the transparent substrate) and reach the user's eyes. In some implementations, the light of the projected images may be coupled into or out of the waveguide using diffractive optical elements, such as gratings, which may also allow light from the surrounding environment to pass through.

Couplers implemented using diffractive optical elements may have limited coupling efficiencies due to, for example, less than 100% diffraction efficiency to the desired diffraction order, leakage, crosstalk, polarization dependence, angular dependence, wavelength dependence, and the like. For example, in waveguide displays using surface-relief grating (SRG) couplers or volume Bragg grating (VBG) couplers, the display light coupled into the waveguide by an input coupler may be reflected back to the input coupler and may be diffracted again by the input coupler to undesired directions. In addition, the diffraction efficiencies of SRGs and VBGs may be polarization dependent. For example, the diffraction efficiencies of reflective VBGs may be close to zero for p-polarized light with incident angles near or at the Brewster's angle. In another example, the diffraction efficiency of an SRG for s-polarized light may be higher than the diffraction efficiency of the SRG for p-polarized light, and thus there may be higher leakage for s-polarized light due to the higher diffraction efficiency of the SRG for s-polarized light.

Grating couplers may be optimized to maximize the power of the display light in the desire path. For example, the grating shape, the slant angle, the grating period, the duty cycle, the grating height or depth, the refractive index, the refractive index modulation, the overcoating material, and the spatial variations of these grating parameters across the grating may be adjusted to improve the efficiencies of directing display light to the desired directions towards the eyebox. Varying these parameters may provide some but limited improvements to the efficiencies of the waveguide display due to the intrinsic characteristics of the SRGs and VBGs.

According to certain embodiments, the efficiency of a waveguide display may be improved by changing the polarization state of the display light along its propagation path. For example, a phase structure may be coupled to a surface of the waveguide and used to change the polarization state of the light reflected at the surface of the waveguide, such that the reflected light, when reaching a grating coupler in its propagation path, may be more preferentially diffracted or reflected to the desired directions to improve the overall efficiency of the waveguide display. The phase structure may include any birefringent materials (e.g., birefringent crystals, liquid crystals, or polymers) or structures (e.g., gratings or other subwavelength structures) that can cause a desired phase delay between two orthogonal linear polarization components (e.g., s-polarized light and p-polarized light), such that the incident light beam may be changed to an s-polarized, p-polarized, circularly polarized, or elliptically polarized beam. The phase structure may be placed at various locations in a waveguide display, such as at the input coupler region, between the input coupler and the output coupler, at the output coupler region, or any combinations.

Adding phase structures to waveguide displays can add more degrees of design freedom for optimizing the efficiencies of the waveguide display. For example, the location, the phase delay, the orientation, and other parameters of the phase structure may be selected to change the polarization state of the display light such that the display light may be more preferentially diffracted by the polarization-dependent gratings to desired diffraction orders and directions to reach user's eye eventually.

In the following description, various inventive embodiments are described, including devices, systems, methods, and the like. For the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example" is not necessarily to be construed as preferred or advantageous over other embodiments or designs.

FIG. 1 is a simplified block diagram of an example of an artificial reality system environment 100 including a near-eye display 120 in accordance with certain embodiments. Artificial reality system environment 100 shown in FIG. 1 may include near-eye display 120, an optional external imaging device 150, and an optional input/output interface 140, each of which may be coupled to an optional console 110. While FIG. 1 shows an example of artificial reality system environment 100 including one near-eye display 120, one external imaging device 150, and one input/output interface 140, any number of these components may be included in artificial reality system environment 100, or any of the components may be omitted. For example, there may be multiple near-eye displays 120 monitored by one or more external imaging devices 150 in communication with console 110. In some configurations, artificial reality system environment 100 may not include external imaging device 150, optional input/output interface 140, and optional console 110. In alternative configurations, different or additional components may be included in artificial reality system environment 100.

Near-eye display 120 may be a head-mounted display that presents content to a user. Examples of content presented by near-eye display 120 include one or more of images, videos, audio, or any combination thereof. In some embodiments, audio may be presented via an external device (e.g., speakers and/or headphones) that receives audio information from near-eye display 120, console 110, or both, and presents audio data based on the audio information. Near-eye display 120 may include one or more rigid bodies, which may be rigidly or non-rigidly coupled to each other. A rigid coupling between rigid bodies may cause the coupled rigid bodies to act as a single rigid entity. A non-rigid coupling between rigid bodies may allow the rigid bodies to move relative to each other. In various embodiments, near-eye display 120 may be implemented in any suitable form-factor, including a pair of glasses. Some embodiments of near-eye display 120 are further described below with respect to FIGS. 2 and 3. Additionally, in various embodiments, the functionality described herein may be used in a headset that combines images of an environment external to near-eye display 120 and artificial reality content (e.g., computer-generated images). Therefore, near-eye display 120 may augment images of a physical, real-world environment external to near-eye display 120 with generated content (e.g., images, video, sound, etc.) to present an augmented reality to a user.

In various embodiments, near-eye display 120 may include one or more of display electronics 122, display optics 124, and an eye-tracking unit 130. In some embodiments, near-eye display 120 may also include one or more locators 126, one or more position sensors 128, and an inertial measurement unit (IMU) 132. Near-eye display 120 may omit any of eye-tracking unit 130, locators 126, position sensors 128, and IU 132, or include additional elements in various embodiments. Additionally, in some embodiments, near-eye display 120 may include elements combining the function of various elements described in conjunction with FIG. 1.

Display electronics 122 may display or facilitate the display of images to the user according to data received from, for example, console 110. In various embodiments, display electronics 122 may include one or more display panels, such as a liquid crystal display (LCD), an organic light emitting diode (OLED) display, an inorganic light emitting diode (ILED) display, a micro light emitting diode (LED) display, an active-matrix OLED display (AMOLED), a transparent OLED display (TOLED), or some other display. For example, in one implementation of near-eye display 120, display electronics 122 may include a front TOLED panel, a rear display panel, and an optical component (e.g., an attenuator, polarizer, or diffractive or spectral film) between the front and rear display panels. Display electronics 122 may include pixels to emit light of a predominant color such as red, green, blue, white, or yellow. In some implementations, display electronics 122 may display a three-dimensional (3D) image through stereoscopic effects produced by two-dimensional panels to create a subjective perception of image depth. For example, display electronics 122 may include a left display and a right display positioned in front of a user's left eye and right eye, respectively. The left and right displays may present copies of an image shifted horizontally relative to each other to create a stereoscopic effect (e.g., a perception of image depth by a user viewing the image).

In certain embodiments, display optics 124 may display image content optically (e.g., using optical waveguides and couplers) or magnify image light received from display electronics 122, correct optical errors associated with the image light, and present the corrected image light to a user of near-eye display 120. In various embodiments, display optics 124 may include one or more optical elements, such as, for example, a substrate, optical waveguides, an aperture, a Fresnel lens, a convex lens, a concave lens, a filter, input/output couplers, or any other suitable optical elements that may affect image light emitted from display electronics 122. Display optics 124 may include a combination of different optical elements as well as mechanical couplings to maintain relative spacing and orientation of the optical elements in the combination. One or more optical elements in display optics 124 may have an optical coating, such as an anti-reflective coating, a reflective coating, a filtering coating, or a combination of different optical coatings.

Magnification of the image light by display optics 124 may allow display electronics 122 to be physically smaller, weigh less, and consume less power than larger displays. Additionally, magnification may increase a field of view of the displayed content. The amount of magnification of image light by display optics 124 may be changed by adjusting, adding, or removing optical elements from display optics 124. In some embodiments, display optics 124 may project displayed images to one or more image planes that may be further away from the user's eyes than near-eye display 120.

Display optics 124 may also be designed to correct one or more types of optical errors, such as two-dimensional optical errors, three-dimensional optical errors, or any combination thereof. Two-dimensional errors may include optical aberrations that occur in two dimensions. Example types of two-dimensional errors may include barrel distortion, pincushion distortion, longitudinal chromatic aberration, and transverse chromatic aberration. Three-dimensional errors may include optical errors that occur in three dimensions. Example types of three-dimensional errors may include spherical aberration, comatic aberration, field curvature, and astigmatism.

Locators 126 may be objects located in specific positions on near-eye display 120 relative to one another and relative to a reference point on near-eye display 120. In some implementations, console 110 may identify locators 126 in images captured by external imaging device 150 to determine the artificial reality headset's position, orientation, or both. A locator 126 may be an LED, a corner cube reflector, a reflective marker, a type of light source that contrasts with an environment in which near-eye display 120 operates, or any combination thereof. In embodiments where locators 126 are active components (e.g., LEDs or other types of light emitting devices), locators 126 may emit light in the visible band (e.g., about 380 nm to 750 nm), in the infrared (IR) band (e.g., about 750 nm to 1 mm), in the ultraviolet band (e.g., about 10 nm to about 380 nm), in another portion of the electromagnetic spectrum, or in any combination of portions of the electromagnetic spectrum.

External imaging device 150 may include one or more cameras, one or more video cameras, any other device capable of capturing images including one or more of locators 126, or any combination thereof. Additionally, external imaging device 150 may include one or more filters (e.g., to increase signal to noise ratio). External imaging device 150 may be configured to detect light emitted or reflected from locators 126 in a field of view of external imaging device 150. In embodiments where locators 126 include passive elements (e.g., retroreflectors), external imaging device 150 may include a light source that illuminates some or all of locators 126, which may retro-reflect the light to the light source in external imaging device 150. Slow calibration data may be communicated from external imaging device 150 to console 110, and external imaging device 150 may receive one or more calibration parameters from console 110 to adjust one or more imaging parameters (e.g., focal length, focus, frame rate, sensor temperature, shutter speed, aperture, etc.).

Position sensors 128 may generate one or more measurement signals in response to motion of near-eye display 120. Examples of position sensors 128 may include accelerometers, gyroscopes, magnetometers, other motion-detecting or error-correcting sensors, or any combination thereof. For example, in some embodiments, position sensors 128 may include multiple accelerometers to measure translational motion (e.g., forward/back, up/down, or left/right) and multiple gyroscopes to measure rotational motion (e.g., pitch, yaw, or roll). In some embodiments, various position sensors may be oriented orthogonally to each other.

IMU 132 may be an electronic device that generates fast calibration data based on measurement signals received from one or more of position sensors 128. Position sensors 128 may be located external to IMU 132, internal to IMU 132, or any combination thereof. Based on the one or more measurement signals from one or more position sensors 128, IMU 132 may generate fast calibration data indicating an estimated position of near-eye display 120 relative to an initial position of near-eye display 120. For example, IMU 132 may integrate measurement signals received from accelerometers over time to estimate a velocity vector and integrate the velocity vector over time to determine an estimated position of a reference point on near-eye display 120. Alternatively, IU 132 may provide the sampled measurement signals to console 110, which may determine the fast calibration data. While the reference point may generally be defined as a point in space, in various embodiments, the reference point may also be defined as a point within near-eye display 120 (e.g., a center of IU 132).

Eye-tracking unit 130 may include one or more eye-tracking systems. Eye tracking may refer to determining an eye's position, including orientation and location of the eye, relative to near-eye display 120. An eye-tracking system may include an imaging system to image one or more eyes and may optionally include a light emitter, which may generate light that is directed to an eye such that light reflected by the eye may be captured by the imaging system. For example, eye-tracking unit 130 may include a non-coherent or coherent light source (e.g., a laser diode) emitting light in the visible spectrum or infrared spectrum, and a camera capturing the light reflected by the user's eye. As another example, eye-tracking unit 130 may capture reflected radio waves emitted by a miniature radar unit. Eye-tracking unit 130 may use low-power light emitters that emit light at frequencies and intensities that would not injure the eye or cause physical discomfort. Eye-tracking unit 130 may be arranged to increase contrast in images of an eye captured by eye-tracking unit 130 while reducing the overall power consumed by eye-tracking unit 130 (e.g., reducing power consumed by a light emitter and an imaging system included in eye-tracking unit 130). For example, in some implementations, eye-tracking unit 130 may consume less than 100 milliwatts of power.

Near-eye display 120 may use the orientation of the eye to, e.g., determine an inter-pupillary distance (IPD) of the user, determine gaze direction, introduce depth cues (e.g., blur image outside of the user's main line of sight), collect heuristics on the user interaction in the VR media (e.g., time spent on any particular subject, object, or frame as a function of exposed stimuli), some other functions that are based in part on the orientation of at least one of the user's eyes, or any combination thereof. Because the orientation may be determined for both eyes of the user, eye-tracking unit 130 may be able to determine where the user is looking. For example, determining a direction of a user's gaze may include determining a point of convergence based on the determined orientations of the user's left and right eyes. A point of convergence may be the point where the two foveal axes of the user's eyes intersect. The direction of the user's gaze may be the direction of a line passing through the point of convergence and the mid-point between the pupils of the user's eyes.

Input/output interface 140 may be a device that allows a user to send action requests to console 110. An action request may be a request to perform a particular action. For example, an action request may be to start or to end an application or to perform a particular action within the application. Input/output interface 140 may include one or more input devices. Example input devices may include a keyboard, a mouse, a game controller, a glove, a button, a touch screen, or any other suitable device for receiving action requests and communicating the received action requests to console 110. An action request received by the input/output interface 140 may be communicated to console 110, which may perform an action corresponding to the requested action. In some embodiments, input/output interface 140 may provide haptic feedback to the user in accordance with instructions received from console 110. For example, input/output interface 140 may provide haptic feedback when an action request is received, or when console 110 has performed a requested action and communicates instructions to input/output interface 140. In some embodiments, external imaging device 150 may be used to track input/output interface 140, such as tracking the location or position of a controller (which may include, for example, an IR light source) or a hand of the user to determine the motion of the user. In some embodiments, near-eye display 120 may include one or more imaging devices to track input/output interface 140, such as tracking the location or position of a controller or a hand of the user to determine the motion of the user.

Console 110 may provide content to near-eye display 120 for presentation to the user in accordance with information received from one or more of external imaging device 150, near-eye display 120, and input/output interface 140. In the example shown in FIG. 1, console 110 may include an application store 112, a headset tracking module 114, an artificial reality engine 116, and an eye-tracking module 118. Some embodiments of console 110 may include different or additional modules than those described in conjunction with FIG. 1. Functions further described below may be distributed among components of console 110 in a different manner than is described here.

In some embodiments, console 110 may include a processor and a non-transitory computer-readable storage medium storing instructions executable by the processor. The processor may include multiple processing units executing instructions in parallel. The non-transitory computer-readable storage medium may be any memory, such as a hard disk drive, a removable memory, or a solid-state drive (e.g., flash memory or dynamic random access memory (DRAM)). In various embodiments, the modules of console 110 described in conjunction with FIG. 1 may be encoded as instructions in the non-transitory computer-readable storage medium that, when executed by the processor, cause the processor to perform the functions further described below.

Application store 112 may store one or more applications for execution by console 110. An application may include a group of instructions that, when executed by a processor, generates content for presentation to the user. Content generated by an application may be in response to inputs received from the user via movement of the user's eyes or inputs received from the input/output interface 140. Examples of the applications may include gaming applications, conferencing applications, video playback application, or other suitable applications.

Headset tracking module 114 may track movements of near-eye display 120 using slow calibration information from external imaging device 150. For example, headset tracking module 114 may determine positions of a reference point of near-eye display 120 using observed locators from the slow calibration information and a model of near-eye display 120. Headset tracking module 114 may also determine positions of a reference point of near-eye display 120 using position information from the fast calibration information. Additionally, in some embodiments, headset tracking module 114 may use portions of the fast calibration information, the slow calibration information, or any combination thereof, to predict a future location of near-eye display 120. Headset tracking module 114 may provide the estimated or predicted future position of near-eye display 120 to artificial reality engine 116.

Artificial reality engine 116 may execute applications within artificial reality system environment 100 and receive position information of near-eye display 120, acceleration information of near-eye display 120, velocity information of near-eye display 120, predicted future positions of near-eye display 120, or any combination thereof from headset tracking module 114. Artificial reality engine 116 may also receive estimated eye position and orientation information from eye-tracking module 118. Based on the received information, artificial reality engine 116 may determine content to provide to near-eye display 120 for presentation to the user. For example, if the received information indicates that the user has looked to the left, artificial reality engine 116 may generate content for near-eye display 120 that mirrors the user's eye movement in a virtual environment. Additionally, artificial reality engine 116 may perform an action within an application executing on console 110 in response to an action request received from input/output interface 140, and provide feedback to the user indicating that the action has been performed. The feedback may be visual or audible feedback via near-eye display 120 or haptic feedback via input/output interface 140.

Eye-tracking module 118 may receive eye-tracking data from eye-tracking unit 130 and determine the position of the user's eye based on the eye tracking data. The position of the eye may include an eye's orientation, location, or both relative to near-eye display 120 or any element thereof. Because the eye's axes of rotation change as a function of the eye's location in its socket, determining the eye's location in its socket may allow eye-tracking module 118 to more accurately determine the eye's orientation.

Figure 2:
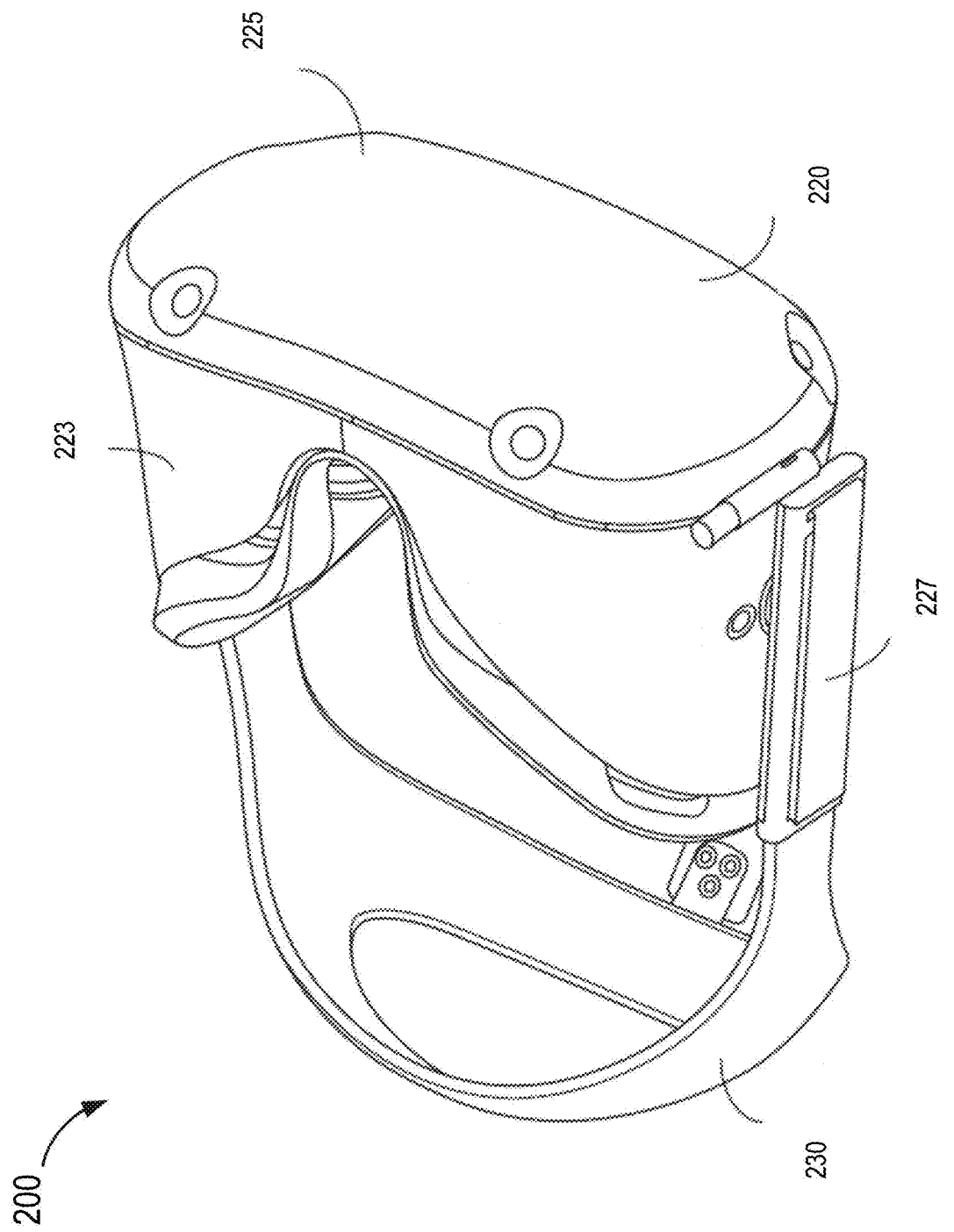
FIG. 2 is a perspective view of an example of a near-eye display system in the form of a head-mounted display (HMD) device for implementing some of the examples disclosed herein.

FIG. 2 is a perspective view of an example of a near-eye display in the form of an HMD device 200 for implementing some of the examples disclosed herein. HMD device 200 may be a part of, e.g., a VR system, an AR system, an MR system, or any combination thereof. HMD device 200 may include a body 220 and a head strap 230. FIG. 2 shows a bottom side 223, a front side 225, and a left side 227 of body 220 in the perspective view. Head strap 230 may have an adjustable or extendible length. There may be a sufficient space between body 220 and head strap 230 of HMD device 200 for allowing a user to mount HMD device 200 onto the user's head. In various embodiments, HMD device 200 may include additional, fewer, or different components. For example, in some embodiments, HMD device 200 may include eyeglass temples and temple tips as shown in, for example, FIG. 3 below, rather than head strap 230.

HMD device 200 may present to a user media including virtual and/or augmented views of a physical, real-world environment with computer-generated elements. Examples of the media presented by HMD device 200 may include images (e.g., two-dimensional (2D) or three-dimensional (3D) images), videos (e.g., 2D or 3D videos), audio, or any combination thereof. The images and videos may be presented to each eye of the user by one or more display assemblies (not shown in FIG. 2) enclosed in body 220 of HMD device 200. In various embodiments, the one or more display assemblies may include a single electronic display panel or multiple electronic display panels (e.g., one display panel for each eye of the user). Examples of the electronic display panel(s) may include, for example, an LCD, an OLED display, an ILED display, a μLED display, an AMO-LED, a TOLED, some other display, or any combination thereof. HM4D device 200 may include two eyebox regions.

In some implementations, HMD device 200 may include various sensors (not shown), such as depth sensors, motion sensors, position sensors, and eye tracking sensors. Some of these sensors may use a structured light pattern for sensing. In some implementations, HMD device 200 may include an input/output interface for communicating with a console. In some implementations, HMD device 200 may include a virtual reality engine (not shown) that can execute applications within HMD device 200 and receive depth information, position information, acceleration information, velocity information, predicted future positions, or any combination thereof of HMD device 200 from the various sensors. In some implementations, the information received by the virtual reality engine may be used for producing a signal (e.g., display instructions) to the one or more display assemblies. In some implementations, HMD device 200 may include locators (not shown, such as locators 126) located in fixed positions on body 220 relative to one another and relative to a reference point. Each of the locators may emit light that is detectable by an external imaging device.

Figure 3:
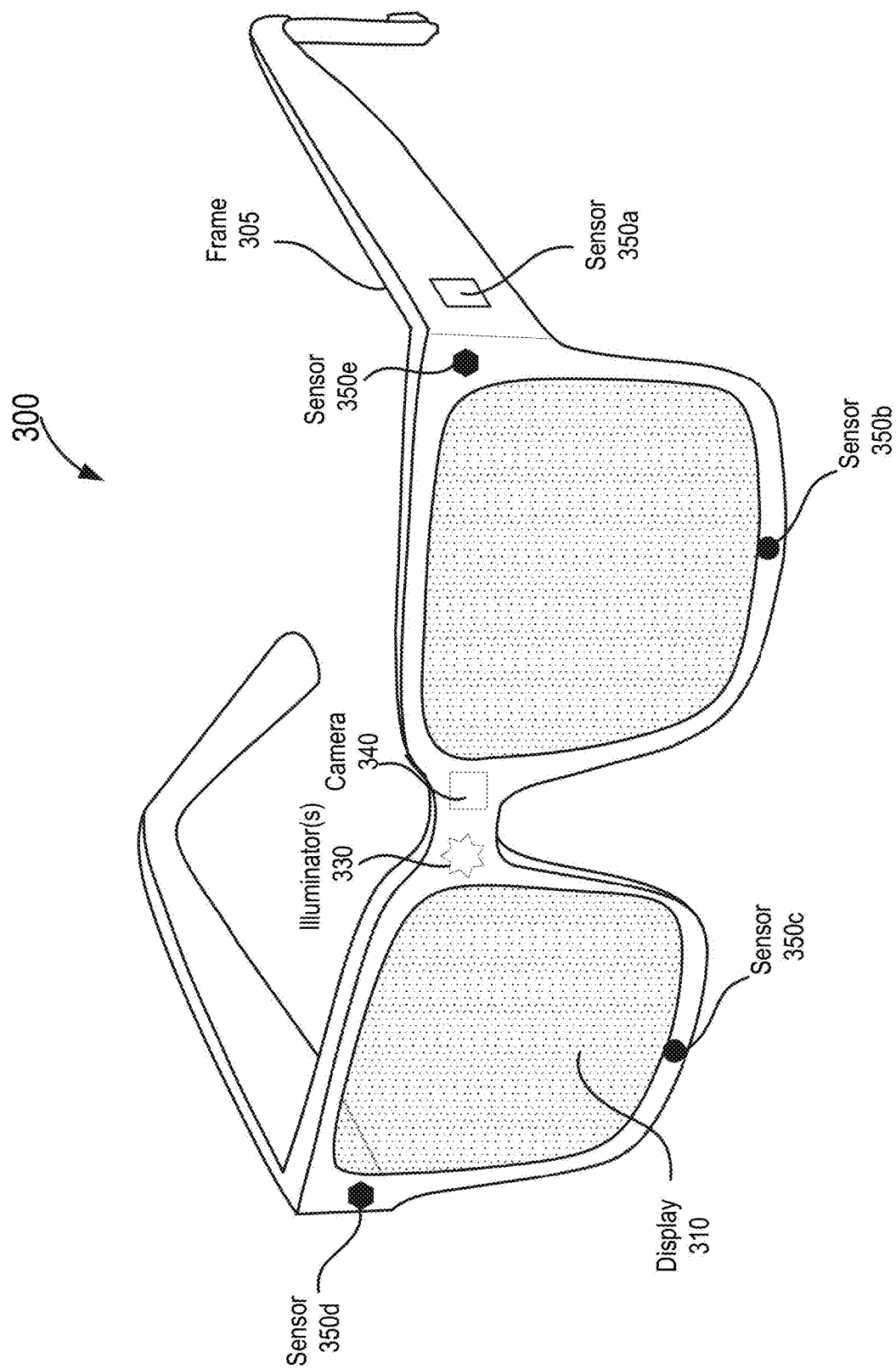
FIG. 3 is a perspective view of an example of a near-eye display system in the form of a pair of glasses for implementing some of the examples disclosed herein.

FIG. 3 is a perspective view of an example of a near-eye display 300 in the form of a pair of glasses for implementing some of the examples disclosed herein. Near-eye display 300 may be a specific implementation of near-eye display 120 of FIG. 1, and may be configured to operate as a virtual reality display, an augmented reality display, and/or a mixed reality display. Near-eye display 300 may include a frame 305 and a display 310. Display 310 may be configured to present content to a user. In some embodiments, display 310 may include display electronics and/or display optics. For example, as described above with respect to near-eye display 120 of FIG. 1, display 310 may include an LCD display panel, an LED display panel, or an optical display panel (e.g., a waveguide display assembly).

Near-eye display 300 may further include various sensors 350a, 350b, 350c, 350d, and 350e on or within frame 305. In some embodiments, sensors 350a-350e may include one or more depth sensors, motion sensors, position sensors, inertial sensors, or ambient light sensors. In some embodiments, sensors 350a-350e may include one or more image sensors configured to generate image data representing different regions in a field of views in different directions. In some embodiments, sensors 350a-350e may be used as input devices to control or influence the displayed content of near-eye display 300, and/or to provide an interactive VR/AR/MR experience to a user of near-eye display 300. In some embodiments, sensors 350a-350e may also be used for stereoscopic imaging.

In some embodiments, near-eye display 300 may further include one or more illuminators 330 to project light into the physical environment. The projected light may be associated with different frequency bands (e.g., visible light, infra-red light, ultra-violet light, etc.), and may serve various purposes. For example, illuminator(s) 330 may project light in a dark environment (or in an environment with low intensity of infra-red light, ultra-violet light, etc.) to assist sensors 350a-350e in capturing images of different objects within the dark environment. In some embodiments, illuminator(s) 330 may be used to project certain light pattern onto the objects within the environment. In some embodiments, illuminator(s) 330 may be used as locators, such as locators 126 described above with respect to FIG. 1.

In some embodiments, near-eye display 300 may also include a high-resolution camera 340. Camera 340 may capture images of the physical environment in the field of view. The captured images may be processed, for example, by a virtual reality engine (e.g., artificial reality engine 116 of FIG. 1) to add virtual objects to the captured images or modify physical objects in the captured images, and the processed images may be displayed to the user by display 310 for AR or MR applications.

Figure 4:
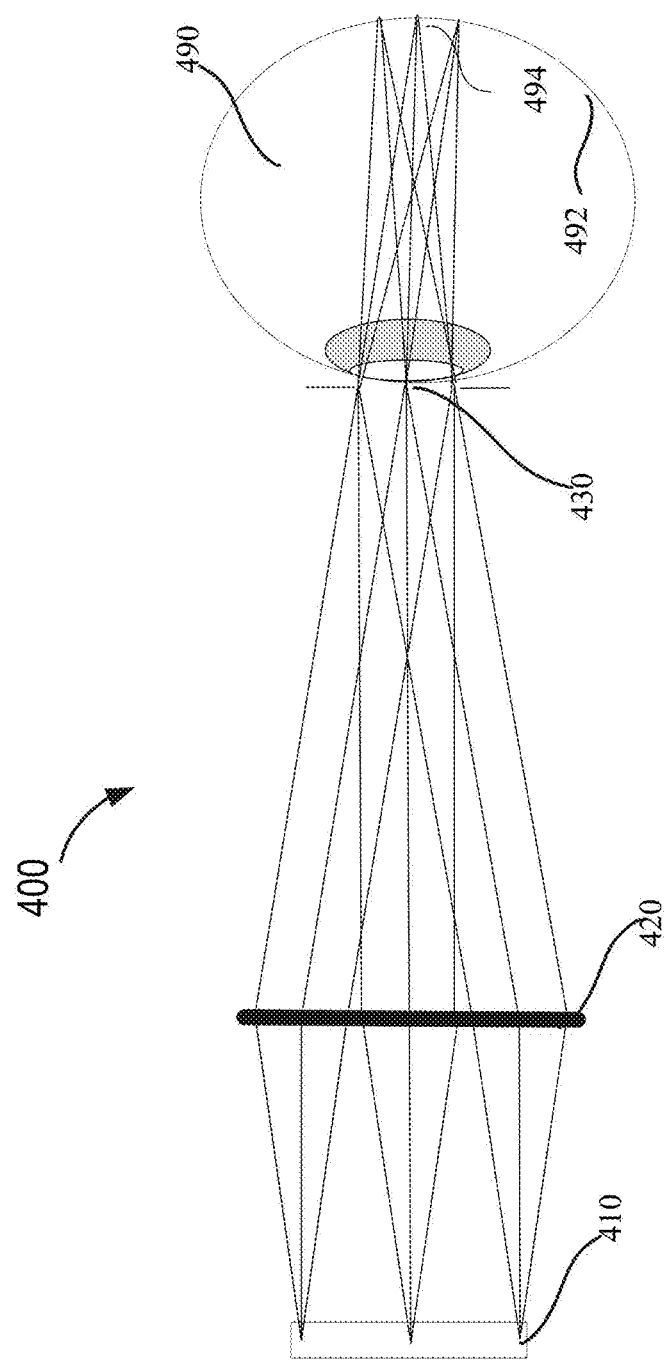
FIG. 4 is a simplified diagram illustrating an example of an optical system in a near-eye display system.

FIG. 4 is a simplified diagram illustrating an example of an optical system 400 in a near-eye display system. Optical system 400 may include an image source 410 and projector optics 420. In the example shown in FIG. 4, image source 410 is in front of projector optics 420. In various embodiments, image source 410 may be located outside of the field of view of user's eye 490. For example, one or more reflectors or directional couplers may be used to deflect light from an image source that is outside of the field of view of user's eye 490 to make the image source appear to be at the location of image source 410 shown in FIG. 4. Light from an area (e.g., a pixel or a light emitting device) on image source 410 may be collimated and directed to an exit pupil 430 by projector optics 420. Thus, objects at different spatial locations on image source 410 may appear to be objects far away from user's eye 490 in different viewing angles (FOVs). The collimated light from different viewing angles may then be focused by the lens of user's eye 490 onto different locations on retina 492 of user's eye 490. For example, at least some portions of the light may be focused on a fovea 494 on retina 492. Collimated light rays from an area on image source 410 and incident on user's eye 490 from a same direction may be focused onto a same location on retina 492. As such, a single image of image source 410 may be formed on retina 492.

The user experience of using an artificial reality system may depend on several characteristics of the optical system, including field of view (FOV), image quality (e.g., angular resolution), size of the eyebox (to accommodate for eye and head movements), and brightness of the light (or contrast) within the eyebox. Field of view describes the angular range of the image as seen by the user, usually measured in degrees as observed by one eye (for a monocular HMD) or both eyes (for either biocular or binocular HMDs). The human visual system may have a total binocular FOV of about 200° (horizontal) by 130° (vertical). To create a fully immersive visual environment, a large FOV is desirable because a large FOV (e.g., greater than about 60°) may provide a sense of "being in" an image, rather than merely viewing the image. Smaller fields of view may also preclude some important visual information. For example, an HMD system with a small FOV may use a gesture interface, but the users may not see their hands in the small FOV to be sure that they are using the correct motions. On the other hand, wider fields of view may require larger displays or optical systems, which may influence the size, weight, cost, and comfort of using the HMD.

Resolution may refer to the angular size of a displayed pixel or image element appearing to a user, or the ability for the user to view and correctly interpret an object as imaged by a pixel and/or other pixels. The resolution of an HMD may be specified as the number of pixels on the image source for a given FOV value, from which an angular resolution may be determined by dividing the FOV in one direction by the number of pixels in the same direction on the image source. For example, for a horizontal FOV of 400 and 1080 pixels in the horizontal direction on the image source, the corresponding angular resolution may be about 2.2 arc-minutes, compared with the one-arc-minute resolution associated with Snellen 20/20 human visual acuity.

In some cases, the eyebox may be a two-dimensional box in front of the user's eye, from which the displayed image from the image source may be viewed. If the pupil of the user moves outside of the eyebox, the displayed image may not be seen by the user. For example, in a non-pupil-forming configuration, there exists a viewing eyebox within which there will be unvignetted viewing of the HMD image source, and the displayed image may vignette or may be clipped but may still be viewable when the pupil of user's eye is outside of the viewing eyebox. In a pupil-forming configuration, the image may not be viewable outside the exit pupil.

The fovea of a human eye, where the highest resolution may be achieved on the retina, may correspond to an FOV of about 2° to about 3°. This may require that the eye rotates in order to view off-axis objects with a highest resolution. The rotation of the eye to view the off-axis objects may introduce a translation of the pupil because the eye rotates around a point that is about 10 mm behind the pupil. In addition, a user may not always be able to accurately position the pupil (e.g., having a radius of about 2.5 mm) of the user's eye at an ideal location in the eyebox. Furthermore, the environment where the HMD is used may require the eyebox to be larger to allow for movement of the user's eye and/or head relative the HMD, for example, when the HMD is used in a moving vehicle or designed to be used while the user is moving on foot. The amount of movement in these situations may depend on how well the HMD is coupled to the user's head.

Thus, the optical system of the HMD may need to provide a sufficiently large exit pupil or viewing eyebox for viewing the full FOV with full resolution, in order to accommodate the movements of the user's pupil relative to the HMD. For example, in a pupil-forming configuration, a minimum size of 12 mm to 15 mm may be desired for the exit pupil. If the eyebox is too small, minor misalignments between the eye and the HMD may result in at least partial loss of the image, and the user experience may be substantially impaired. In general, the lateral extent of the eyebox is more critical than the vertical extent of the eyebox. This may be in part due to the significant variances in eye separation distance between users, and the fact that misalignments to eyewear tend to more frequently occur in the lateral dimension and users tend to more frequently adjust their gaze left and right, and with greater amplitude, than adjusting the gaze up and down. Thus, techniques that can increase the lateral dimension of the eyebox may substantially improve a user's experience with an HID. On the other hand, the larger the eyebox, the larger the optics and the heavier and bulkier the near-eye display device may be.

In order to view the displayed image against a bright background, the image source of an AR HMD may need to be sufficiently bright, and the optical system may need to be efficient to provide a bright image to the user's eye such that the displayed image may be visible in a background including strong ambient light, such as sunlight. The optical system of an HMD may be designed to concentrate light in the eyebox. When the eyebox is large, an image source with high power may be used to provide a bright image viewable within the large eyebox. Thus, there may be trade-offs among the size of the eyebox, cost, brightness, optical complexity, image quality, and size and weight of the optical system.

Figure 5:
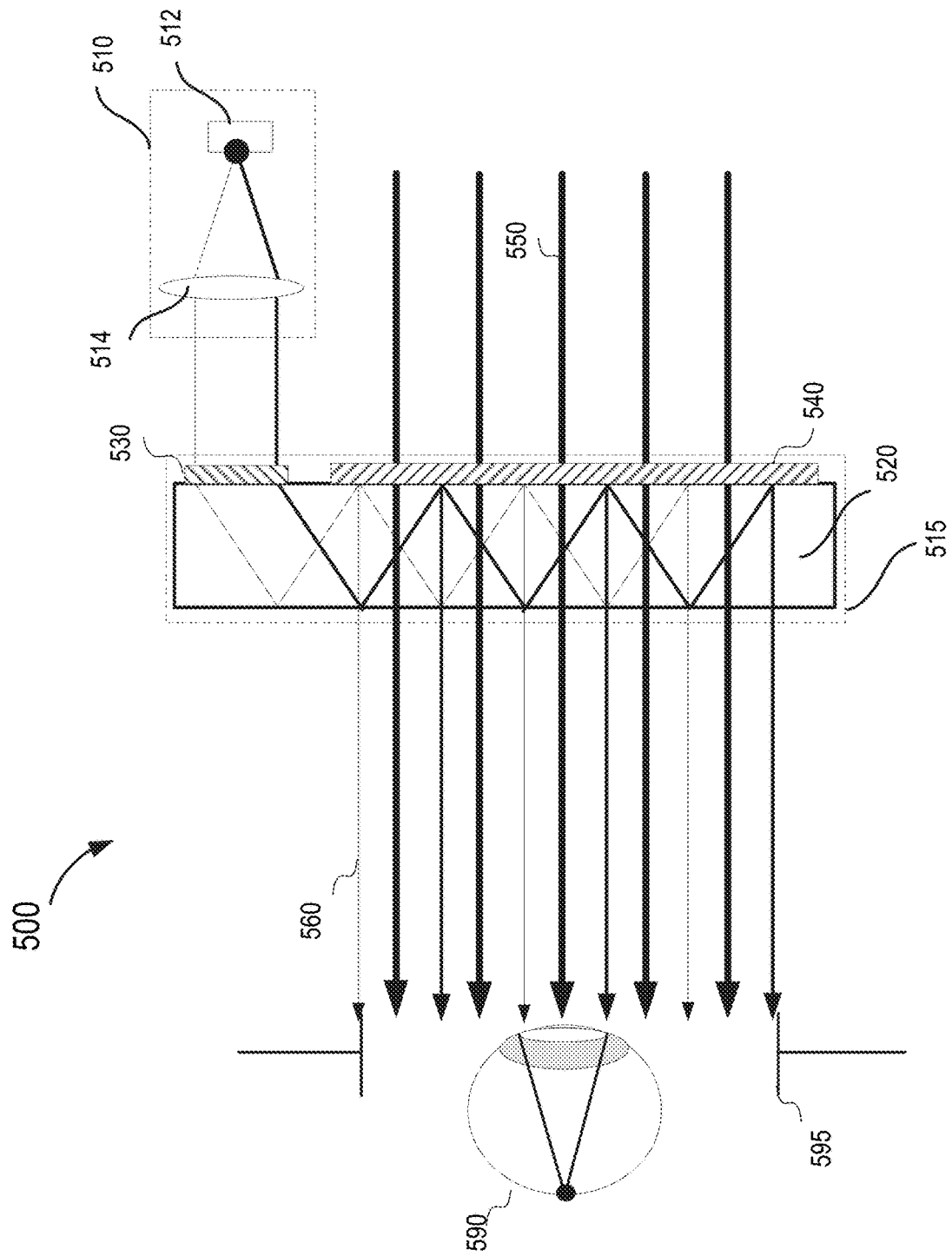
FIG. 5 illustrates an example of an optical see-through augmented reality system including a waveguide display for exit pupil expansion according to certain embodiments.

FIG. 5 illustrates an example of an optical see-through augmented reality system 500 including a waveguide display for exit pupil expansion according to certain embodiments. Augmented reality system 500 may include a projector 510 and a combiner 515. Projector 510 may include a light source or image source 512 and projector optics 514. In some embodiments, light source or image source 512 may include one or more micro-LED devices. In some embodiments, image source 512 may include a plurality of pixels that displays virtual objects, such as an LCD display panel or an LED display panel. In some embodiments, image source 512 may include a light source that generates coherent or partially coherent light. For example, image source 512 may include a laser diode, a vertical cavity surface emitting laser, an LED, a superluminescent LED (sLED), and/or a micro-LED described above. In some embodiments, image source 512 may include a plurality of light sources (e.g., an array of micro-LEDs described above) each emitting a monochromatic image light corresponding to a primary color (e.g., red, green, or blue). In some embodiments, image source 512 may include three two-dimensional arrays of micro-LEDs, where each two-dimensional array of micro-LEDs may include micro-LEDs configured to emit light of a primary color (e.g., red, green, or blue). In some embodiments, image source 512 may include an optical pattern generator, such as a spatial light modulator. Projector optics 514 may include one or more optical components that can condition the light from image source 512, such as expanding, collimating, scanning, or projecting light from image source 512 to combiner 515. The one or more optical components may include, for example, one or more lenses, liquid lenses, mirrors, free-form optics, apertures, and/or gratings. For example, in some embodiments, image source 512 may include one or more one-dimensional arrays or elongated two-dimensional arrays of micro-LEDs, and projector optics 514 may include one or more one-dimensional scanners (e.g., micro-mirrors or prisms) configured to scan the one-dimensional arrays or elongated two-dimensional arrays of micro-LEDs to generate image frames. In some embodiments, projector optics 514 may include a liquid lens (e.g., a liquid crystal lens) with a plurality of electrodes that allows scanning of the light from image source 512.

Combiner 515 may include an input coupler 530 for coupling light from projector 510 into a substrate 520 of combiner 515. Input coupler 530 may include a volume holographic grating or another diffractive optical element (DOE) (e.g., a surface-relief grating (SRG)), a slanted reflective surface of substrate 520, or a refractive coupler (e.g., a wedge or a prism). For example, input coupler 530 may include a reflective volume Bragg grating or a transmission volume Bragg grating. Input coupler 530 may have a coupling efficiency of greater than 30%, 50%, 75%, 90%, or higher for visible light. Light coupled into substrate 520 may propagate within substrate 520 through, for example, total internal reflection (TIR). Substrate 520 may be in the form of a lens of a pair of eyeglasses. Substrate 520 may have a flat or a curved surface, and may include one or more types of dielectric materials, such as glass, quartz, plastic, polymer, poly(methyl methacrylate) (PMMA), crystal, ceramic, or the like. A thickness of the substrate may range from, for example, less than about 1 mm to about 10 mm or more. Substrate 520 may be transparent to visible light.

Substrate 520 may include or may be coupled to a plurality of output couplers 540 each configured to extract at least a portion of the light guided by and propagating within substrate 520 from substrate 520, and direct extracted light 560 to an eyebox 595 where an eye 590 of the user of augmented reality system 500 may be located when augmented reality system 500 is in use. The plurality of output couplers 540 may replicate the exit pupil to increase the size of eyebox 595, such that the displayed image may be visible in a larger area. As input coupler 530, output couplers 540 may include grating couplers (e.g., volume holographic gratings or surface-relief gratings), other diffraction optical elements (DOEs), prisms, etc. For example, output couplers 540 may include reflective volume Bragg gratings or transmission volume Bragg gratings. Output couplers 540 may have different coupling (e.g., diffraction) efficiencies at different locations. Substrate 520 may also allow light 550 from the environment in front of combiner 515 to pass through with little or no loss. Output couplers 540 may also allow light 550 to pass through with little loss. For example, in some implementations, output couplers 540 may have a very low diffraction efficiency for light 550 such that light 550 may be refracted or otherwise pass through output couplers 540 with little loss, and thus may have a higher intensity than extracted light 560. In some implementations, output couplers 540 may have a high diffraction efficiency for light 550 and may diffract light 550 in certain desired directions (i.e., diffraction angles) with little loss. As a result, the user may be able to view combined images of the environment in front of combiner 515 and images of virtual objects projected by projector 510. In some implementations, output couplers 540 may have a high diffraction efficiency for light 550 and may diffract light 550 to certain desired directions (e.g., diffraction angles) with little loss.

In some embodiments, projector 510, input coupler 530, and output coupler 540 may be on any side of substrate 520. Input coupler 530 and output coupler 540 may be reflective gratings (also referred to as reflective gratings) or transmissive gratings (also referred to as transmission gratings) to couple display light into or out of substrate 520.

Figure 6:
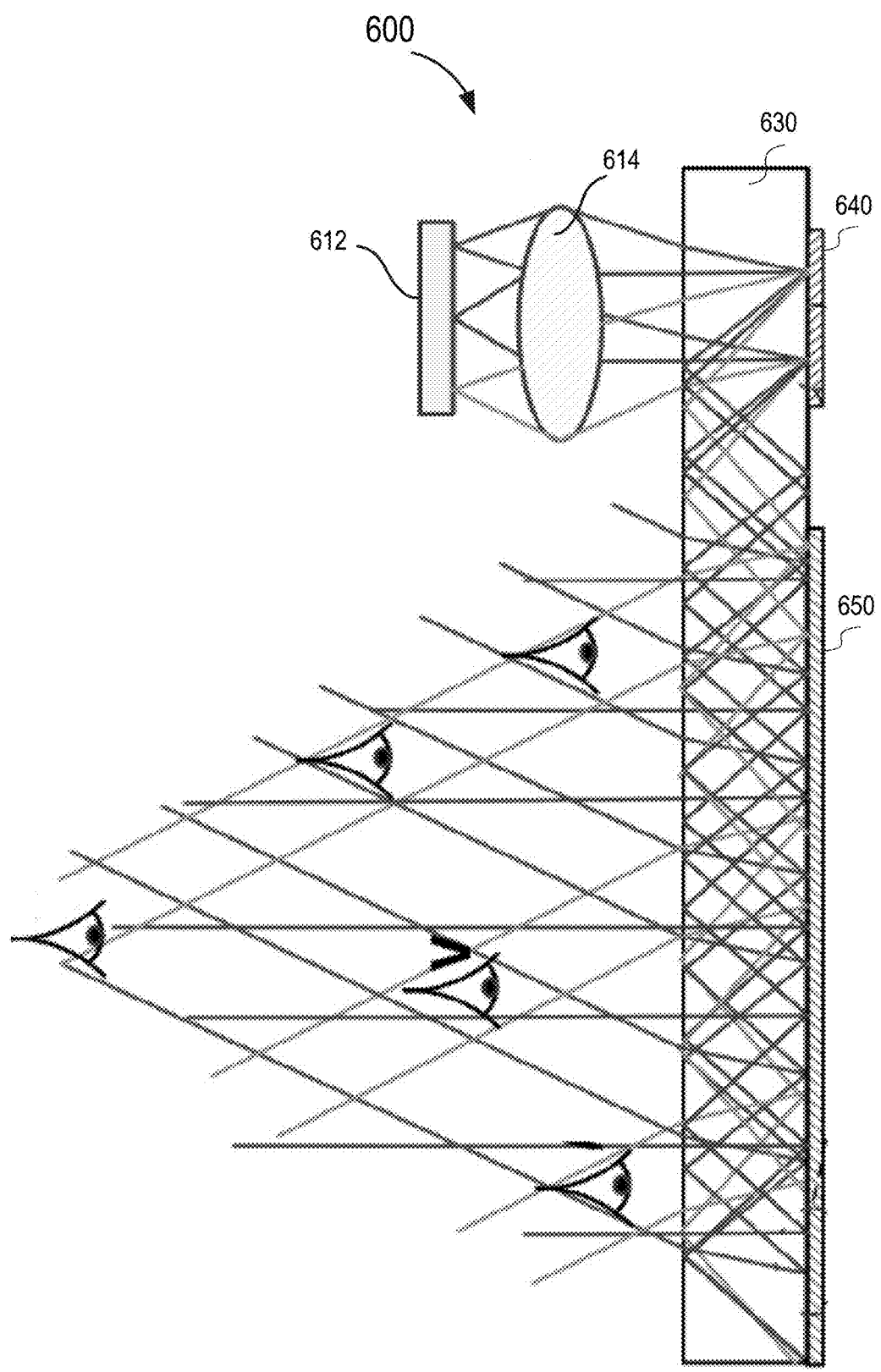
FIG. 6 illustrates an example of an optical see-through augmented reality system including a waveguide display for exit pupil expansion according to certain embodiments.

FIG. 6 illustrates an example of an optical see-through augmented reality system 600 including a waveguide display for exit pupil expansion according to certain embodiments. Augmented reality system 600 may be similar to augmented reality system 500, and may include the waveguide display and a projector that may include a light source or image source 612 and projector optics 614. The waveguide display may include a substrate 630, an input coupler 640, and a plurality of output couplers 650 as described above with respect to augmented reality system 500. While FIG. 5 only shows the propagation of light from a single field of view, FIG. 6 shows the propagation of light from multiple fields of view.

FIG. 6 shows that the exit pupil is replicated by output couplers 650 to form an aggregated exit pupil or eyebox, where different regions in a field of view (e.g., different pixels on image source 612) may be associated with different respective propagation directions towards the eyebox, and light from a same field of view (e.g., a same pixel on image source 612) may have a same propagation direction for the different individual exit pupils. Thus, a single image of image source 612 may be formed by the user's eye located anywhere in the eyebox, where light from different individual exit pupils and propagating in the same direction may be from a same pixel on image source 612 and may be focused onto a same location on the retina of the user's eye. FIG. 6 shows that the image of the image source is visible by the user's eye even if the user's eye moves to different locations in the eyebox.

In many waveguide-based near-eye display systems, in order to expand the eyebox of the waveguide-based near-eye display in two dimensions, two or more output gratings may be used to expand the display light in two dimensions or along two axes (which may be referred to as dual-axis pupil expansion). The two gratings may have different grating parameters, such that one grating may be used to replicate the exit pupil in one direction and the other grating may be used to replicate the exit pupil in another direction.

As described above, the input and output grating couplers described above can be volume holographic gratings or surface-relief gratings, which may have very different Klein-Cook parameter Q:

$$Q = 2\pi \lambda d / n \Lambda^2,$$

where d is the thickness of the grating, $\lambda$ is the wavelength of the incident light in free space, $\Lambda$ is the grating period, and n is the refractive index of the recording medium. The Klein-Cook parameter Q may divide light diffraction by gratings into three regimes. When a grating is characterized by $Q \ll 1$, light diffraction by the grating may be referred to as Raman-Nath diffraction, where multiple diffraction orders may occur for normal and/or oblique incident light. When a grating is characterized by $Q \gg 1$ (e.g., $Q \geq 10$), light diffraction by the grating may be referred to as Bragg diffraction, where generally only the zeroth and the $\pm 1$ diffraction orders may occur for light incident on the grating at an angle satisfying the Bragg condition. When a grating is characterized by $Q \approx 1$, the diffraction by the grating may be between the Raman-Nath diffraction and the Bragg diffraction. To meet Bragg conditions, the thickness d of the grating may be higher than certain values to occupy a volume (rather than at a surface) of a medium, and thus may be referred to as a volume Bragg grating. VBGs may generally have relatively small refractive index modulations (e.g., $\Delta n \leq 0.05$) and high spectral and angular selectivity, while surface-relief gratings may generally have large refractive index modulations (e.g., $\Delta n \geq 0.5$) and wide spectral and angular bandwidths.

Figure 7A:
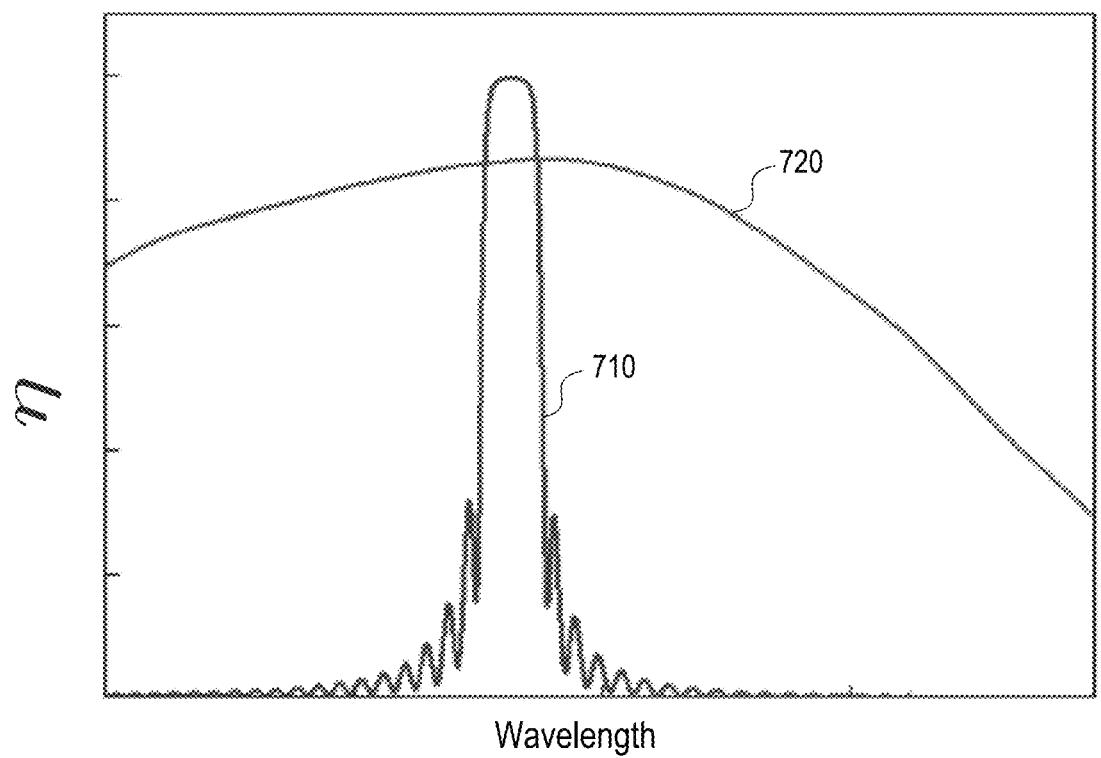
FIG. 7A illustrates the spectral bandwidth of an example of a reflective volume Bragg grating (VBG) and the spectral bandwidth of an example of a transmissive surface-relief grating (SRG).

FIG. 7A illustrates the spectral bandwidth of an example of a volume Bragg grating (e.g., a reflective VBG) and the spectral bandwidth of an example of a surface-relief grating (e.g., a transmissive SRG). The horizontal axis represents the wavelength of the incident visible light and the vertical axis corresponds to the diffraction efficiency. As shown by a curve 710, the diffraction efficiency of the reflective VBG is high in a narrow wavelength range, such as green light. In contrast, the diffraction efficiency of the transmissive SRG may be high in a very wide wavelength range, such as from blue to red light, as shown by a curve 720.

Figure 7B:
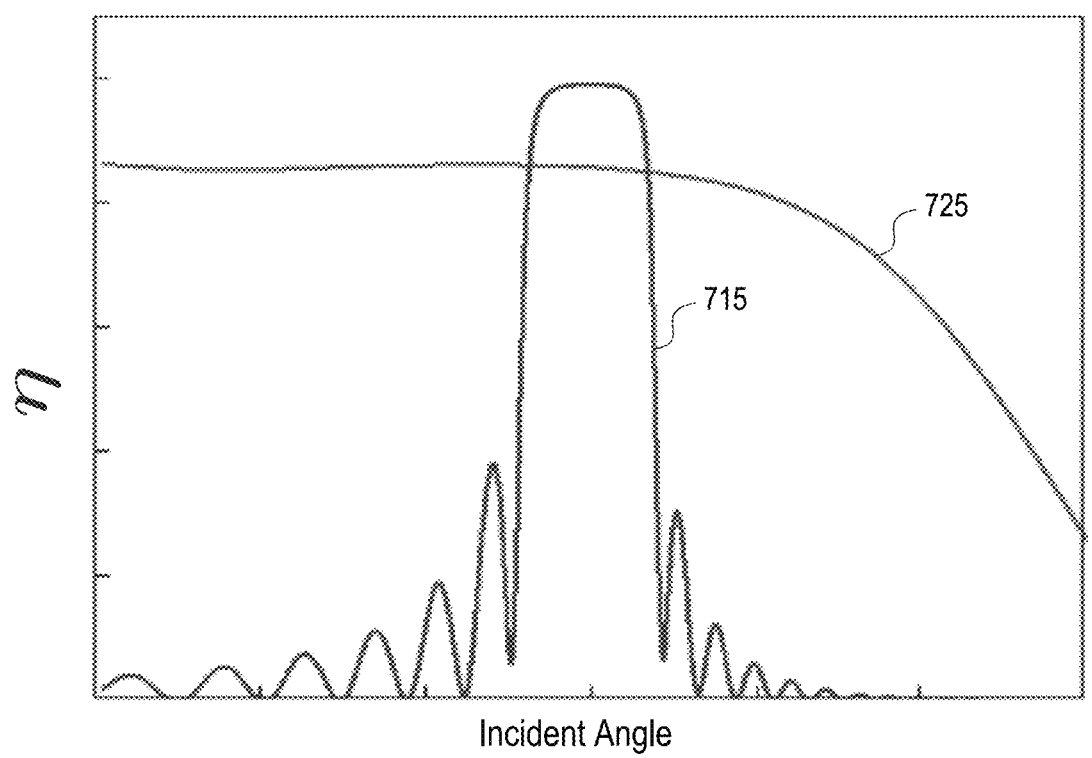
FIG. 7B illustrates the angular bandwidth of an example of a reflective VBG and the angular bandwidth of an example of a transmissive SRG.

FIG. 7B illustrates the angular bandwidth of an example of a volume Bragg grating (e.g., a reflective VBG) and the angular bandwidth of an example of a surface-relief grating (e.g., a transmissive SRG). The horizontal axis represents the incident angle of the visible light incident on the grating, and the vertical axis corresponds to the diffraction efficiency. As shown by a curve 715, the diffraction efficiency of the reflective VBG is high for light incident on the grating from a narrow angular range, such as about $\pm 2.5°$ from the perfect Bragg condition. In contrast, the diffraction efficiency of the transmissive SRG is high in a very wide angular range, such as greater than about $\pm 10°$ or wider, as shown by a curve 725.

Due to the high spectral selectivity at the Bragg condition, VBGs, such as reflective VBGs, may allow for single-waveguide design without crosstalk between primary colors, and may exhibit superior see-through quality. However, the spectral and angular selectivity may lead to lower efficiency because only a portion of the display light in the full FOV may be diffracted and reach user's eyes.

FIG. 8A illustrates an example of an optical see-through augmented reality system including a waveguide display 800 and surface-relief gratings for exit pupil expansion according to certain embodiments. Waveguide display 800 may include a substrate 810 (e.g., a waveguide), which may be similar to substrate 520. Substrate 810 may be transparent to visible light and may include, for example, a glass, quartz, plastic, polymer, PMMA, ceramic, $Si_3N_4$, or crystal substrate. Substrate 810 may be a flat substrate or a curved substrate. Substrate 810 may include a first surface 812 and a second surface 814. Display light may be coupled into substrate 810 by an input coupler 820, and may be reflected by first surface 812 and second surface 814 through total internal reflection, such that the display light may propagate within substrate 810. Input coupler 820 may include a grating, a refractive coupler (e.g., a wedge or a prism), or a reflective coupler (e.g., a reflective surface having a slant angle with respect to substrate 810). For example, in one embodiment, input coupler 820 may include a prism that may couple display light of different colors into substrate 810 at a same refraction angle. In another example, input coupler 820 may include a grating coupler that may diffract light of different colors into substrate 810 at different directions. Input coupler 820 may have a coupling efficiency of greater than 10%, 20%, 30%, 50%, 75%, 90%, or higher for visible light.

Waveguide display 800 may also include a first output grating 830 and a second output grating 840 positioned on one or two surfaces (e.g., first surface 812 and second surface 814) of substrate 810 for expanding incident display light beam in two dimensions in order to fill an eyebox 850 with the display light. First output grating 830 may be configured to expand at least a portion of the display light beam along one direction, such as approximately in the x direction. Display light coupled into substrate 810 may propagate in a direction shown by a line 832. While the display light propagates within substrate 810 along a direction shown by line 832, a portion of the display light may be diffracted by a region of first output grating 830 towards second output grating 840 as shown by a line 834 each time the display light propagating within substrate 810 reaches first output grating 830. Second output grating 840 may then expand the display light from first output grating 830 in a different direction (e.g., approximately in the y direction) by diffracting a portion of the display light to eyebox 850 each time the display light propagating within substrate 810 reaches second output grating 840.

FIG. 8B illustrates an example of an eye box including two-dimensional replicated exit pupils. FIG. 8B shows that a single input pupil 805 may be replicated by first output grating 830 and second output grating 840 to form an aggregated exit pupil 860 that includes a two-dimensional array of individual exit pupils 862. For example, the exit pupil may be replicated in approximately the x direction by first output grating 830 and in approximately the y direction by second output grating 840. As described above, output light from individual exit pupils 862 and propagating in a same direction may be focused onto a same location in the retina of the user's eye. Thus, a single image may be formed by the user's eye from the output light in the two-dimensional array of individual exit pupils 862.

Figure 9:
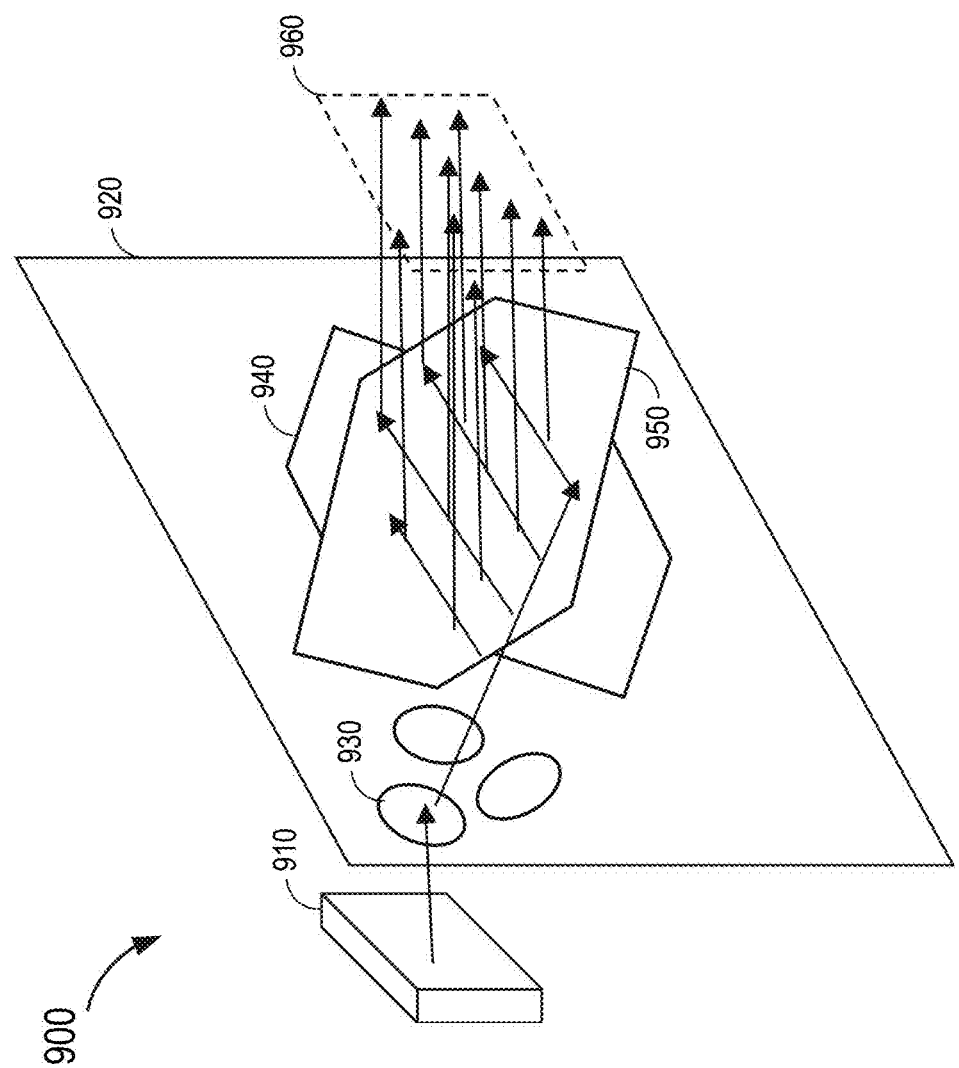
FIG. 9 illustrates an example of a waveguide display with grating couplers for exit pupil expansion according to certain embodiments.

FIG. 9 is a perspective view of an example of a waveguide display 900 with grating couplers for exit pupil expansion according to certain embodiments. Waveguide display 900 may be an example of waveguide display 800. Waveguide display 900 may include a light source 910, which may include, for example, an array of red micro-LEDs, an array of green micro-LEDs, and an array of blue micro-LEDs. Each array of micro-LEDs may generate an image of a corresponding color, and thus the three arrays of micro-LEDs may generate a color image. Waveguide display 900 may include a substrate 920 with grating couplers formed thereon or coupled thereto. For example, waveguide display 900 may include three input gratings 930, where each input grating 930 may be used to couple display light of a monochromatic image generated by a corresponding array of micro-LEDs into substrate 920. The display light coupled into substrate 920 may propagate within substrate 920 through total internal reflection at the surfaces of substrate 920, and may be diffracted at multiple locations along a first direction by a first output grating 940, which may replicate the input pupil along the first direction. The display light diffracted at different locations of first output grating 940 may reach a second output grating 950, which may diffract the display light at different locations along a second direction to replicate the input pupil along the second direction as described above. The diffracted light may then propagate towards an eyebox 960.

In waveguide display 900, input gratings 930, first output grating 940, and second output grating 950 may include, for example, SRG gratings formed at different locations on surfaces of substrate 920, such as on two opposite broad surfaces of substrate 920. The grating vectors of an input grating 930, first output grating 940, and second output grating 950 may form a closed triangle.

Figure 10:
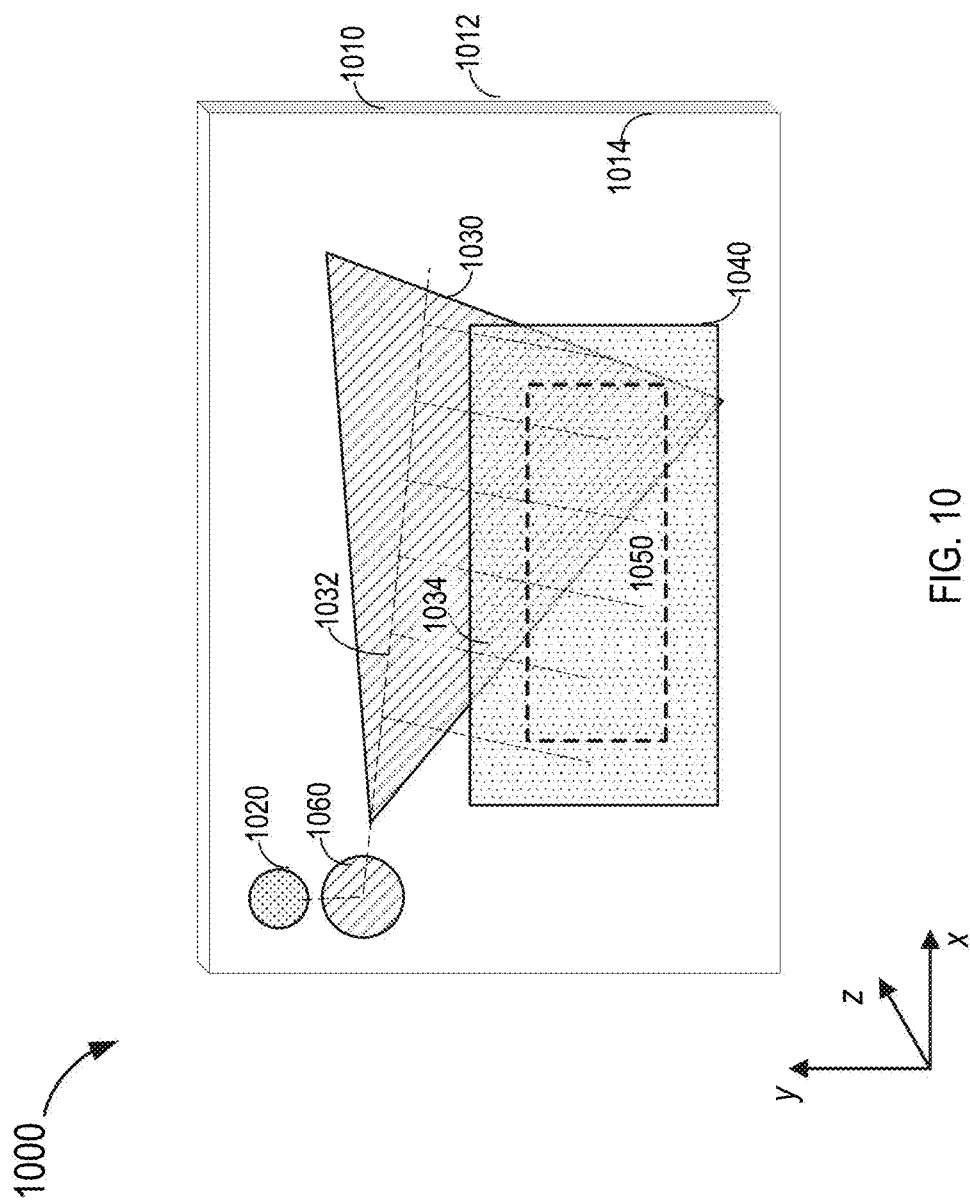
FIG. 10 illustrates another example of a VBG-based waveguide display according to certain embodiments.

FIG. 10 illustrates an example of a volume Bragg grating-based waveguide display 1000 with exit pupil expansion, dispersion reduction, and form-factor reduction according to certain embodiments. Waveguide display 1000 may include a substrate 1010 that includes a first broad surface 1012 and a second broad surface 1014. Display light from a light source (e.g., LEDs) may be coupled into substrate 1010 by an input coupler 1020, and may be reflected by first broad surface 1012 and second broad surface 1014 through total internal reflection, such that the display light may propagate within substrate 1010. Input coupler 1020 may include a diffractive coupler (e.g., a volume holographic grating) and may couple display light of different colors into substrate 1010 at different diffraction angles.

Waveguide display 1000 may also include a first output grating 1030 and a second output grating 1040 formed on first broad surface 1012 and/or second broad surface 1014. For example, first output grating 1030 and second output grating 1040 may be formed on a same broad surface or two different broad surfaces of substrate 1010. Second output grating 1040 may be formed in the see-through region of the waveguide display and may overlap with an eyebox 1050 when viewed in the z direction (e.g., at a distance about 18 mm from second output grating 1040 in +z or −z direction). First output grating 1030 and second output grating 1040 may be multiplexed VBG gratings that include many VBGs and may be used for dual-axis pupil expansion to expand the incident display light beam in two dimensions to fill eyebox 1050 with the display light. First output grating 1030 may be a transmission grating or a reflective grating. Second output grating 1040 may include a transmission grating to at least partially overlap with first output grating 1030 and reduce the form factor of waveguide display 1000.

In addition, waveguide display 1000 may include a third grating 1060 formed on first broad surface 1012 or second broad surface 1014. In some embodiments, third grating 1060 and first output grating 1030 may be on a same broad surface of substrate 1010. In some embodiments, third grating 1060 and first output grating 1030 may be in different regions of a same grating or a same grating material layer. In some embodiments, third grating 1060 may be spatially separate from first output grating 1030. In some embodiments, third grating 1060 and first output grating 1030 may be recorded in a same number of exposures and under similar recording conditions (but may be recorded for different exposure durations to achieve different diffraction efficiencies), such that each VBG in third grating 1060 may match a respective VBG in first output grating 1030 (e.g., having the same grating vector in the x-y plane and having the same and/or opposite grating vectors in the z direction). For example, in some embodiments, a VBG in third grating 1060 and a corresponding VBG in first output grating 1030 may have the same grating period and the same grating slant angle (and thus the same grating vector), and the same thickness. In one embodiment, third grating 1060 and first output grating 1030 may have a thickness about 20 μm and may each include about 40 or more VBGs recorded through about 40 or more exposures. In some embodiments, second output grating 1040 may have a thickness about 20 μm or higher, and may include about 50 or more VBGs recorded through about 50 or more exposures.

Input coupler 1020 may couple the display light from the light source into substrate 1010. The display light may reach third grating 1060 directly or may be reflected by first broad surface 1012 and/or second broad surface 1014 to third grating 1060, where the size of the display light beam may be slightly larger than that at input coupler 1020. Each VBG in third grating 1060 may diffract a portion of the display light within a FOV range and a wavelength range that approximately satisfies the Bragg condition of the VBG to first output grating 1030. While the display light diffracted by a VBG in third grating 1060 propagates within substrate 1010 (e.g., along a direction shown by a line 1032) through total internal reflection, a portion of the display light may be diffracted by the corresponding VBG in first output grating 1030 towards second output grating 1040 each time the display light propagating within substrate 1010 reaches first output grating 1030. Second output grating 1040 may then expand the display light from first output grating 1030 in a different direction by diffracting a portion of the display light to eyebox 1050 each time the display light propagating within substrate 1010 reaches second output grating 1040.

Because each VBG in third grating 1060 matches a respective VBG in first output grating 1030 (e.g., having the same grating vector in the x-y plane and having the same and/or opposite grating vector in the z direction), and the two matching VBGs work under opposite Bragg conditions (e.g., +1 order diffraction versus −1 order diffraction) due to the opposite propagation directions of the display light at the two matching VBGs. For example, as shown in FIG. 10, the VBG in third grating 1060 may change the propagation direction of the display light from a downward direction to a rightward direction, while the matching VBG in first output grating 1030 may change the propagation direction of the display light from a rightward direction to a downward direction. Thus, the dispersion caused by first output grating 1030 may be opposite to the dispersion caused by third grating 1060, thereby reducing or minimizing the overall dispersion. In some embodiments, the dispersion caused by input coupler 1020 may be opposite to the dispersion caused by second output grating 1040, thereby reducing or minimizing the overall dispersion.

Because first output grating 1030 and second output grating 1040 may have a small number (e.g., no greater than 50) of VBGs and exposures, first output grating 1030 may also be placed in the see-through region to overlap with second output grating 1040, thus reducing the size of the waveguide display. The total number of VBGs and exposures in a given see-through region may be less than, for example, 100 or fewer (e.g., no more than about 40 in first output grating 1030 and no more than 50 in second output grating 1040). Thus, the display haze may be low.

In the examples of waveguide displays described above, couplers implemented using diffractive optical elements may have limited coupling efficiencies due to, for example, less than 100% diffraction efficiency to the desired diffraction order, leakage, crosstalk, polarization dependence, angular dependence, wavelength dependence, and the like. For example, in waveguide displays using SRG couplers or VBG couplers, the display light coupled into the waveguide by an input coupler may be reflected back to the input coupler and may be at least partially diffracted by the input coupler as leakage light to undesired directions. In addition, the diffraction efficiencies of SRGs and VBGs may be polarization dependent. For example, the diffraction efficiencies of VBGs may be close to zero for p-polarized light with incident angles near or at the Brewster's angle. In another example, the diffraction efficiency of an SRG for a first linearly polarized light (e.g., s-polarized light) may be higher than the diffraction efficiency of the SRG for a second linearly polarized light (e.g., p-polarized light), and thus there may be higher leakage for the first linearly polarized light (e.g., s-polarized light) due to the higher diffraction efficiency of the SRG for the first linearly polarized light.

Figure 11B:
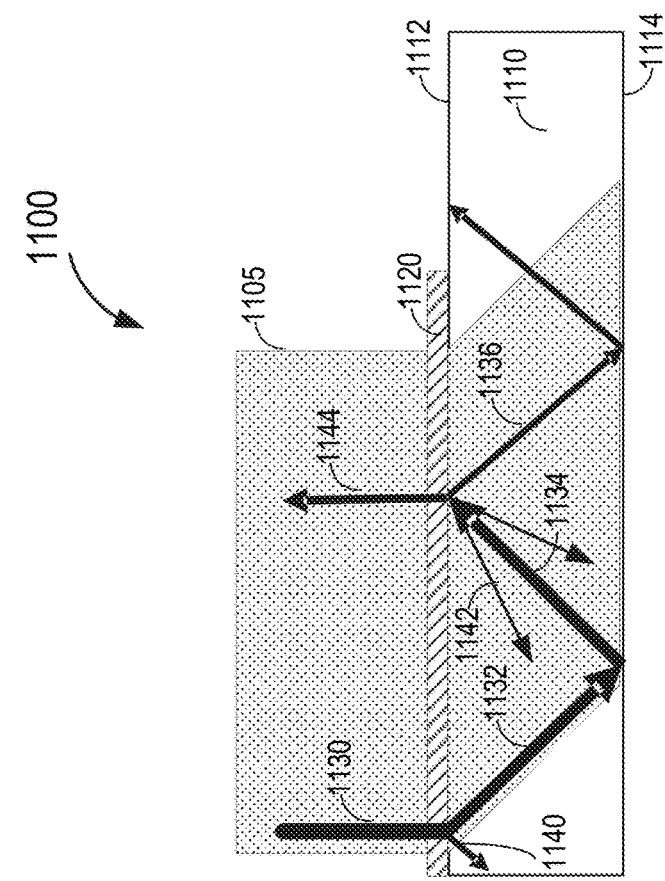
FIG. 11B illustrates examples of undesired light diffraction by an example of a grating coupler in a waveguide display.
Figure 11A:
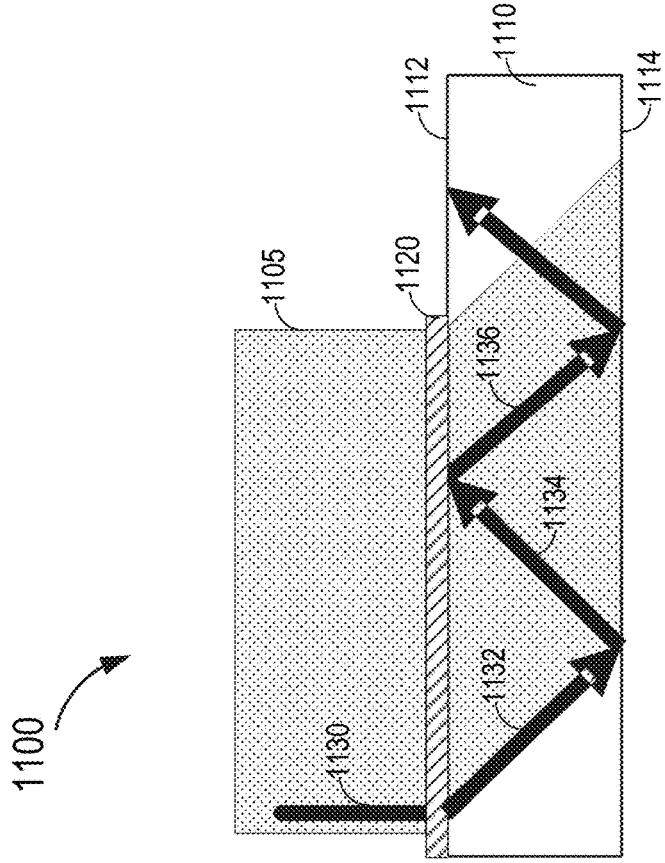
FIG. 11A illustrates an example of a grating coupler for coupling display light into a waveguide display.

FIG. 11A illustrates an example of a grating coupler 1120 for coupling display light into a waveguide 1110 of a waveguide display 1100. Grating coupler 1120 may have a finite area to receive an incident light beam 1105 having a finite beam width. FIG. 11A shows the desired optical path of an incident light beam 1130. Grating coupler 1120 on a top surface 1112 of waveguide 1110 may diffract incident light beam 1130 into a first diffraction order 1132 having a certain diffraction angle. First diffraction order 1132 may propagate in waveguide 1110 and reach a bottom surface 1114 of waveguide 1110. Bottom surface 1114 of waveguide 1110 may reflect all first diffraction order 1132 back towards grating coupler 1120 as shown by a light beam 1134 due to total internal reflection. It may be desirable that light beam 1134 is fully reflected at top surface 1112 of waveguide 1110 as shown by a light beam 1136, such that all first diffraction order 1132 coupled into waveguide 1110 by grating coupler 1120 may propagate within waveguide 1110 until it reaches an output coupler.

FIG. 11B illustrates examples of undesired light diffraction by grating coupler 1120 that may reduce the efficiency of waveguide display 1100. As illustrated, when incident light beam 1130 reaches grating coupler 1120, it may be diffracted by grating coupler 1120 into multiple diffraction orders including first diffraction order 1132 and other diffraction orders 1140 (e.g., zeroth order, $-1^{st}$ order, and higher orders). When the reflected light beam 1134 reaches top surface 1112 of waveguide 1110, it may be at least partially diffracted by grating coupler 1120 into higher diffraction orders (e.g., 1, 2, and the like) as shown by light beams 1142 and 1144. Therefore, the power of the reflected portion (shown by light beam 1136) may be much lower than the power of incident light beam 1130 or first diffraction order 1132.

Figure 12B:
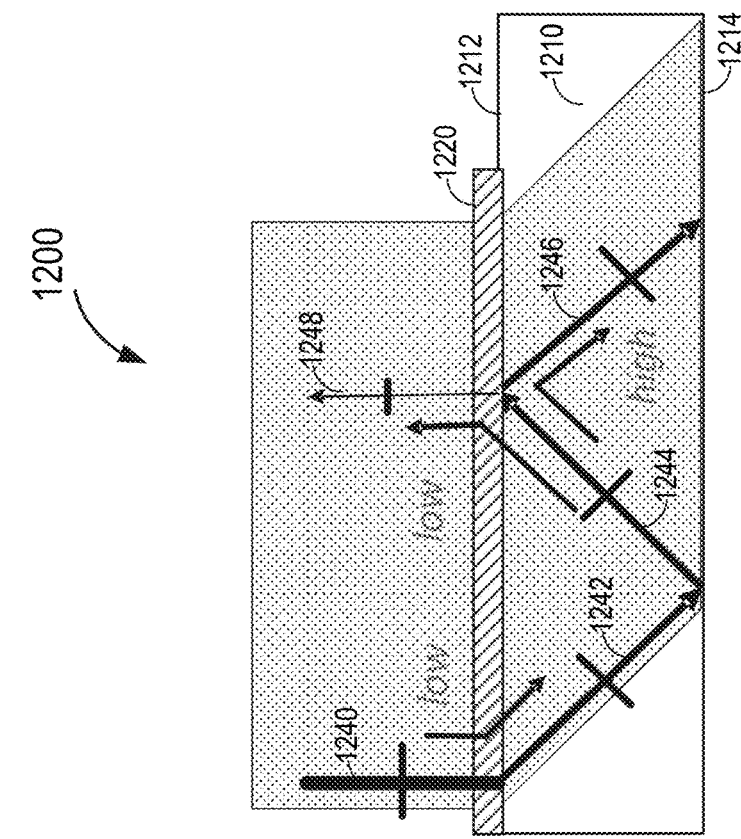
FIG. 12B illustrates the diffraction of p-polarized light by an example of a grating coupler in a waveguide display.
Figure 12A:
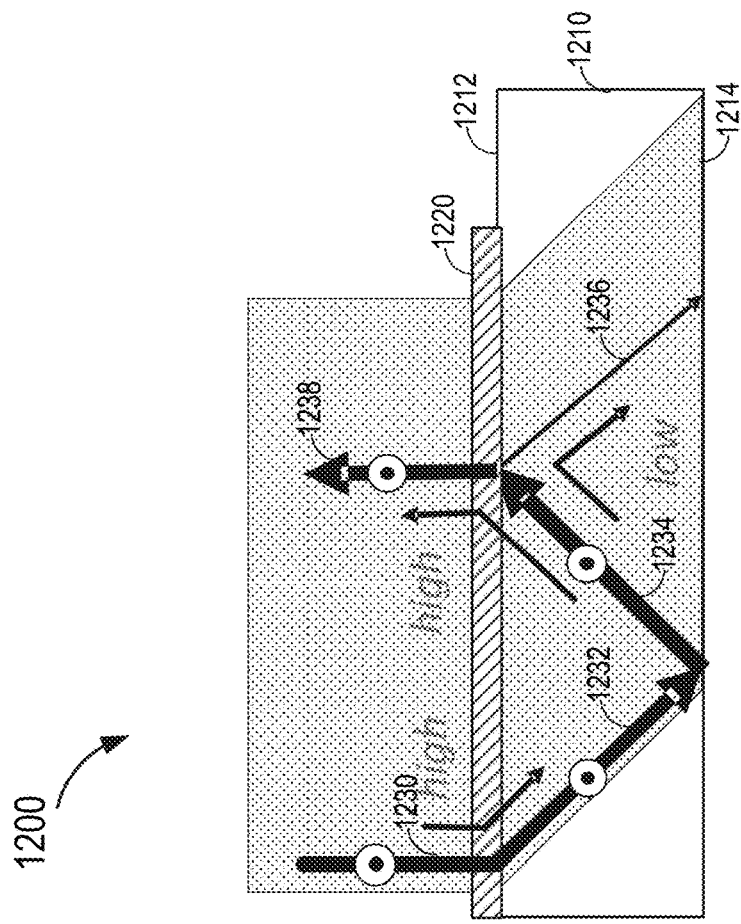
FIG. 12A illustrates the diffraction of s-polarized light by an example of a grating coupler in a waveguide display.

FIG. 12A illustrates the diffraction of s-polarized light by an example of a grating coupler 1220 in a waveguide display 1200. Grating coupler 1220 may have a higher diffraction efficiency for s-polarized light than for p-polarized light. As described above, when an s-polarized incident light beam 1230 reaches grating coupler 1220 at a top surface 1212 of waveguide 1210, it may be diffracted by grating coupler 1220 into multiple diffraction orders including an s-polarized first diffraction order 1232 and other diffraction orders, where the first order diffraction efficiency for s-polarized incident light beam 1230 may be high. The s-polarized first diffraction order 1232 may be reflected at a bottom surface 1214 into s-polarized reflected light beam 1234. When the s-polarized reflected light beam 1234 reaches top surface 1212 of waveguide 1210, a large portion of s-polarized reflected light beam 1234 may be diffracted by grating coupler 1220 out of waveguide 1210, and only a small portion of s-polarized reflected light beam 1234 may not be diffracted and may be reflected at top surface 1212. Therefore, the power of the reflected portion (shown by light beam 1236) may be much lower than the power of s-polarized first diffraction order 1232.

FIG. 12B illustrates the diffraction of p-polarized light by grating coupler 1220 in waveguide display 1200. As described above, grating coupler 1220 may have a higher diffraction efficiency for s-polarized light than for p-polarized light. When a p-polarized incident light beam 1240 reaches grating coupler 1220 at top surface 1212 of waveguide 1210, it may be diffracted by grating coupler 1220 into multiple diffraction orders including p-polarized first diffraction order 1242 and other diffraction orders, where the first order diffraction efficiency for p-polarized incident light beam 1240 may be relatively low. The p-polarized first diffraction order 1242 may be reflected at a bottom surface 1214 into p-polarized reflected light beam 1244. When the p-polarized reflected light beam 1244 reaches top surface 1212 of waveguide 1210, a small portion of p-polarized reflected light beam 1244 may be diffracted by grating coupler 1220 out of waveguide 1210, and a large portion of p-polarized reflected light beam 1244 may not be diffracted and may be reflected at top surface 1212. Therefore, the power of the reflected portion (shown by light beam 1246) may be lower than but close to the power of p-polarized first diffraction order 1242.

Grating couplers, such as grating couplers 1120 and 1220, may be optimized to maximize the power of the display light in the desire path. For example, the grating shape, the slant angle, the grating period, the duty cycle, the grating height or depth, the refractive index, the refractive index modulation, the overcoating material, and the spatial variations of these grating parameters across the grating may be adjusted to improve the efficiencies of directing display light to the desired directions. Varying these parameters may provide some but limited improvements to the efficiencies of the grating couplers due to the intrinsic characteristics of SRGs and VBGs.

According to certain embodiments, the efficiency of a waveguide display may be improved by changing the polarization state of the display light beam along its propagation path. For example, a phase structure may be coupled to the waveguide and used to change the polarization state of the light reflected at the surface of the waveguide, such that the reflected light, when reaching a polarization-dependent grating coupler, may be preferentially diffracted or reflected to the desired directions towards the eyebox to improve the overall efficiency of the waveguide display.

Figure 13B:
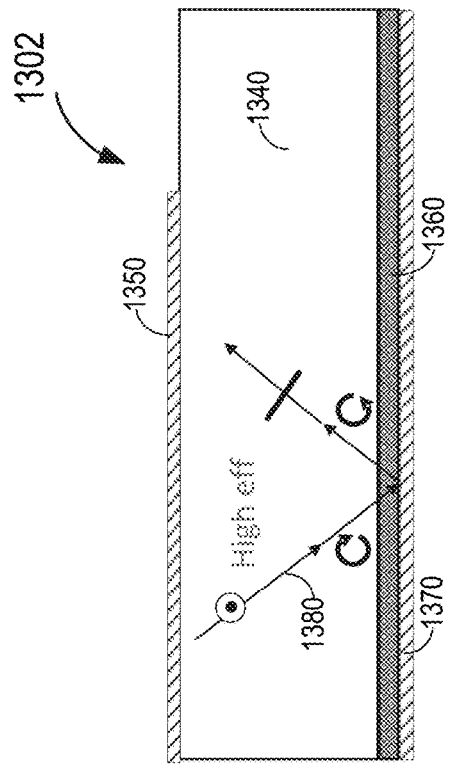
FIG. 13B illustrates an example of a waveguide display including grating couplers and a phase structure for changing the polarization state of incident light according to certain embodiments.
Figure 13C:
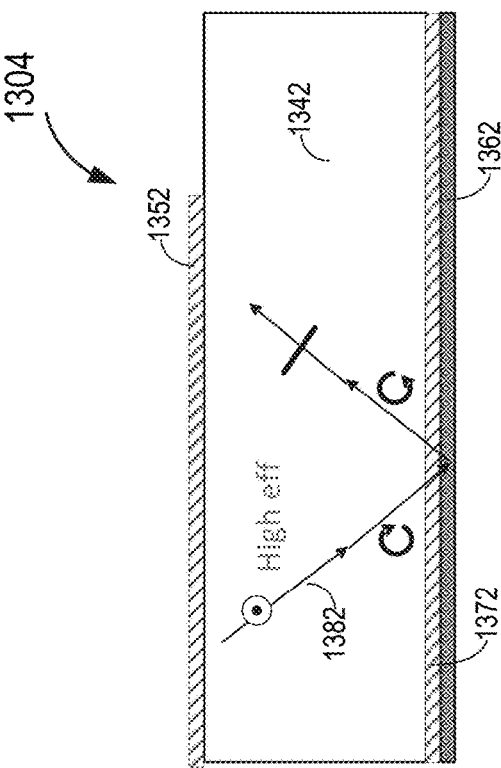
FIG. 13C illustrates an example of a waveguide display including grating couplers and a phase structure for changing the polarization state of incident light according to certain embodiments.
Figure 13A:
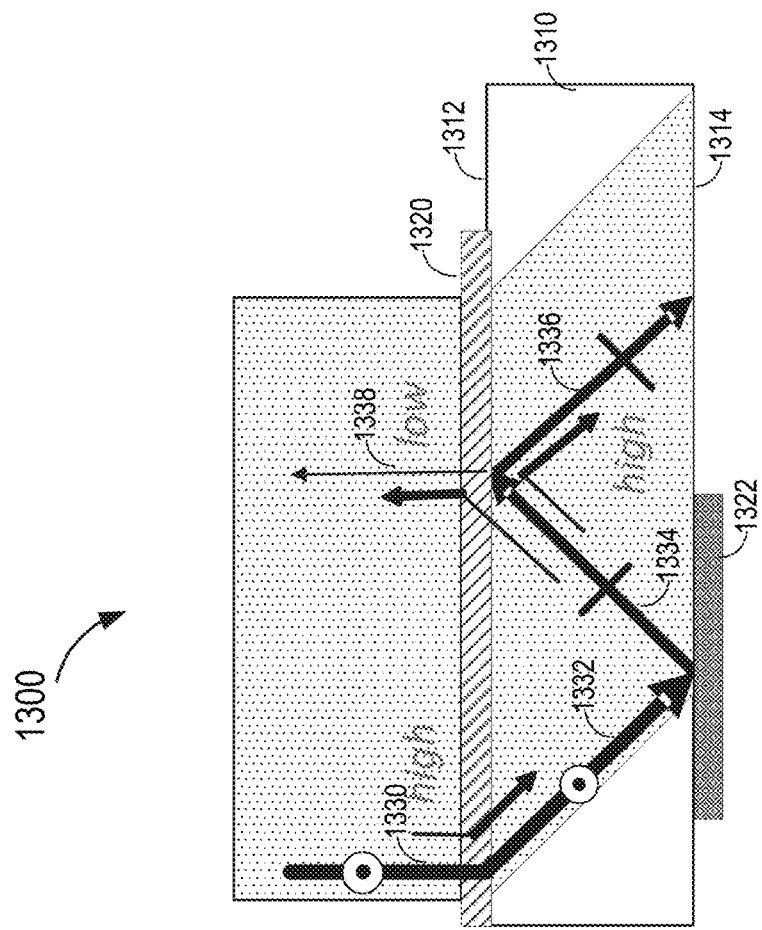
FIG. 13A illustrates an example of a waveguide display including a grating coupler and a phase structure for changing the polarization state of incident light according to certain embodiments.

FIG. 13A illustrates an example of a waveguide display 1300 including a grating coupler 1320 and a phase structure 1322 for changing the polarization state of incident light according to certain embodiments. Grating coupler 1320 may have a higher diffraction efficiency for s-polarized light than for p-polarized light. When an s-polarized incident light beam 1330 reaches grating coupler 1320 at a top surface 1312 of waveguide 1310, it may be diffracted by grating coupler 1320 into multiple diffraction orders including s-polarized first diffraction order 1332 and other diffraction orders, where the first order diffraction efficiency for s-polarized incident light beam 1330 may be high. The s-polarized first diffraction order 1332 may reach a bottom surface 1314 of waveguide 1310, where phase structure 1322 may be attached. Bottom surface 1314 and phase structure 1322 may reflect s-polarized first diffraction order 1332 and convert s-polarized first diffraction order 1332 into a p-polarized reflected light beam 1334. When the p-polarized reflected light beam 1334 reaches top surface 1312 of waveguide 1310, a small portion of p-polarized reflected light beam 1338 may be diffracted by grating coupler 1320 out of waveguide 1310, and a large portion of p-polarized reflected light beam 1334 may not be diffracted and may be reflected at top surface 1312. Therefore, the power of the reflected portion (shown by light beam 1336) may be lower than but close to the power of s-polarized first diffraction order 1232.

Phase structure 1322 may include any birefringent materials (e.g., birefringent crystals, liquid crystals, or polymers) or structures (e.g., gratings, meta-gratings, micro-structures, nano-structures, or other subwavelength structures) that can cause a desired phase delay between two orthogonal linear polarization components (e.g., s-polarized component and p-polarized component) of a light beam, such that the incident light beam may be changed to an s-polarized, p-polarized, circularly polarized, or elliptically polarized beam. The phase structure may be placed at various locations in a waveguide display, such as at the input coupler region, between the input coupler and the output coupler, at the output coupler region, or any combinations.

FIG. 13B illustrates an example of a waveguide display 1302 including grating couplers 1350 and 1370 and a phase structure 1360 for changing the polarization state of incident light according to certain embodiments. In the example shown in FIG. 13B, waveguide display 1302 includes a substrate 1340 that may function as the waveguide. Grating coupler 1350 is on the top surface of substrate 1340. Phase structure 1360 is on the bottom surface of substrate 1340 and is between substrate 1340 and grating coupler 1370. Grating couplers 1350 and 1370 may be used to diffract display light of different colors and/or from different regions in a field of view into substrate 1340 as guided wave.

Phase structure 1360 may include, for example, a quarter-wave plate (QWP). The fast axis of the QWP may be at an about 45° angle with respect to the grating ridges or the grating vector. Thus, as illustrated in FIG. 13B, s-polarized light 1380 that is diffracted by grating coupler 1350 may be converted to left-handed circular polarization (LCP) light by the QWP as s-polarized light 1380 passes through phase structure 1360 from substrate 1340 to the interface between phase structure 1360 and grating coupler 1370. The LCP light, when reflected at the interface between phase structure 1360 and grating coupler 1370 or the interface between grating coupler 1370 and air, may become right-handed circular polarization (RCP) light because of the change in the propagation direction. The reflected RCP light may then be converted to p-polarized light by the QWP as the reflected RCP light passes through phase structure 1360 back to substrate 1340. As such, the s-polarized light 1380 that is coupled into substrate 1340 may become p-polarized when it reaches grating coupler 1350, which may have a low diffraction efficiency for p-polarized light and thus would have a lower loss for the light coupled into substrate 1340.

FIG. 13C illustrates an example of a waveguide display 1304 including grating couplers 1352 and 1372 and a phase structure 362 changing the polarization state of incident light according to certain embodiments. In the example shown in FIG. 13C, waveguide display 1304 includes a substrate 1342 that may function as the waveguide. Grating coupler 1352 is on the top surface of substrate 1342. Grating coupler 1372 is on the bottom surface of substrate 1342 and is between substrate 1342 and phase structure 1362. Grating couplers 1352 and 1372 may be used to diffract display light of different colors and/or from different regions in a field of view into substrate 1342 as guided wave.

Phase structure 1362 may include, for example, a wave plate or a birefringent subwavelength structure. As illustrated in FIG. 13C, s-polarized light 1382 that is diffracted by grating coupler 1352 may be converted to LCP light by grating coupler 1372 and phase structure 1362 as s-polarized light 1382 passes through grating coupler 1372 and phase structure 1362 from substrate 1342 to the bottom surface of phase structure 1362. The LCP light, when reflected at the bottom surface of phase structure 1362, may become RCP light because of the change in the propagation direction. The RCP light may then be converted to p-polarized light by phase structure 1362 and grating coupler 1372 as the RCP light passes through phase structure 1362 and grating coupler 1372 back to substrate 1342. As such, the s-polarized light 1382 that is coupled into substrate 1342 may become p-polarized when it reaches grating coupler 1352, which may have a low diffraction efficiency for p-polarized light and thus would have a lower loss for the light coupled into substrate 1342.

Figure 14A:
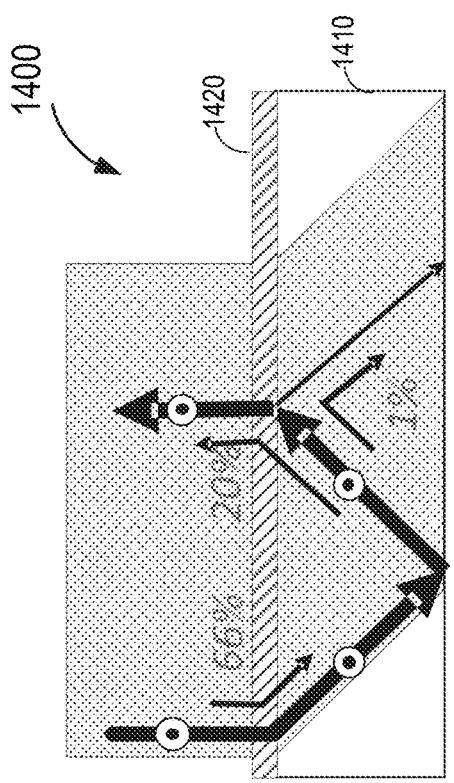
FIG. 14A illustrates the efficiencies of diffracting s-polarized light by an example of a grating coupler in a waveguide display.

FIG. 14A illustrates the efficiencies of diffracting s-polarized light by an example of a grating coupler 1420 in a waveguide display 1400. FIG. 14A shows that grating coupler 1420 on a waveguide 1410 diffracts an s-polarized incident light beam at an about 66% diffraction efficiency into waveguide 1410. The s-polarized light beam in waveguide 1410 may be totally reflected at the bottom surface of waveguide 1410 and reach grating coupler 1420. About 20% of the reflected s-polarized light may be diffracted out of waveguide 1410 by grating coupler 1420, only about 1% of the reflected s-polarized light may be reflected at the top surface of waveguide 1410, and other portions of the reflected s-polarized light may be diffracted into other diffraction orders. Thus, only about 66%×1%=0.66% of the incident s-polarized beam may become guided light within waveguide 1410.

Figure 14B:
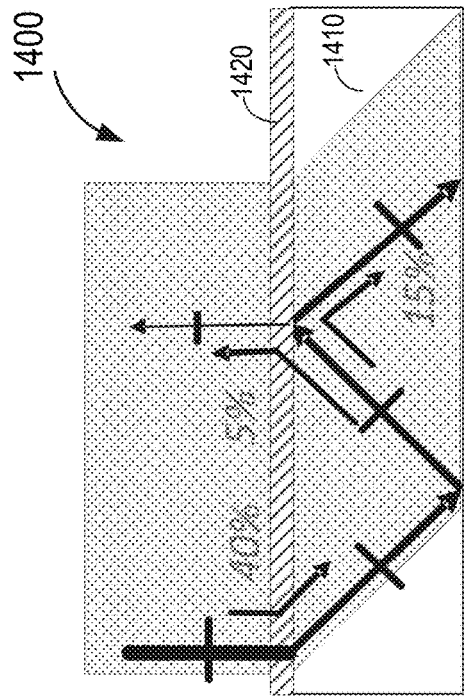
FIG. 14B illustrates the efficiencies of diffracting p-polarized light by an example of a grating coupler in a waveguide display.

FIG. 14B illustrates the efficiencies of diffracting p-polarized light by grating coupler 1420 in waveguide display 1400. FIG. 14B shows that grating coupler 1420 on waveguide 1410 diffracts a p-polarized incident light beam at an about 40% diffraction efficiency into waveguide 1410. The p-polarized light beam in waveguide 1410 may be totally reflected at the bottom surface of waveguide 1410 and reach grating coupler 1420. About 5% of the reflected p-polarized light may be diffracted out of waveguide 1410 by grating coupler 1420, about 15% of the reflected p-polarized light may be reflected at the top surface of waveguide 1410, and other portions of the reflected p-polarized light may be diffracted into other diffraction orders. Thus, about 40%× 15%=6% of the incident p-polarized beam may become guided light within waveguide 1410. As a result, on average, about 3.33% of the incident light may become guided light within waveguide 1410 to reach an output coupler.

Figure 14C:
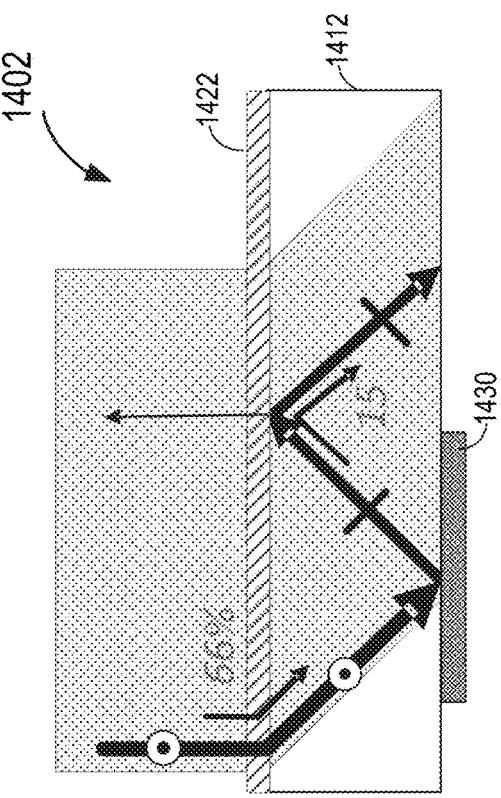
FIG. 14C illustrates the efficiencies of diffracting s-polarized light by an example of a grating coupler and a phase structure in a waveguide display according to certain embodiments.

FIG. 14C illustrates the efficiencies of diffracting s-polarized light by an example of a grating coupler 1422 and a phase structure 1430 in a waveguide display 1402 according to certain embodiments. FIG. 14C shows that grating coupler 1422 on a waveguide 1412 diffracts an s-polarized incident light beam at an about 66% diffraction efficiency into waveguide 1412. The s-polarized light beam in waveguide 1412 may be converted to p-polarized light by phase structure 1430 and totally reflected at the bottom of waveguide 1412 and reach grating coupler 1422. About 15% of the reflected p-polarized light may be reflected at the top surface of waveguide 1412. Thus, about 66%×15%=9.9% of the incident s-polarized beam may become p-polarized guided light within waveguide 1412.

Figure 14D:
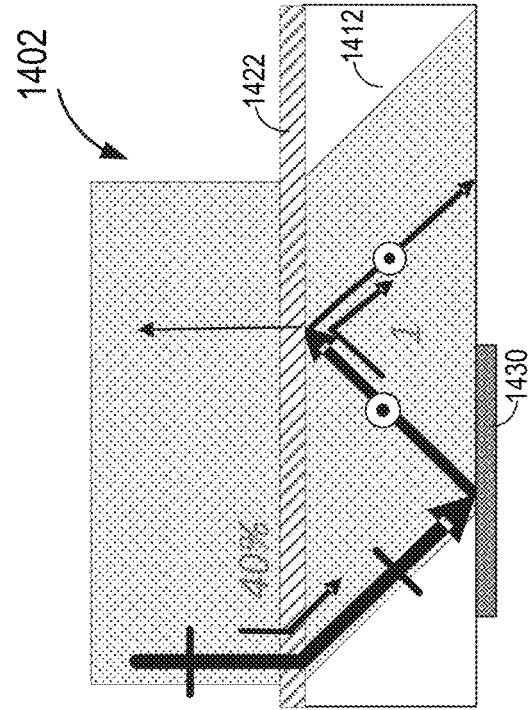
FIG. 14D illustrates the efficiencies of diffracting p-polarized light by an example of a grating coupler and a phase structure in a waveguide display according to certain embodiments.

FIG. 14D illustrates the efficiencies of diffracting p-polarized light by grating coupler 1422 and phase structure 1430 in waveguide display 1402 according to certain embodiments. FIG. 14D shows that grating coupler 1422 on waveguide 1412 diffracts a p-polarized incident light beam at an about 40% diffraction efficiency into waveguide 1412. The p-polarized light beam in waveguide 1412 may be converted to s-polarized light by phase structure 1430 and totally reflected at the bottom of waveguide 1412 and reach grating coupler 1422. About 1% of the reflected s-polarized light may be reflected at the top surface of waveguide 1412. Thus, about 40%×1%=0.4% of the incident p-polarized beam may become s-polarized guided light within waveguide 1412. As a result, on average, about 5.15% of the incident light may become guided light within waveguide 1412 to reach an output coupler.

Figure 15A:
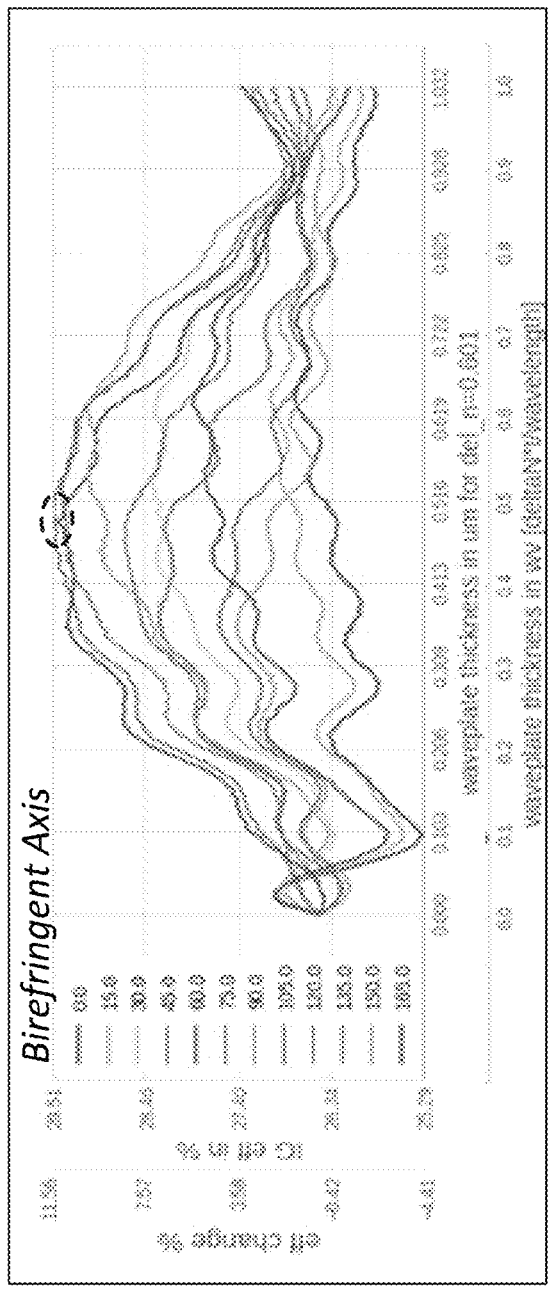
FIG. 15A illustrates simulated input coupling efficiencies of examples of waveguide displays including a grating coupler and various phase structures according to certain embodiments.

FIG. 15A includes a diagram 1500 illustrating simulated input coupling efficiencies of examples of waveguide displays including a grating coupler and various phase structures according to certain embodiments. In the simulations, phase structures (e.g., waveplates) with different thicknesses and orientations with respect to the input grating coupler are placed between a waveguide and a bottom grating coupler (e.g., grating coupler 1370) as shown in FIG. 13B. For each phase structure configuration (e.g., a unique combination of thickness and orientation of the waveplate), the average input coupling efficiency for light from different regions in a field of view is measured at a location in the optical path that is after the input grating coupler (e.g., input coupler 820, input grating 930, third grating 1060, grating coupler 1320, or grating coupler 1422) and before the first output grating coupler (e.g., first output grating 830, first output grating 940, or first output grating 1030).

In FIG. 15A, the horizontal axis corresponds to the thickness of the waveplate (in m for physical thickness and wavelengths for waveplate thickness), where the waveplate has a birefringence characterized by a Δn about 0.601. The waveplate thickness of the waveplate may be determined based on the physical thickness (t) of the waveplate, the birefringence (Δn), and the wavelength (λ) according to t×Δn/λ. In the simulations, the waveplate thickness may vary between 0 and about one wavelength. The vertical axis corresponds to the average input coupling efficiency for each phase structure configuration and the corresponding change of the average input coupling efficiency with respect to a baseline efficiency measured without using a phase structure. Each curve in FIG. 15A corresponds to a certain orientation of the fast axis of the waveplate with respect to the grating ridges, where the angle between the fast axis of the waveplate and the grating ridges may vary from about 0° to about 165°.

FIG. 15A shows that the maximum input coupling efficiency may be achieved when the phase structure is a QWP (e.g., with a physical thickness about 0.5 m) and is oriented such that the fast axis of the QWP is at about 45° with respect to the grating ridges. The maximum input coupling efficiency may be about 11.5% higher than the baseline efficiency.

Figure 15D:
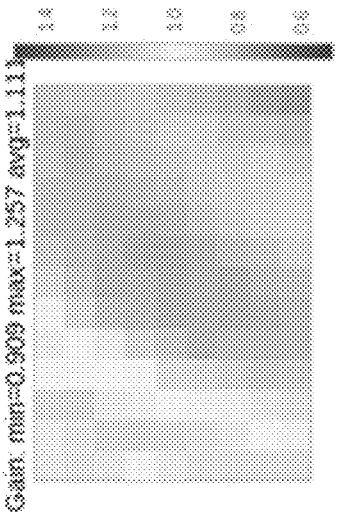
FIG. 15D illustrates simulated input coupling efficiency improvements by an example of a waveguide display including a grating coupler and a phase structure according to certain embodiments for light from different regions in a field of view.
Figure 15C:
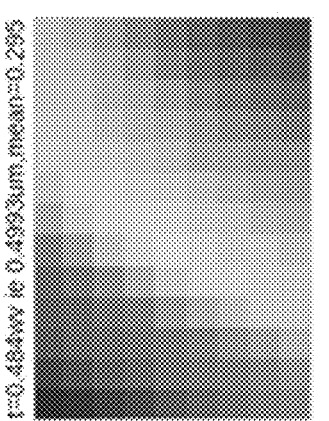
FIG. 15C illustrates simulated input coupling efficiencies of an example of a waveguide display including a grating coupler and a phase structure according to certain embodiments for light from different regions in a field of view.
Figure 15B:
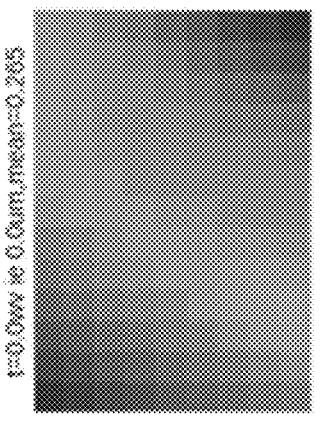
FIG. 15B illustrates simulated input coupling efficiencies of an example of a waveguide display for light from different regions in a field of view.

FIG. 15B illustrates simulated input coupling efficiencies of an example of a waveguide display for light from different regions in a field of view. The waveguide display may not include a phases structure described above. FIG. 15B shows that the input coupling efficiency may vary for different regions in the field of view. The average input coupling efficiency for the field of view is about 26.5%.

FIG. 15C illustrates simulated input coupling efficiencies of an example of a waveguide display including a grating coupler and a phase structure for light from different regions in a field of view according to certain embodiments. The phase structure may be between a substrate and a grating coupler as shown in FIG. 13B. The phase structure may have an waveplate thickness about 0.484 wavelengths or a physical thickness about 0.4993 μm. FIG. 15C shows that the input coupling efficiency may vary for different regions in the field of view. The average input coupling efficiency for the field of view is about 29.5%.

FIG. 15D illustrates simulated input coupling efficiency improvements by the example of waveguide display of FIG. 15C (e.g., waveguide display 1302) for light from different regions in the field of view according to certain embodiments. FIG. 15D may be generated by comparing the input coupling efficiency for each region in the field of view shown in FIG. 15C with the input coupling efficiency for the corresponding region shown in FIG. 15B. FIG. 15D shows that, with the phase structure (e.g., a QWP oriented at about 45° with respect to the grating ridges), the input coupling efficiency may be improved for almost every region in the field of view. The maximum improvement is about 25.7%, and the average improvement for the full field of view is about 11.1%.

Figure 16A:
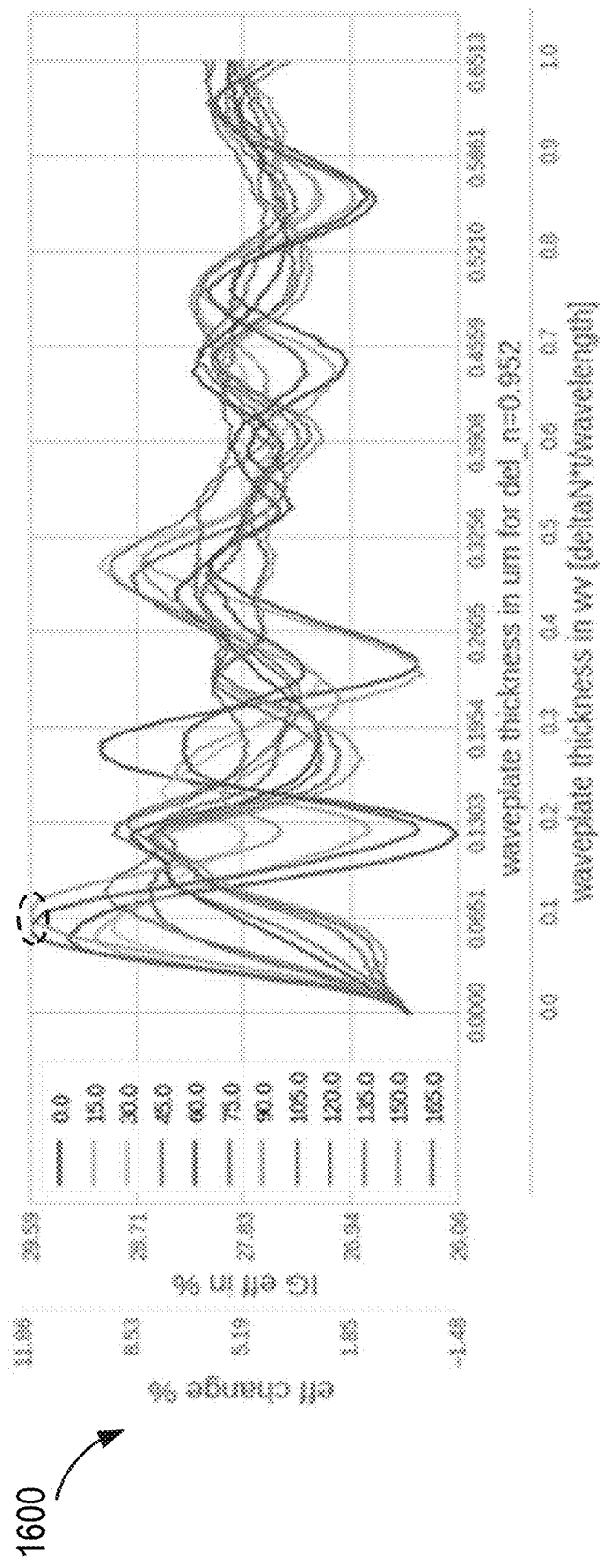
FIG. 16A illustrates simulated input coupling efficiencies of examples of waveguide displays including a grating coupler and various phase structures according to certain embodiments.

FIG. 16A includes a diagram 1600 illustrating simulated input coupling efficiencies of examples of waveguide displays including a grating coupler and various phase structures according to certain embodiments. In the simulations, phase structures (e.g., waveplates) with different thicknesses and orientations with respect to the grating ridges (or grating vector) of the input grating coupler are coupled to a bottom grating coupler (e.g., grating coupler 1372) on the bottom surface of a waveguide as shown in FIG. 13C. For each phase structure configuration (e.g., a unique combination of the thickness and orientation of the waveplate), the average input coupling efficiency for light from different regions in a field of view is measured at a location on the optical path that is after the input grating coupler (e.g., input coupler 820, input grating 930, third grating 1060, grating coupler 1320, or grating coupler 1422) and before the first output grating coupler (e.g., first output grating 830, first output grating 940, or first output grating 1030).

In FIG. 16A, the horizontal axis corresponds to the thickness of the waveplate (in m for physical thickness and wavelengths for waveplate thickness), where the waveplate has a birefringence characterized by a Δn about 0.952. The waveplate thickness of the waveplate may vary between 0 and about one wavelength. The vertical axis corresponds to the average input coupling efficiency for each phase structure configuration and the corresponding change of the average input coupling efficiency with respect to a baseline efficiency measured without using a phase structure. Each curve in FIG. 16A corresponds to a certain orientation of the fast axis of the waveplate with respect to the grating ridges, where the angle between the fast axis of the waveplate and the grating ridges may vary from about 0° to about 165°.

FIG. 16A shows that the maximum input coupling efficiency may be achieved when the waveplate thickness of the phase structure is about 0.1 wavelength (e.g., with a physical thickness about 0.06 μm) and is oriented such that the fast axis of the phase structure is at about 165° with respect to the grating ridges. The maximum input coupling efficiency may be about 11.8% higher than the baseline efficiency. The waveplate thickness of the phase structure for the maximum input coupling efficiency may be less than about a quarter wavelength, which may be caused by the polarization-dependent characteristics of the bottom grating coupler (e.g., grating coupler 1372).

Figure 16D:
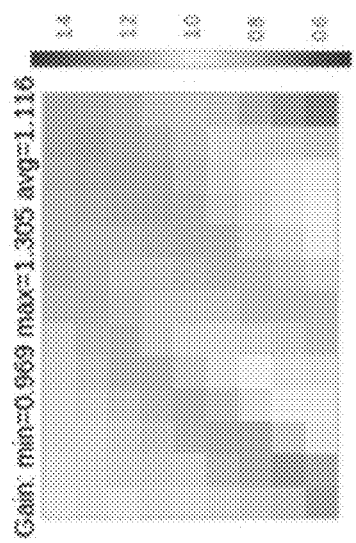
FIG. 16D illustrates simulated input coupling efficiency improvements by an example of a waveguide display including a grating coupler and a phase structure according to certain embodiments for light from different regions in a field of view.
Figure 16C:
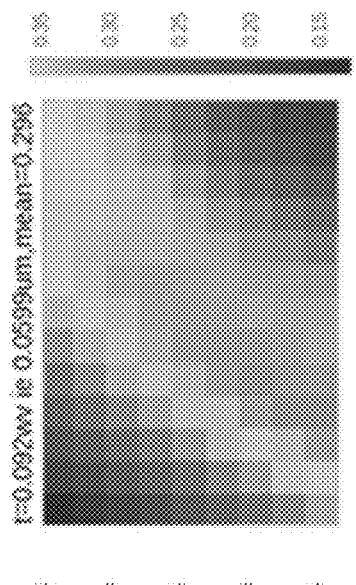
FIG. 16C illustrates simulated input coupling efficiencies of an example of a waveguide display including a grating coupler and a phase structure according to certain embodiments for light from different regions in a field of view.
Figure 16B:
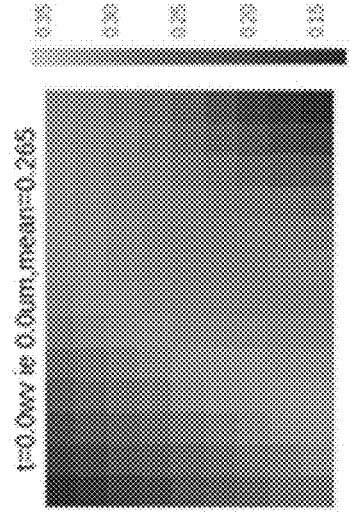
FIG. 16B illustrates simulated input coupling efficiencies of an example of a waveguide display for light from different regions in a field of view.

FIG. 16B illustrates simulated input coupling efficiencies of an example of a waveguide display for light from different regions in a field of view. The waveguide display may not include a phases structure described above. FIG. 16B shows that the input coupling efficiency may vary for different regions in the field of view. The average input coupling efficiency for the field of view is about 26.5%.

FIG. 16C illustrates simulated input coupling efficiencies of an example of a waveguide display including a grating coupler and a phase structure for light from different regions in a field of view according to certain embodiments. The phase structure may be coupled to a grating coupler on a substrate as shown in FIG. 13C. The phase structure may have an waveplate thickness about 0.1 wavelengths or a physical thickness about 0.06 μm. FIG. 16C shows that the input coupling efficiency may vary for different regions in the field of view. The average input coupling efficiency for the field of view is about 29.6%.

FIG. 16D illustrates simulated input coupling efficiency improvements of the example of waveguide display of FIG. 16C for light from different regions in the field of view according to certain embodiments. FIG. 16D may be generated by comparing the input coupling efficiency for each region shown in FIG. 16C with the input coupling efficiency for the corresponding region shown in FIG. 16B. FIG. 16D shows that, with the phase structure (e.g., a 0.1-wavelength waveplate oriented at about 165° with respect to the grating ridges), the input coupling efficiency may be improved for almost every region in the field of view. The maximum improvement is about 30.5%, and the average improvement for the full field of view is about 11.6%.

The phase structures described above (e.g., phase structure 1322, 1360, 1362, or 1430) may include any birefringent materials (e.g., birefringent crystals, liquid crystals, or polymers) or structures (e.g., gratings, meta-gratings, nano-structures, or other subwavelength structures) that can cause a desired phase delay between two orthogonal linear polarization components (e.g., s-polarized light and p-polarized light), such that an incident light beam may be changed to an s-polarized, p-polarized, circularly polarized, or elliptically polarized beam.

In some embodiments, in order to reduce the loss (e.g., due to undesired Fresnel reflection) at the interfaces between the phase structures and the adjacent components of the waveguide display, such as the substrate and/or the grating coupler, it may be desirable to use a phase structure that has an effective refractive index close to the refractive index of the adjacent component. In some embodiments where the substrate has a high refractive index (e.g., >2.0, such as 2.5), it may be difficult to find a birefringent material that has a matching refractive index. In such cases, gratings or other subwavelength structures may be used to achieve the phase retardation and refractive index matching.

Figure 17A:
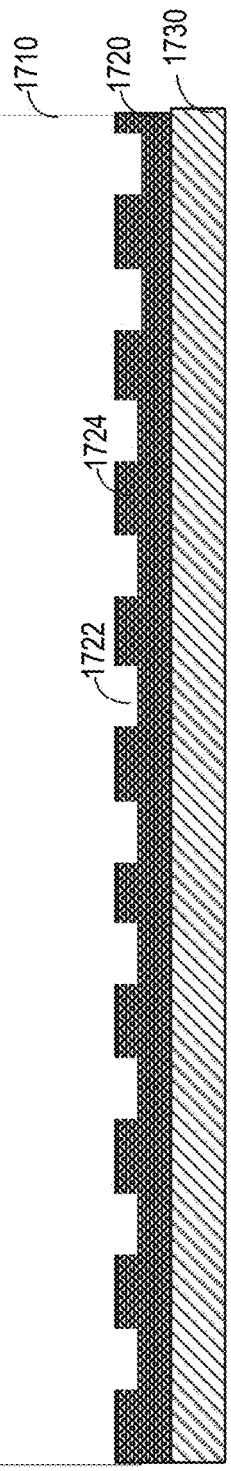
FIG. 17A illustrates an example of a waveguide display including a grating coupler and a phase structure between the grating coupler and a substrate according to certain embodiments.

FIG. 17A illustrates an example of a waveguide display 1700 including a grating coupler 1730 and a phase structure 1720 between grating coupler 1730 and a substrate 1710 according to certain embodiments. Phase structure 1720 may include a grating 1722 (or a micro- or nano-structure) etched in substrate 1710 and an overcoat layer 1724 on grating 1722. Grating 1722 may include subwavelength features, and may change the polarization state of incident light in a certain wavelength range and incident angle range. Overcoat layer 1724 may have a refractive index different from the refractive index of substrate 1710 to form the grating with a certain refractive index modulation.

Figure 17B:
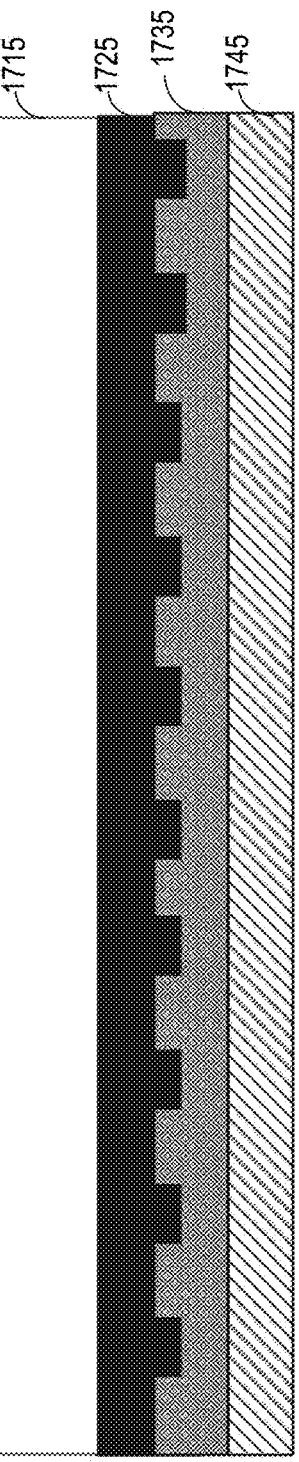
FIG. 17B illustrates another example of a waveguide display including a grating coupler and a phase structure between the grating coupler and a substrate according to certain embodiments.

FIG. 17B illustrates another example of a waveguide display 1705 including a grating coupler 1745 and a phase structure 1740 between grating coupler 1745 and a substrate 1715 according to certain embodiments. In the illustrated example, phase structure 1740 may include a layer 1725 including a high refractive index material and an overcoat layer 1735 including a lower refractive index material. Layer 1725 may have a refractive index higher than that of substrate 1715 and may be deposited on substrate 1715. A grating or another subwavelength structure may be etched in layer 1725, and then overcoat layer 1735 may be formed on the grating or subwavelength structure. The grating or another subwavelength structure etched in layer 1725 may change the polarization state of incident light in a certain wavelength range and incident angle range. Overcoat layer 1724 may have a refractive index lower than the refractive index of substrate 1710. Thus, the effective refractive index of phase structure 1740 that includes layer 1725 and overcoat layer 1735 may be close to the refractive index of substrate 1715 such that a difference between the refractive index of substrate 1715 and the effective refractive index of phase structure 1740 may be less than about 0.35, less than about 0.2, less than about 0.1, or less than about 0.05. Therefore, the loss due to the refractive index discontinuity may be reduced. Grating coupler 1745 may be formed on or coupled to overcoat layer 1735.

The phase structures described above may be placed at various locations of an SRG-based waveguide display where it may be desirable or beneficial to change the polarization state of the light beam for improved system efficiency. For example, one or more phase structures can be positioned at the input coupler region, between the input coupler and the output coupler, at the output coupler region, or any combinations. The one or more phase structures at different locations can have the same or different configurations and polarization characteristics, such as the same or different waveplate thicknesses. The one or more phase structures may convert s-polarized light to p-polarized light or circularly polarized light, convert p-polarized light to s-polarized light or circularly polarized light, convert circularly polarized light to s-polarized light or p-polarized light, or the like.

The phase structures described above may also be used to improve the efficiency of a volume Bragg grating-based waveguide display, such as reducing the undesired outcoupling by the input grating described above. In addition, a VBG in a VBG-based waveguide display may function as multilayer reflectors that may strongly reflect light of a specific wavelength and at a specific incident angle that meets the Bragg condition. The reflectivity of the VBG for p-polarized light may be very low when the incident angle is at or near the Brewster's angle. Thus, it may also be desirable to change the polarization state of the incident light to increase the desired diffraction by the VBG or to reduce the undesired diffraction by the VBG.

Figure 18B:
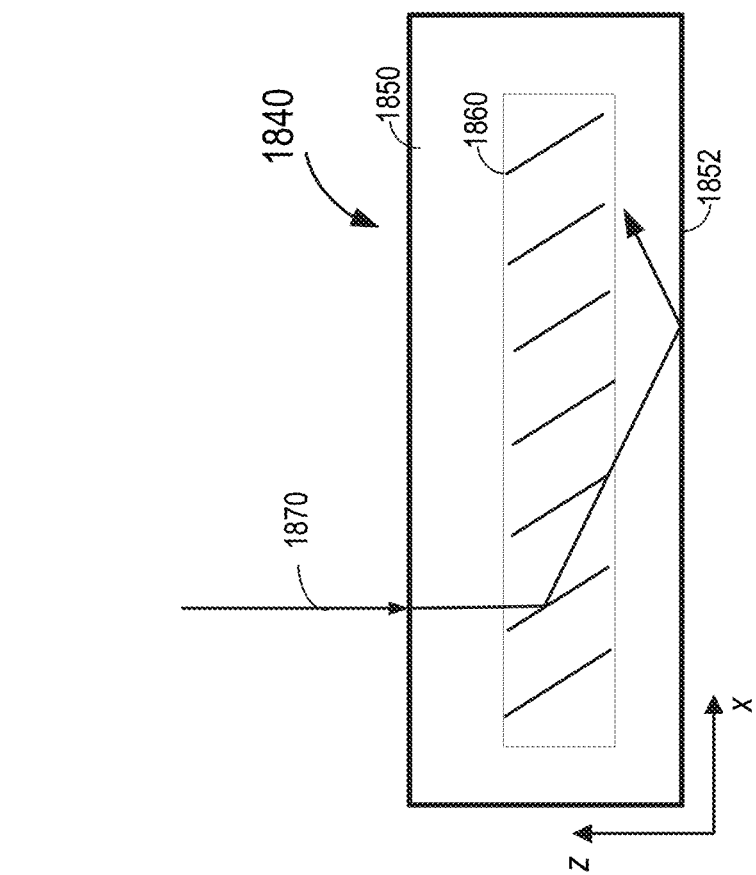
FIG. 18B illustrates an example of an assembly of a waveguide display.
Figure 18A:
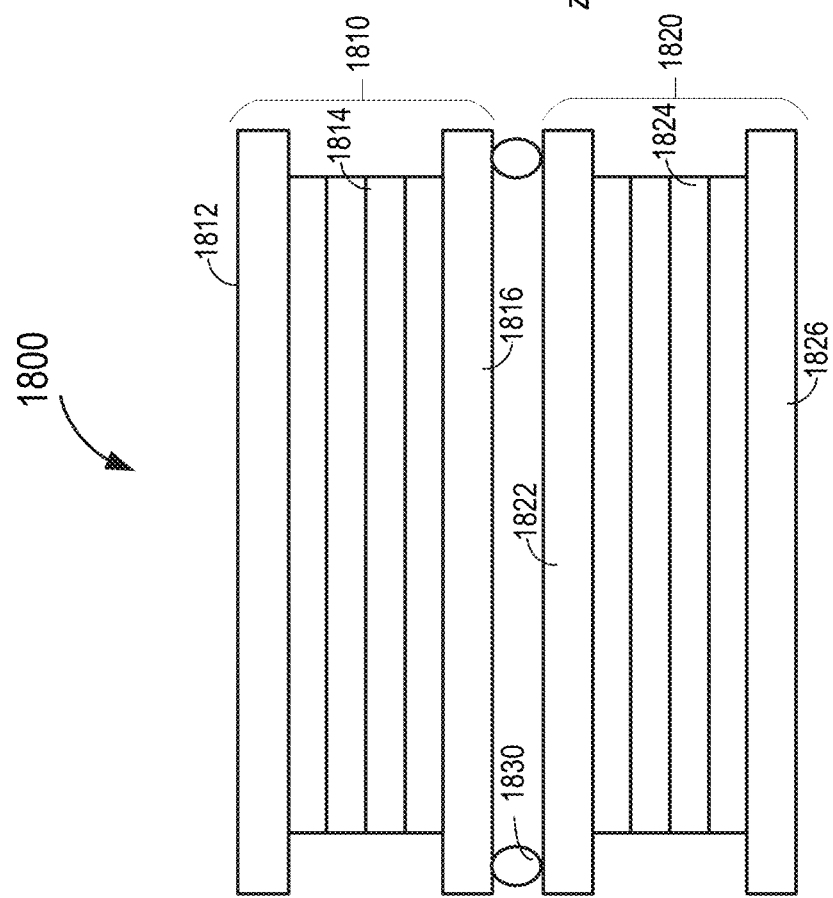
FIG. 18A illustrates an example of a waveguide display including VBG couplers according to certain embodiments.

FIG. 18A illustrates an example of a waveguide display 1800 including volume Bragg grating couplers. In the illustrated example, waveguide display 1800 may include a first assembly 1810 and a second assembly 1820 that are separated by a spacer 1830. First assembly 1810 may include a first substrate 1812, a second substrate 1816, and one or more holographic grating layers 1814 between first substrate 1812 and second substrate 1816. Holographic grating layers 1814 may include multiplexed reflective VBGs, transmissive VBGs, or both. Similarly, second assembly 1820 may include a first substrate 1822, a second substrate 1826, and one or more holographic grating layers 1824 between first substrate 1822 and second substrate 1826. Holographic grating layers 1824 may include multiplexed reflective VBGs, transmissive VBGs, or both.

FIG. 18B illustrates an example of an assembly 1840 of a waveguide display. Assembly 1840 may be an example of first assembly 1810 or second assembly 1820, and may include a VBG 1860 within a substrate 1850 or between two substrates. As illustrated, VBG 1860 may function as multiple reflectors that strongly reflect light of a specific wavelength and at a specific angle that satisfies the Bragg condition. Depending on the slant angle of the multiple reflectors in VBG 1860, the reflected light may pass through VBG 1860 such that VBG 1860 may transmissively diffract incident light 1870 as shown in FIG. 18B. The transmissively diffracted light may be reflected at a bottom surface 1852 of substrate 1850 and may reach VBG 1860 again. VBG 1860 may at least partially diffract the light out of substrate 1850 and thus may decrease the input coupling efficiency of assembly 1840.

Figure 19A:
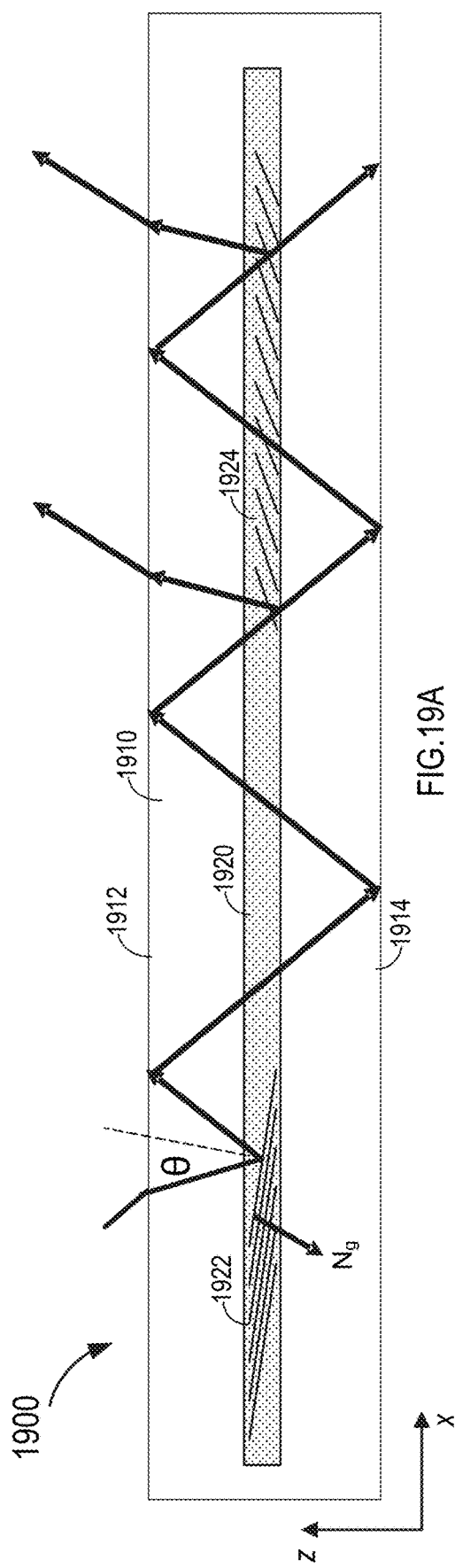
FIG. 19A illustrates an example of a waveguide display including volume Bragg grating couplers according to certain embodiments.

FIG. 19A illustrates an example of a waveguide display 1900 including volume Bragg grating couplers. Waveguide display 1900 may include a VBG layer 1920 within a substrate 1910 or between two substrates. VBG layer 1920 may include an input VBG 1922 and an output VBG 1924. In the illustrated example, input VBG 1922 may reflectively diffract incident light, and thus may function as a reflective VBG. Output VBG 1924 may partially reflectively diffract the light from input VBG 1922 out of substrate 1910 towards an eyebox of waveguide display 1900.

Figure 19B:
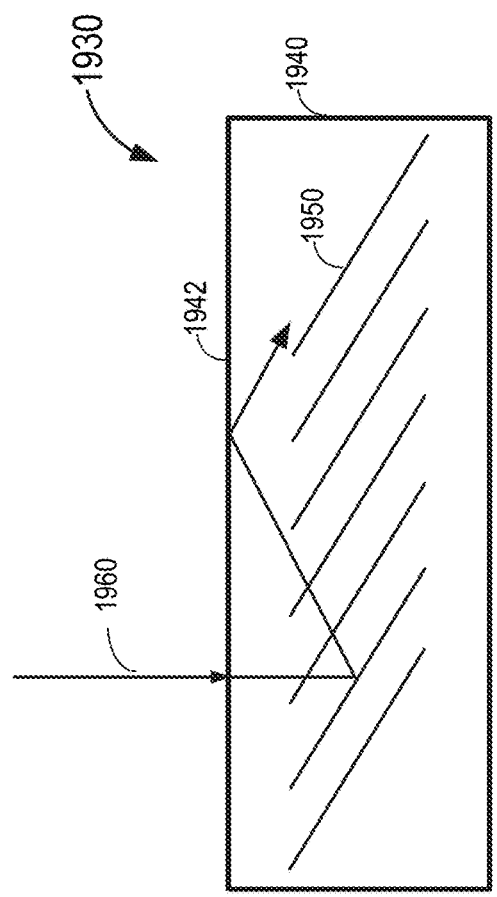
FIG. 19B illustrates an example of an input coupler including a volume Bragg grating in a substrate according to certain embodiments.

FIG. 19B illustrates an example of an input coupler 1930 including a volume Bragg grating 1950 in a substrate 1940. VBG 1950 may be an example of input VBG 1922. As illustrated, VBG 1950 may function as multiple reflectors that strongly reflect light of a specific wavelength and at a specific angle that satisfies the Bragg condition. Depending on the slant angle of the multiple reflectors in VBG 1950, the reflected light may not pass through VBG 1950 such that VBG 1950 may reflectively diffract incident light 1960 as shown in FIG. 19B. The reflectively diffracted light may be reflected at a top surface 1942 of substrate 1940 and may reach VBG 1950 again. VBG 1950 may at least partially diffract the reflected light out of substrate 1940 and thus may decrease the input coupling efficiency of input coupler 1930.

Thus, both transmissive VBGs and reflective VBGs may function as multilayer reflectors. The reflectivity of each of the multiple reflectors may depend on the polarization state and the incident angle of the incident light, and the base refractive index and the refractive index modulation (Δn) of the VBG.

Figure 20B:
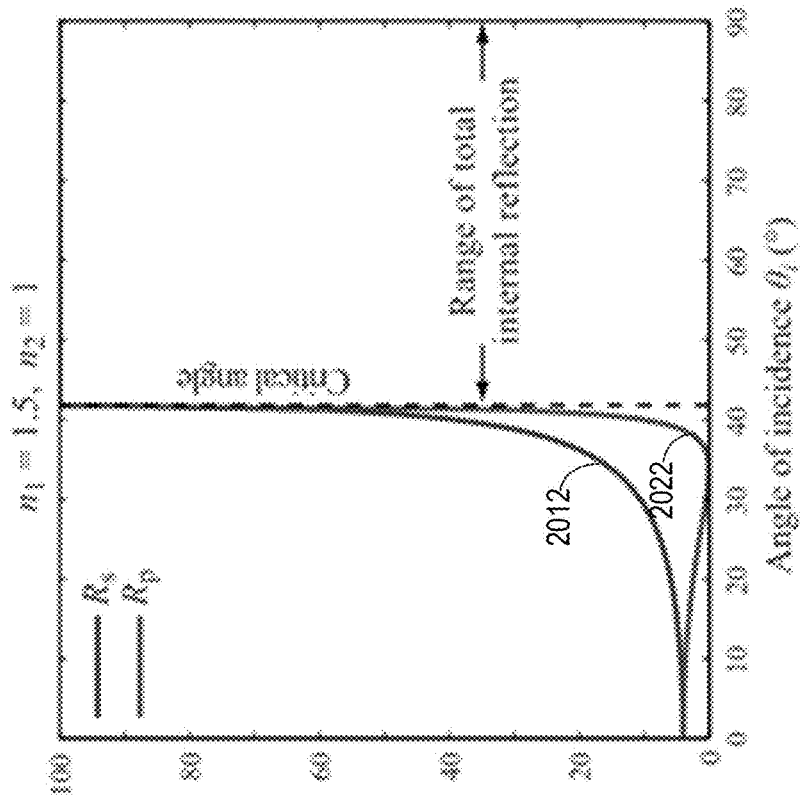
FIG. 20B illustrates examples of reflection coefficients for s-polarization and p-polarization light with different incident angles at an interface between a high refractive index material and a low refractive index material.
Figure 20A:
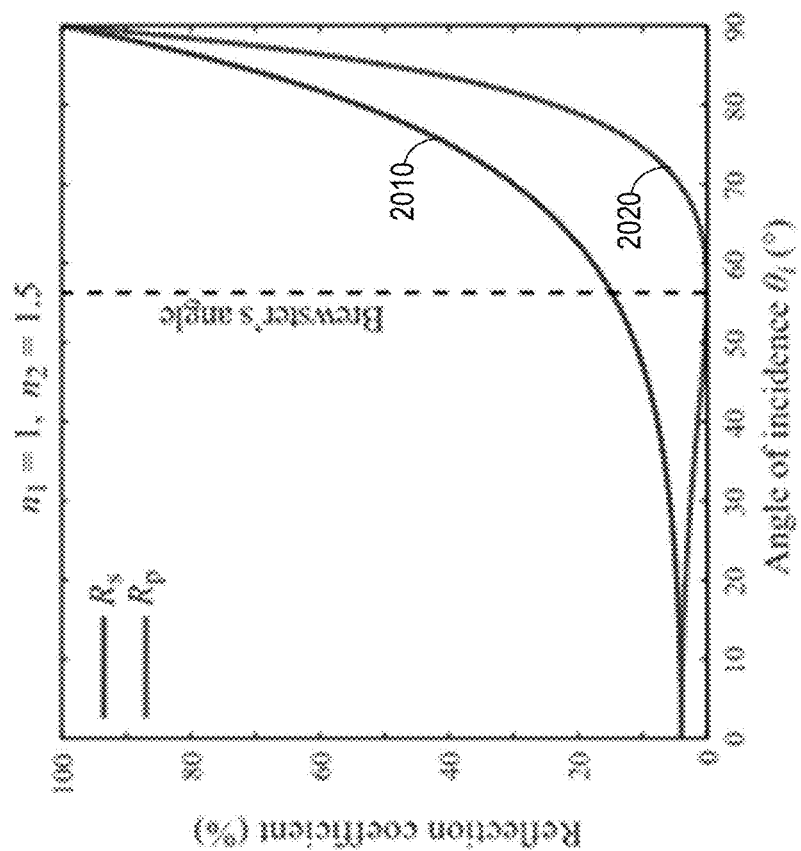
FIG. 20A illustrates examples of reflection coefficients for s-polarization and p-polarization light with different incident angles at an interface between a low refractive index material and a high refractive index material.

FIG. 20A illustrates examples of reflection coefficients of s-polarized and p-polarized light with different incident angles at an interface between a low refractive index material and a high refractive index material. In the illustrated example, the refractive index of the first medium is 1.0, the refractive index of the second medium is 1.5, and the s-polarized or p-polarized light reaches the interface between the two media from the first medium. A curve 2010 in FIG. 20A shows the reflection coefficients for s-polarized light with different incident angles. A curve 2020 shows the reflection coefficients for p-polarized light with different incident angles. Curve 2020 shows that, when the incident angle is equal to or close to the Brewster's angle, the reflection coefficient for p-polarized light is about or close to zero. Thus, the reflectivity at the interface between the two media can be very low for p-polarized light from certain incident angles.

FIG. 20B illustrates examples of reflection coefficients of s-polarization and p-polarization light with different incident angles at an interface between a high refractive index material and a low refractive index material. In the illustrated example, the refractive index of the first medium is 1.5, the refractive index of the second medium is 1.0, and the s-polarized or p-polarized light reaches the interface between the two media from the first medium. A curve 2012 in FIG. 20B shows the reflection coefficients for s-polarized light with different incident angles. A curve 2022 shows the reflection coefficients for p-polarized light with different incident angles. As shown by curves 2012 and 2022, the incident light may be totally reflected when the incident angle is greater than the critical angle. When the incident angle is less than the critical angle, the reflection coefficients for p-polarized light with incident angles at or near the Brewster's angle may be close to zero. Thus, the reflectivity at the interface between the two media can be very low for p-polarized light from certain incident angles. Thus, in a VBG-based waveguide display, it may be desirable to alter the polarization state of the incident light to preferentially diffract or transmit the incident light in order to achieve a high efficiency of the VBG-based waveguide display FIG. 21A illustrates an example of an optical see-through waveguide display 2100 including volume Bragg gratings for exit pupil expansion according to certain embodiments. Waveguide display 2100 may be an example of waveguide display 1000 described above. Waveguide display 2100 may include a first grating 2110, a second grating 2120, a third grating 2130, and a fourth grating 2140 coupled to one or more substrates. As described above with respect to FIG. 10, display light may be coupled into a substrate by first grating 2110. Second grating 2120 may direct the coupled display light towards third grating 2130. Third grating 2130 may replicate the input pupil in one direction and direct the display light towards fourth grating 2140. Fourth grating 2140 may replicate the input pupil in a second direction and direct the display light towards an eyebox 2150. First grating 2110 and fourth grating 2140 may compensate for the dispersion caused by each other. Similarly, second grating 2120 and third grating 2130 may compensate for the dispersion caused by each other. In order to achieve a wide field of view and a wide spectral range, the grating vectors of the four gratings may not be aligned. As such, a light beam may be s-polarized light for one grating, but may be p-polarized light for another grating that has a different grating vector.

Figure 21B:
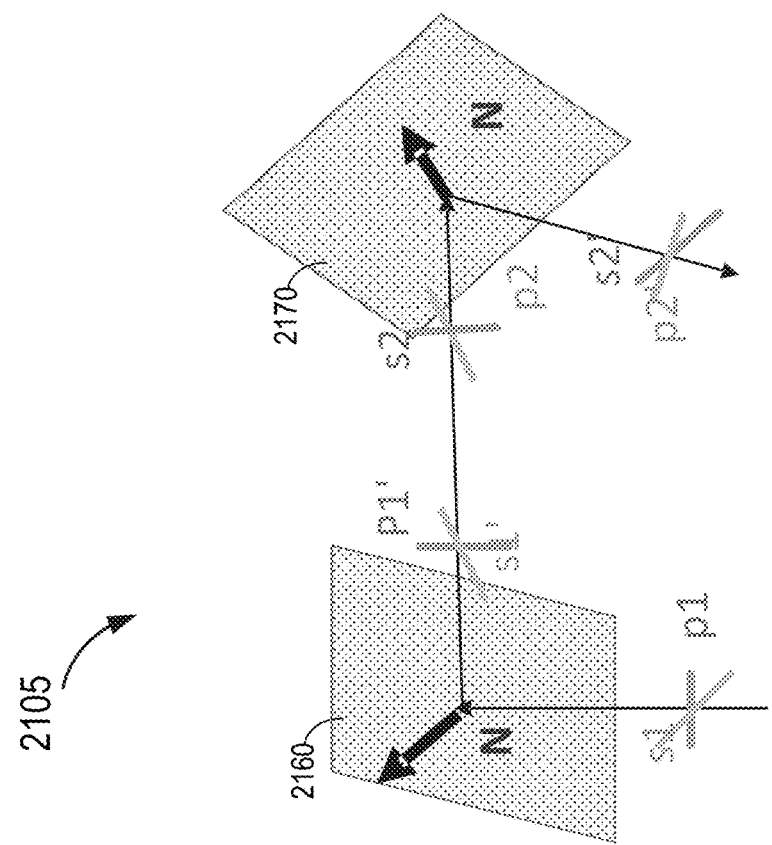
FIG. 21B illustrates polarization states of light beams in an example of a waveguide display.
Figure 21A:
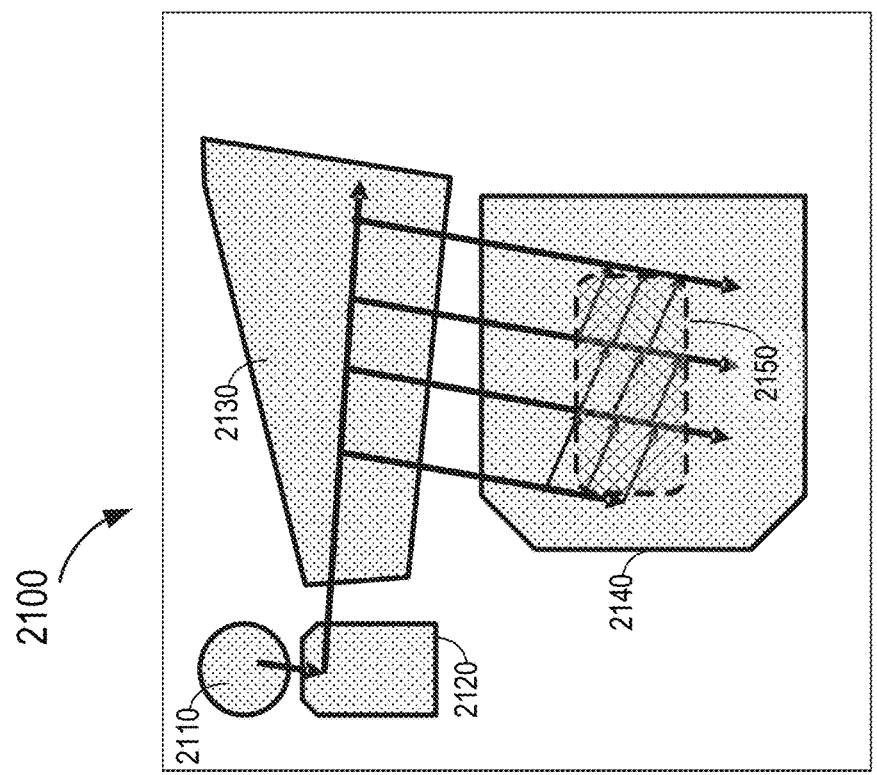
FIG. 21A illustrates an example of an optical see-through waveguide display including volume Bragg gratings for exit pupil expansion.

FIG. 21B illustrates examples of polarization states of light beams in an example of a waveguide display 2105. In the illustrated example, a first grating 2160 and a second grating 2170 may have high diffraction efficiencies for s-polarized light but low diffraction efficiencies for p-polarized light. However, due to the different orientations and grating vectors of first grating 2160 and second grating 2170, s-polarized light diffracted by first grating 2160 may become p-polarized for second grating 2170. As such, only a small portion of the p-polarized light may be diffracted by second grating 2170. Therefore, the overall efficiency of waveguide display 2105 may be low.

FIG. 22A illustrates a cross-sectional view of an example of a waveguide display 2200 including VBG couplers and a phase structure 2230 according to certain embodiments. Waveguide display 2200 may be similar to waveguide display 1900 and may additionally include phase structure 2230. As illustrated, waveguide display 2200 may include VBGs 2220 and 2222 in a substrate 2210 or between two substrates. VBG 2220 may reflectively diffract incident display light (e.g., s-polarized light) towards a top surface 2212 of substrate 2210. Top surface 2212 may reflect the display light towards a bottom surface 2214 of substrate 2210. Phase structure 2230 at bottom surface 2214 of substrate 2210 may receive the reflected display light and change the polarization state of the display light, for example, to p-polarized light. The display light may be reflected at bottom surface 2214 of substrate 2210 or a bottom surface of phase structure 2230. The reflected display light may incident on VBG 2222 as s-polarized light due to the different orientation and different grating vector of VBG 2222 compared to VBG 2220, and may be diffracted out of substrate 2210 towards an eyebox at a higher diffraction efficiency by VBG 2222.

FIG. 22B illustrates a top view of an example of a waveguide display 2202 including VBGs and a phase structure 2290 according to certain embodiments. As in waveguide display 2100, waveguide display 2202 may include a first grating 2240, a second grating 2250, a third grating 2260, and a fourth grating 2270 coupled to one or more substrates 2205. Each of gratings 2240-2270 may be a reflective VBG or a transmissive VBG. As described above with respect to FIG. 10, display light may be coupled into a substrate 2205 by first grating 2240. Second grating 2250 may direct the coupled display light towards third grating 2260. Third grating 2260 may replicate the input pupil in one direction and direct the display light towards fourth grating 2270. Fourth grating 2270 may replicate the input pupil in a second direction and direct the display light towards an eyebox 2280. Phase structure 2290 may be at a region where first grating 2240 and/or second grating 2250 are located, and may be used to change the polarization state of the display light coupled into substrate 2205, for example, from p-polarized to s-polarized or from s-polarized to p-polarized.

FIG. 23A illustrates a cross-sectional view of an example of a waveguide display 2300 including volume Bragg gratings 2320 and 2322 and phase structures 2330 and 2332 according to certain embodiments. As illustrated, waveguide display 2300 may include VBGs 2320 and 2322 in a substrate 2310 or between two substrates. VBG 2320 may reflectively diffract incident display light (e.g., s-polarized light) towards a top surface of substrate 2310. Phase structure 2332 may be coupled to the top surface of substrate 2310, and may change the polarization state of the incident display light. The top surface of substrate 2310 or phase structure 2332 may reflect the display light towards the bottom surface of substrate 2310. Phase structure 2330 at the bottom surface of substrate 2310 may change the polarization state of the incident display light. The display light may be reflected at the bottom surface of substrate 2310 or phase structure 2330. The reflected display light may incident on VBG 2322, and may be diffracted by VBG 2322 out of substrate 2310 towards an eyebox at a high diffraction efficiency.

In some embodiments, phase structures 2330 and 2332 may be only at selected locations on the top and bottom surfaces of substrate 2310. In some embodiments, either phase structure 2330 or phase structure 2332 may be used in a waveguide display. In some embodiments, both phase structure 2330 and phase structure 2332 may be used in a waveguide display, where the desired phase change or retardation may be achieved by the combination of the two phase structures. For example, to convert s-polarized light to p-polarized light, a first phase structure may convert the s-polarized light to circularly polarized light, and a second phase structure may convert the circularly polarized light to p-polarized light. In some embodiments, the polarization alteration characteristics of phase structure 2330 or phase structure 2332 may vary at different locations.

FIG. 23B illustrates a top view of an example of a waveguide display 2302 including volume Bragg gratings and a phase structure 2390 according to certain embodiments. Waveguide display 2302 may include a first grating 2340, a second grating 2350, a third grating 2360, and a fourth grating 2370 coupled to one or more substrates 2305. As described above, display light may be coupled into a substrate 2305 by first grating 2340. Second grating 2350 may direct the coupled display light towards third grating 2360. Third grating 2360 may replicate the input pupil in one direction and direct the display light towards fourth grating 2370. Fourth grating 2370 may replicate the input pupil in a second direction and direct the display light towards an eyebox 2380. Phase structure 2390 may be on one or two surface of a substrate 2305, and may be used to change polarization state of the display light, for example, from p-polarized to s-polarized or from s-polarized to p-polarized. Phase structure 2390 may cover the areas of waveguide display 2302 where gratings 2340-2370 are located.

Figure 24B:
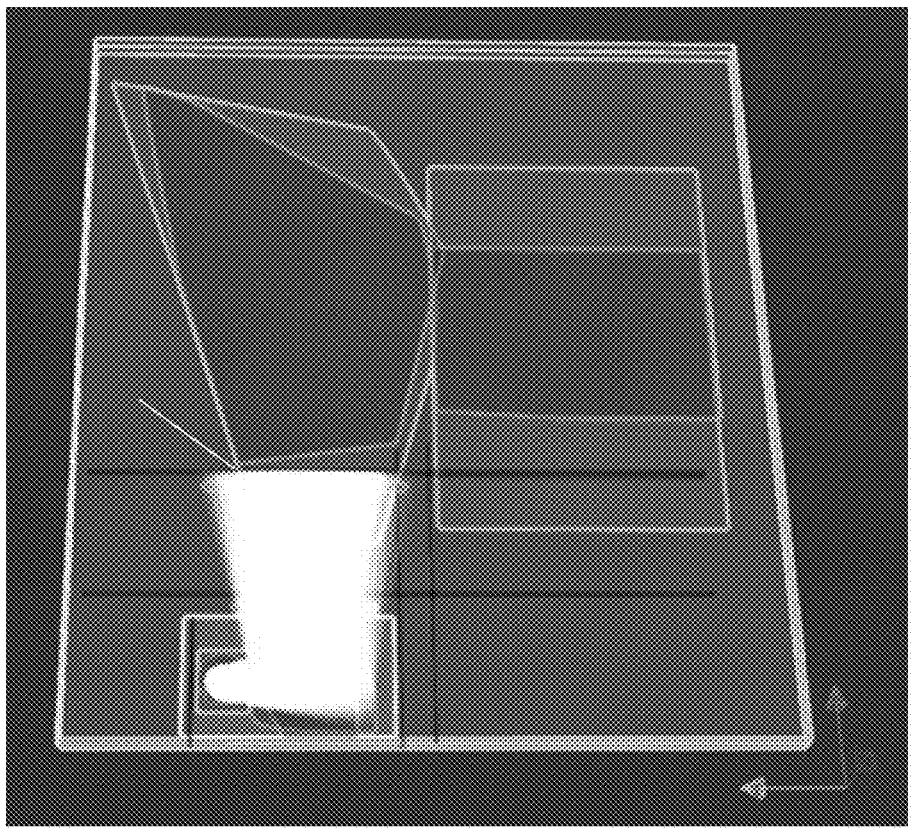
FIG. 24B illustrates the simulation result of an example of a waveguide display including VBGs and a phase structure according to certain embodiments.
Figure 24A:
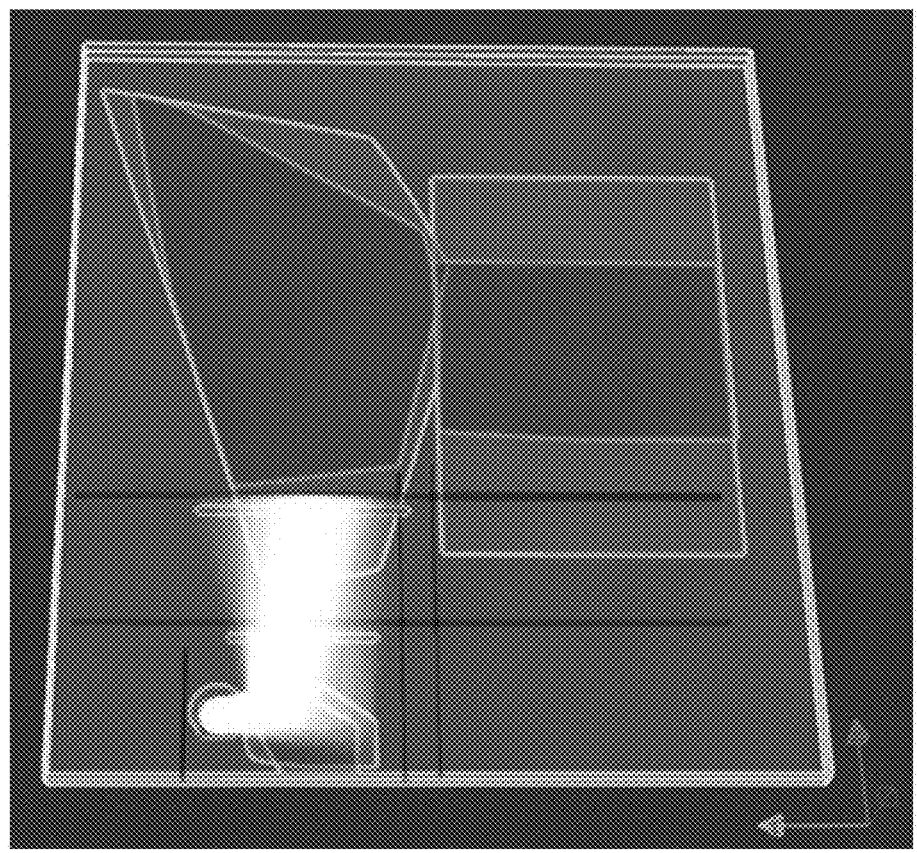
FIG. 24A illustrates the simulation result of an example of a waveguide display including VBGs.

FIG. 24A illustrates a simulation result for an example of a volume Bragg grating-based waveguide display 2400 according to certain embodiments. Waveguide display 2400 may be an example of waveguide display 2100. FIG. 24A shows a display light beam coupled into a waveguide by a first grating (e.g., first grating 2110) and then directed by a second grating (e.g., second grating 2120) to output gratings. The input coupling efficiency of waveguide display 2400 may be measured after the display light is diffracted by the second grating and before the display light reaches the output gratings.

FIG. 24B illustrates a simulation result of an example of a waveguide display 2405 including volume Bragg gratings and a phase structure according to certain embodiments. Waveguide display 2405 may be an example of waveguide display 2202, where a phase structure (e.g., phase structure 2290) may be located at a region where a first grating (e.g., first grating 2240) and a second grating (e.g., second grating 2250) are located. FIG. 24B shows a display light beam coupled into a waveguide by the first grating and then directed by the second grating to output gratings. The input coupling efficiency of waveguide display 2405 may be measured after the display light is diffracted by the second grating and before the display light reaches the output gratings. FIG. 24B shows that the intensity of the display light beam after the second grating may be much higher than that shown in FIG. 24A.

Figure 25:
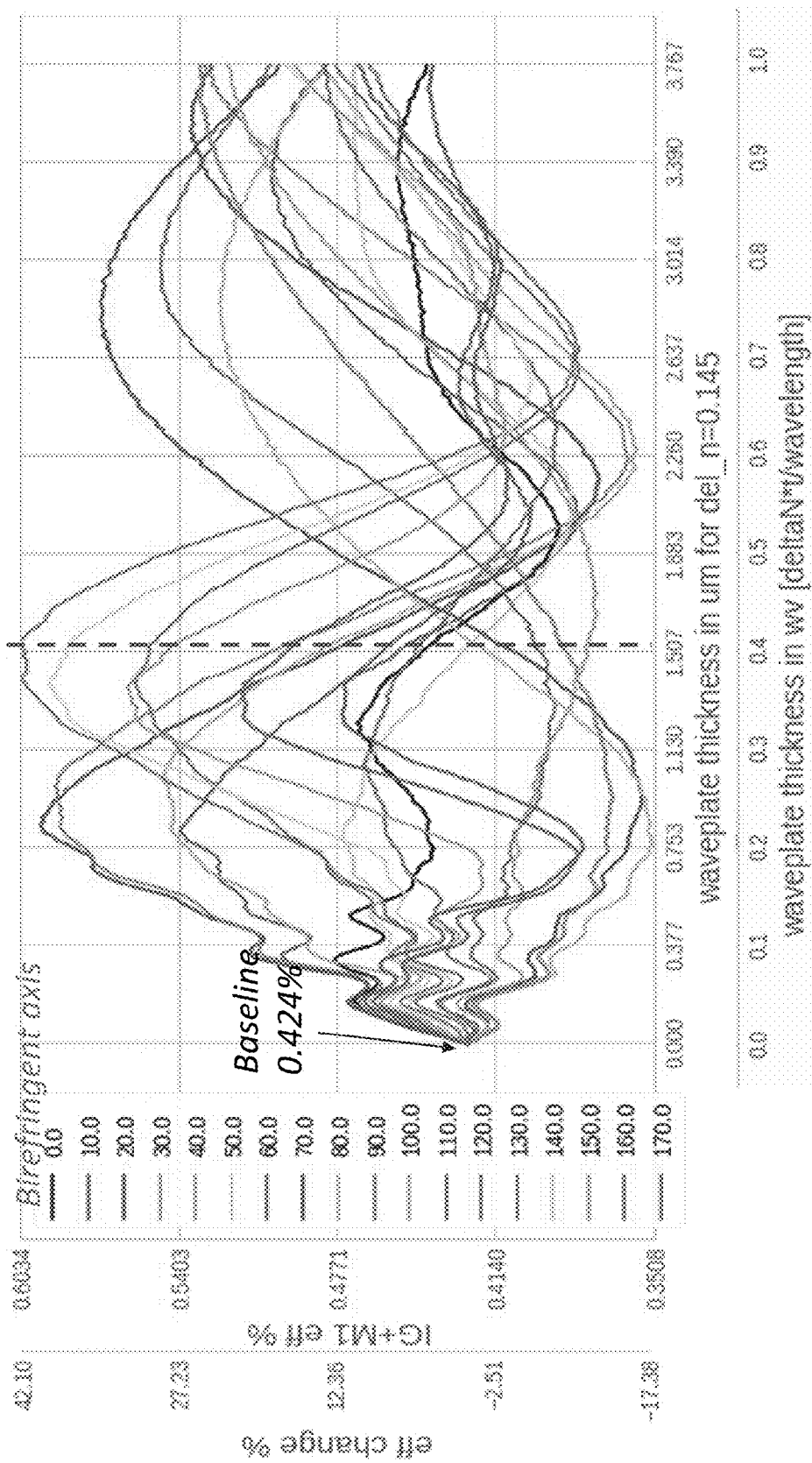
FIG. 25 illustrates simulated input coupling efficiencies of examples of waveguide displays including various phase structures according to certain embodiments.

FIG. 25 illustrates simulated input coupling efficiencies of examples of waveguide displays including various phase structures according to certain embodiments. The waveguide displays used for the simulations may have a configuration as shown in FIG. 22B. The input coupling efficiencies of the waveguide displays may be measured after the display light is diffracted by the second grating (e.g., second grating 2250) and before the display light reaches the output gratings (e.g., third grating 2260). In the simulations, phase structures (e.g., waveplates) with different thicknesses and orientations with respect to the first grating (e.g., first grating 2240) are placed at a region where the first grating and the second grating are located as shown in FIG. 22B. For each phase structure configuration (e.g., a unique combination of thickness and orientation of the waveplate), the average input coupling efficiency for light from different regions in a field of view is measured.

In FIG. 25, the horizontal axis corresponds to the thickness of the waveplate (in m for physical thickness and in wavelengths for waveplate thickness), where the waveplate has a birefringence characterized by a Δn about 0.145. The waveplate thickness of the waveplate may vary between 0 and about one wavelength. The vertical axis corresponds to the average input coupling efficiency for each phase structure configuration and the corresponding change of the average input coupling efficiency with respect to a baseline efficiency measured without using a phase structure. Each curve in FIG. 25 corresponds to a different orientation of the fast axis of the phase structure with respect to the grating ridges of the first grating, where the angle between the fast axis of the waveplate and the grating ridges may vary from about 0° to about 170°.

FIG. 25 shows that the maximum input coupling efficiency may be achieved when the phase structure has a waveplate thickness about 0.4 wavelengths (e.g., with a physical thickness about 1.54 μm) and is oriented such that the fast axis of the phase structure is at about 130° with respect to the grating ridges. The maximum input coupling efficiency may be about 42% higher than the baseline efficiency.

Figure 26G:
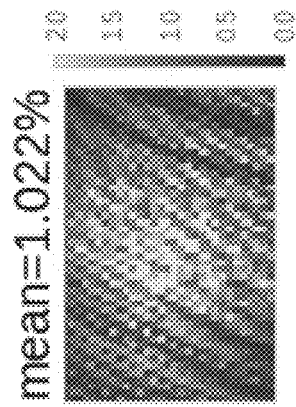
FIGS. 26G-26I illustrate simulated input coupling efficiencies of an example of a waveguide display including a phase structure according to certain embodiments for light from different regions in a field of view and in different colors.
Figure 26H:
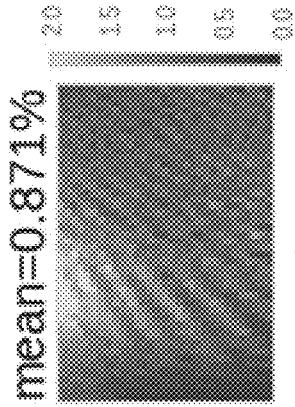
Figure 26I:
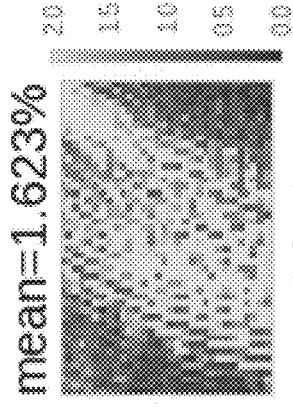
Figure 26D:
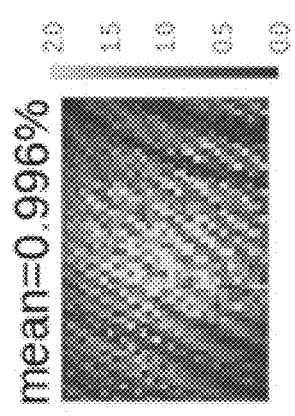
FIGS. 26D-26F illustrate simulated input coupling efficiencies of an example of a waveguide display including a phase structure according to certain embodiments for light from different regions in a field of view and in different colors.
Figure 26E:
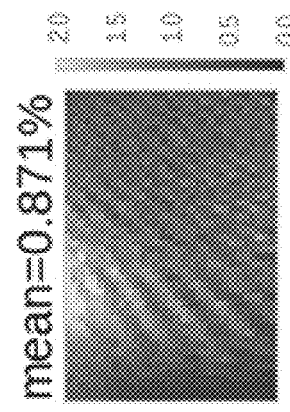
Figure 26F:
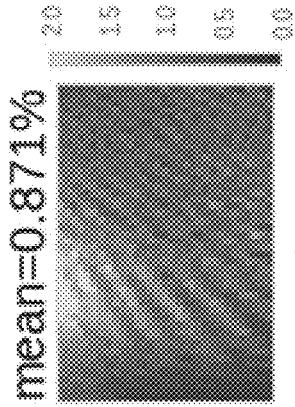
Figure 26A:
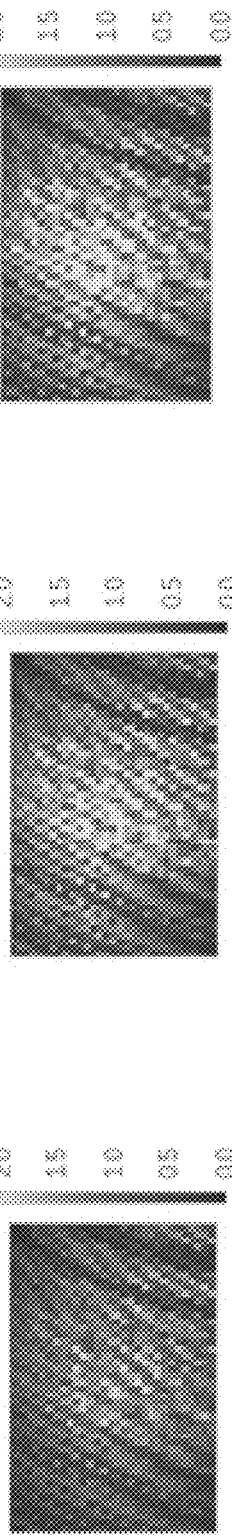
Figure 26C:
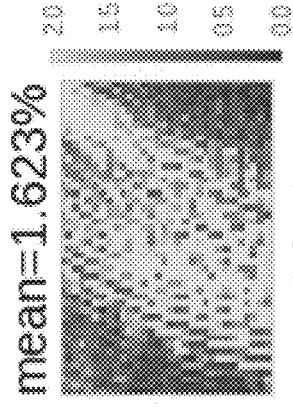

FIGS. 26A-26C illustrate simulated input coupling efficiencies of an example of a VBG-based waveguide display (e.g., waveguide display 2100) for light from different regions of a field of view and in red, green, and blue colors, respectively. FIG. 26A shows that the average input coupling efficiency of the VBG-based waveguide display with no phase structures is about 0.725% for red light. FIG. 26B shows that the average input coupling efficiency of the VBG-based waveguide display with no phase structures is about 0.62% for green light. FIG. 26C shows that the average input coupling efficiency of the VBG-based waveguide display with no phase structures is about 1.246% for blue light.

FIGS. 26D-26F illustrate simulated input coupling efficiencies of an example of a VBG-based waveguide display (e.g., waveguide display 2202) including a phase structure (e.g., a zeroth order phase plate) for light from different regions in a field of view and in red, green, and blue colors, respectively. FIG. 26D shows that the average input coupling efficiency of the VBG-based waveguide display with the phase structure is about 0.996% for red light, which is about 37% higher than the baseline result shown in FIG. 26A. FIG. 26E shows that the average input coupling efficiency of the VBG-based waveguide display with the phase structure is about 0.871% for green light, which is about 40% higher than the baseline result shown in FIG. 26B. FIG. 26F shows that the average input coupling efficiency of the VBG-based waveguide display with the phase structure is about 1.486% for blue light, which is about 40% higher than the baseline result shown in FIG. 26C.

FIGS. 26G-26I illustrate simulated input coupling efficiencies of an example of a VBG-based waveguide display (e.g., waveguide display 2202) including a phase structure (e.g., an achromatic phase plate) for light from different regions in a field of view and in red, green, and blue colors, respectively. FIG. 26G shows that the average input coupling efficiency of the VBG-based waveguide display with the phase structure is about 1.022% for red light, which is about 410% higher than the baseline result shown in FIG. 26A. FIG. 26H shows that the average input coupling efficiency of the VBG-based waveguide display with the phase structure is about 0.871% for green light, which is about 40% higher than the baseline result shown in FIG. 26B. FIG. 26I shows that the average input coupling efficiency of the VBG-based waveguide display with the phase structure is about 1.623% for blue light, which is about 30% higher than the baseline result shown in FIG. 26C.

The phase structures described above (e.g., phase structure 2230, 2290, 2330, 2332, or 2390) may include any birefringent materials (e.g., birefringent crystals, liquid crystals, or polymers) or structures (e.g., gratings, meta-gratings, nano-structures, or other subwavelength structures) that can cause a desired phase delay between two orthogonal linear polarization components (e.g., s-polarized light and p-polarized light), such that the incident light beam may be changed to an s-polarized, p-polarized, circularly polarized, or elliptically polarized beam In some embodiments, in order to reduce the loss (e.g., due to undesired Fresnel reflection) at the interfaces between the phase structures and the adjacent components of the waveguide display, such as the substrate, it may be desirable to use a phase structure that has an effective refractive index close to the refractive index of the adjacent component. In some embodiments where the substrate has a high refractive index (e.g., >2.0, such as 2.5), it may be difficult to find a birefringent material that has a matching refractive index. In such cases, gratings or other subwavelength structures may be used to achieve the phase delay, polarization conversion, and refractive index matching as described above with respect to, for example, FIGS. 17A and 17B, such that a difference between the refractive index of the substrate and the effective refractive index of the phase structure may be less than about 0.35, less than about 0.2, less than about 0.1, or less than about 0.05.

Embodiments of the invention may be used to implement components of an artificial reality system or may be implemented in conjunction with an artificial reality system. Artificial reality is a form of reality that has been adjusted in some manner before presentation to a user, which may include, for example, a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, for example, create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Figure 27:
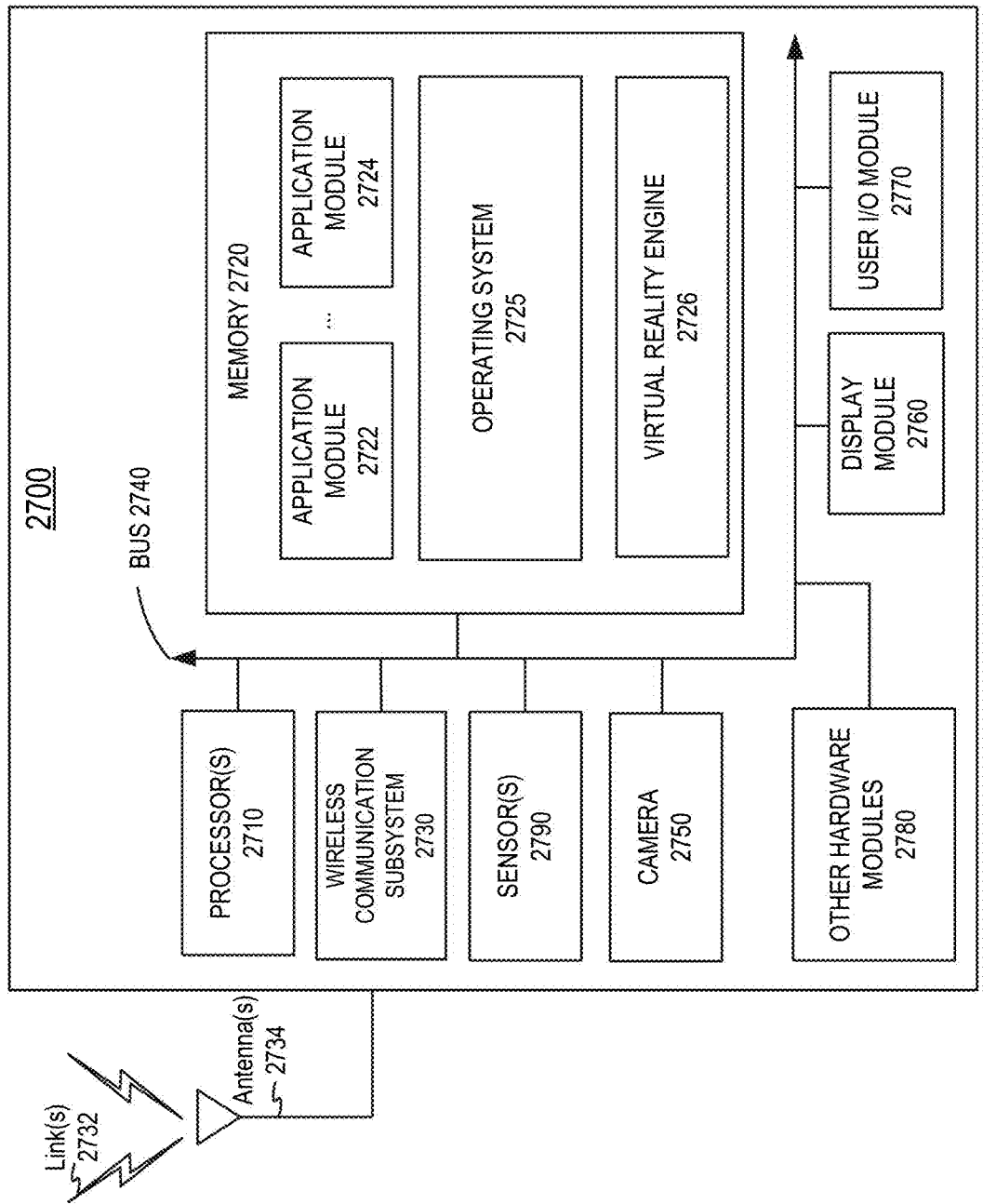
FIG. 27 is a simplified block diagram of an example of an electronic system in an example of a near-eye display according to certain embodiments.

FIG. 27 is a simplified block diagram of an example of an electronic system 2700 of an example near-eye display (e.g., HMD device) for implementing some of the examples disclosed herein. Electronic system 2700 may be used as the electronic system of an HMD device or other near-eye displays described above. In this example, electronic system 2700 may include one or more processor(s) 2710 and a memory 2720. Processor(s) 2710 may be configured to execute instructions for performing operations at a number of components, and can be, for example, a general-purpose processor or microprocessor suitable for implementation within a portable electronic device. Processor(s) 2710 may be communicatively coupled with a plurality of components within electronic system 2700. To realize this communicative coupling, processor(s) 2710 may communicate with the other illustrated components across a bus 2740. Bus 2740 may be any subsystem adapted to transfer data within electronic system 2700. Bus 2740 may include a plurality of computer buses and additional circuitry to transfer data.

Memory 2720 may be coupled to processor(s) 2710. In some embodiments, memory 2720 may offer both short-term and long-term storage and may be divided into several units. Memory 2720 may be volatile, such as static random access memory (SRAM) and/or dynamic random access memory (DRAM) and/or non-volatile, such as read-only memory (ROM), flash memory, and the like. Furthermore, memory 2720 may include removable storage devices, such as secure digital (SD) cards. Memory 2720 may provide storage of computer-readable instructions, data structures, program modules, and other data for electronic system 2700. In some embodiments, memory 2720 may be distributed into different hardware modules. A set of instructions and/or code might be stored on memory 2720. The instructions might take the form of executable code that may be executable by electronic system 2700, and/or might take the form of source and/or installable code, which, upon compilation and/or installation on electronic system 2700 (e.g., using any of a variety of generally available compilers, installation programs, compression/decompression utilities, etc.), may take the form of executable code.

In some embodiments, memory 2720 may store a plurality of application modules 2722 through 2724, which may include any number of applications. Examples of applications may include gaming applications, conferencing applications, video playback applications, or other suitable applications. The applications may include a depth sensing function or eye tracking function. Application modules 2722-2724 may include particular instructions to be executed by processor(s) 2710. In some embodiments, certain applications or parts of application modules 2722-2724 may be executable by other hardware modules 2780. In certain embodiments, memory 2720 may additionally include secure memory, which may include additional security controls to prevent copying or other unauthorized access to secure information.

In some embodiments, memory 2720 may include an operating system 2725 loaded therein. Operating system 2725 may be operable to initiate the execution of the instructions provided by application modules 2722-2724 and/or manage other hardware modules 2780 as well as interfaces with a wireless communication subsystem 2730 which may include one or more wireless transceivers. Operating system 2725 may be adapted to perform other operations across the components of electronic system 2700 including threading, resource management, data storage control and other similar functionality.

Wireless communication subsystem 2730 may include, for example, an infrared communication device, a wireless communication device and/or chipset (such as a Bluetooth® device, an IEEE 802.11 device, a Wi-Fi device, a WiMax device, cellular communication facilities, etc.), and/or similar communication interfaces. Electronic system 2700 may include one or more antennas 2734 for wireless communication as part of wireless communication subsystem 2730 or as a separate component coupled to any portion of the system. Depending on desired functionality, wireless communication subsystem 2730 may include separate transceivers to communicate with base transceiver stations and other wireless devices and access points, which may include communicating with different data networks and/or network types, such as wireless wide-area networks (WWANs), wireless local area networks (WLANs), or wireless personal area networks (WPANs). A WWAN may be, for example, a WiMax (IEEE 802.16) network. A WLAN may be, for example, an IEEE 802.11x network. A WPAN may be, for example, a Bluetooth network, an IEEE 802.15x, or some other types of network. The techniques described herein may also be used for any combination of WWAN, WLAN, and/or WPAN. Wireless communications subsystem 2730 may permit data to be exchanged with a network, other computer systems, and/or any other devices described herein. Wireless communication subsystem 2730 may include a means for transmitting or receiving data, such as identifiers of HMD devices, position data, a geographic map, a heat map, photos, or videos, using antenna(s) 2734 and wireless link(s) 2732. Wireless communication subsystem 2730, processor (s) 2710, and memory 2720 may together comprise at least a part of one or more of a means for performing some functions disclosed herein.

Embodiments of electronic system 2700 may also include one or more sensors 2790. Sensor(s) 2790 may include, for example, an image sensor, an accelerometer, a pressure sensor, a temperature sensor, a proximity sensor, a magnetometer, a gyroscope, an inertial sensor (e.g., a module that combines an accelerometer and a gyroscope), an ambient light sensor, or any other similar module operable to provide sensory output and/or receive sensory input, such as a depth sensor or a position sensor. For example, in some implementations, sensor(s) 2790 may include one or more inertial measurement units (IMUs) and/or one or more position sensors. An IMU may generate calibration data indicating an estimated position of the HMD device relative to an initial position of the HMD device, based on measurement signals received from one or more of the position sensors. A position sensor may generate one or more measurement signals in response to motion of the HMD device. Examples of the position sensors may include, but are not limited to, one or more accelerometers, one or more gyroscopes, one or more magnetometers, another suitable type of sensor that detects motion, a type of sensor used for error correction of the IMU, or some combination thereof. The position sensors may be located external to the IMU, internal to the IMU, or some combination thereof. At least some sensors may use a structured light pattern for sensing.

Electronic system 2700 may include a display module 2760. Display module 2760 may be a near-eye display, and may graphically present information, such as images, videos, and various instructions, from electronic system 2700 to a user. Such information may be derived from one or more application modules 2722-2724, virtual reality engine 2726, one or more other hardware modules 2780, a combination thereof, or any other suitable means for resolving graphical content for the user (e.g., by operating system 2725). Display module 2760 may use liquid crystal display (LCD) technology, light-emitting diode (LED) technology (including, for example, OLED, ILED, LED, AMOLED, TOLED, etc.), light emitting polymer display (LPD) technology, or some other display technology.

Electronic system 2700 may include a user input/output module 2770. User input/output module 2770 may allow a user to send action requests to electronic system 2700. An action request may be a request to perform a particular action. For example, an action request may be to start or end an application or to perform a particular action within the application. User input/output module 2770 may include one or more input devices. Example input devices may include a touchscreen, a touch pad, microphone(s), button(s), dial(s), switch(es), a keyboard, a mouse, a game controller, or any other suitable device for receiving action requests and communicating the received action requests to electronic system 2700. In some embodiments, user input/output module 2770 may provide haptic feedback to the user in accordance with instructions received from electronic system 2700. For example, the haptic feedback may be provided when an action request is received or has been performed.

Electronic system 2700 may include a camera 2750 that may be used to take photos or videos of a user, for example, for tracking the user's eye position. Camera 2750 may also be used to take photos or videos of the environment, for example, for VR, AR, or MR applications. Camera 2750 may include, for example, a complementary metal-oxide-semiconductor (CMOS) image sensor with a few millions or tens of millions of pixels. In some implementations, camera 2750 may include two or more cameras that may be used to capture 3-D images.

In some embodiments, electronic system 2700 may include a plurality of other hardware modules 2780. Each of other hardware modules 2780 may be a physical module within electronic system 2700. While each of other hardware modules 2780 may be permanently configured as a structure, some of other hardware modules 2780 may be temporarily configured to perform specific functions or temporarily activated. Examples of other hardware modules 2780 may include, for example, an audio output and/or input module (e.g., a microphone or speaker), a near field communication (NFC) module, a rechargeable battery, a battery management system, a wired/wireless battery charging system, etc. In some embodiments, one or more functions of other hardware modules 2780 may be implemented in software.

In some embodiments, memory 2720 of electronic system 2700 may also store a virtual reality engine 2726. Virtual reality engine 2726 may execute applications within electronic system 2700 and receive position information, acceleration information, velocity information, predicted future positions, or some combination thereof of the HMD device from the various sensors. In some embodiments, the information received by virtual reality engine 2726 may be used for producing a signal (e.g., display instructions) to display module 2760. For example, if the received information indicates that the user has looked to the left, virtual reality engine 2726 may generate content for the HMD device that mirrors the user's movement in a virtual environment. Additionally, virtual reality engine 2726 may perform an action within an application in response to an action request received from user input/output module 2770 and provide feedback to the user. The provided feedback may be visual, audible, or haptic feedback. In some implementations, processor(s) 2710 may include one or more GPUs that may execute virtual reality engine 2726.

In various implementations, the above-described hardware and modules may be implemented on a single device or on multiple devices that can communicate with one another using wired or wireless connections. For example, in some implementations, some components or modules, such as GPUs, virtual reality engine 2726, and applications (e.g., tracking application), may be implemented on a console separate from the head-mounted display device. In some implementations, one console may be connected to or support more than one HMD.

In alternative configurations, different and/or additional components may be included in electronic system 2700. Similarly, functionality of one or more of the components can be distributed among the components in a manner different from the manner described above. For example, in some embodiments, electronic system 2700 may be modified to include other system environments, such as an AR system environment and/or an MR environment.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, systems, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing various embodiments. Various changes may be made in the function and arrangement of elements without departing from the spirit and scope of the present disclosure.

Also, some embodiments were described as processes depicted as flow diagrams or block diagrams. Although each may describe the operations as a sequential process, many of the operations may be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It will be apparent to those skilled in the art that substantial variations may be made in accordance with specific requirements. For example, customized or special-purpose hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" may refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media such as compact disk (CD) or digital versatile disk (DVD), punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code. A computer program product may include code and/or machine-executable instructions that may represent a procedure, a function, a subprogram, a program, a routine, an application (App), a subroutine, a module, a software package, a class, or any combination of instructions, data structures, or program statements.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms, "and" and "or" as used herein, may include a variety of meanings that are also expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AC, BC, AA, ABC, AAB, AABBCCC, etc.

Further, while certain embodiments have been described using a particular combination of hardware and software, it should be recognized that other combinations of hardware and software are also possible. Certain embodiments may be implemented only in hardware, or only in software, or using combinations thereof. In one example, software may be implemented with a computer program product containing computer program code or instructions executable by one or more processors for performing any or all of the steps, operations, or processes described in this disclosure, where the computer program may be stored on a non-transitory computer readable medium. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques, including, but not limited to, conventional techniques for inter-process communications, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A waveguide display comprising:
 a first substrate transparent to visible light;
 a second substrate transparent to the visible light;
 a holographic material layer sandwiched by the first substrate and the second substrate and including a reflective volume Bragg grating characterized by a polarization-dependent diffraction efficiency, the reflective volume Bragg grating configured to more preferentially reflectively diffract incident light of a first polarization state over incident light of a second polarization state that is orthogonal to the first polarization state; and
 a phase structure on the first substrate or the second substrate and configured to change a polarization state of display light incident on the phase structure before the display light is diffracted by the reflective volume Bragg grating such that the display light incident on the reflective volume Bragg grating is predominantly in the first polarization state than the second polarization state with respect to the reflective volume Bragg grating to improve diffraction efficiency.

2. The waveguide display of claim 1, wherein the phase structure comprises a waveplate.

3. The waveguide display of claim 2, wherein the waveplate is characterized by a waveplate thickness between zero and one wavelength.

4. The waveguide display of claim 1, wherein the phase structure comprises a layer of a birefringent material.

5. The waveguide display of claim 1, wherein the phase structure comprises a subwavelength structure and an overcoat layer.

6. The waveguide display of claim 5, wherein the subwavelength structure is etched in the first substrate or the second substrate.

7. The waveguide display of claim 5, wherein the subwavelength structure is etched in a material layer formed on the first substrate or the second substrate.

8. The waveguide display of claim 5, wherein a difference between a refractive index of the first substrate or the second substrate and an effective refractive index of the phase structure including the subwavelength structure and the overcoat layer is less than 0.35.

9. The waveguide display of claim 1, wherein the phase structure is in selected regions of the first substrate or the second substrate.

10. The waveguide display of claim 1, wherein the phase structure is characterized by a spatially varying phase retardation across different regions of the phase structure.

11. The waveguide display of claim 1, wherein:
the phase structure is on the second substrate; and
the waveguide display further comprises a second phase structure on the first substrate.

12. The waveguide display of claim 1, wherein the holographic material layer includes two or more volume Bragg gratings that include an input grating coupler and an output grating coupler.

13. The waveguide display of claim 12, wherein the phase structure is in a region of the waveguide display where the input grating coupler is located.

14. The waveguide display of claim 12, wherein the phase structure is in a region of the waveguide display where the input grating coupler and the output grating coupler are located.

15. The waveguide display of claim 12, wherein:
the input grating coupler includes one or more volume Bragg gratings; and
the output grating coupler includes at least two volume Bragg gratings configured to expand an eyebox of the waveguide display in two directions.

16. A waveguide display comprising:
a first substrate;
a second substrate;
an input grating coupler between the first substrate and the second substrate and configured to couple display light into the first substrate or the second substrate via reflective diffraction that more preferentially reflectively diffracts incident light of a first polarization state over incident light of a second polarization state that is orthogonal to the first polarization state;
an output grating coupler between the first substrate and the second substrate and configured to at least partially couple the display light out of the waveguide display towards an eyebox of the waveguide display via reflective diffraction that more preferentially reflectively diffracts incident light of the first polarization state over incident light of the second polarization state; and
a phase structure on the first substrate or the second substrate and configured to change a polarization state of the display light coupled into the first substrate or the second substrate before the display light coupled into the first substrate or the second substrate reaches the output grating coupler such that the display light incident on the output grating coupler is predominantly in the first polarization state than the second polarization state with respect to the output grating coupler.

17. The waveguide display of claim 16, wherein the phase structure includes:
a layer of a birefringent material; or
a subwavelength structure formed in an isotropic material or the birefringent material.

18. The waveguide display of claim 16, wherein:
the phase structure includes a subwavelength structure and an overcoat layer; and
a difference between a refractive index of the first or second substrate and an effective refractive index of the phase structure is less than 0.35.

19. The waveguide display of claim 16, wherein the phase structure includes a subwavelength structure etched in the first substrate, in the second substrate, or in a material layer formed on the first substrate or the second substrate.

20. The waveguide display of claim 16, wherein:
the phase structure is on the second substrate; and
the waveguide display further comprises a second phase structure on the first substrate.

* * * * *